United States Patent
Nakajima et al.

[11] Patent Number: 5,927,699
[45] Date of Patent: Jul. 27, 1999

[54] DAMPING APPARATUS

[75] Inventors: Zenji Nakajima, Aichi; Yoichi Shimahara, Osaka; Masayuki Yamajo, Osaka; Takuri Sakurai, Osaka, all of Japan

[73] Assignees: Toyo Tire & Rubber Co., Ltd., Osaka; Toyota Jidosha Kabushiki Kaisha, Aichi, both of Japan

[21] Appl. No.: 08/914,959

[22] Filed: Aug. 20, 1997

Related U.S. Application Data

[63] Continuation of application No. 08/783,709, Jan. 16, 1997, abandoned, which is a continuation of application No. 08/570,269, Dec. 11, 1995, abandoned, which is a continuation of application No. 08/216,597, Mar. 22, 1994, abandoned, which is a continuation of application No. 07/702,670, May 17, 1991, abandoned.

[30] Foreign Application Priority Data

| May 18, 1990 | [JP] | Japan | 2-130063 |
| Nov. 19, 1990 | [JP] | Japan | 2-314984 |
| Nov. 30, 1990 | [JP] | Japan | 2-337371 |
| Mar. 1, 1991 | [JP] | Japan | 3-035915 |

[51] Int. Cl.⁶ ................................ B60K 5/12
[52] U.S. Cl. ................ 267/140.14; 267/140.13
[58] Field of Search .......... 267/140.11, 140.13, 267/140.14, 140.15, 35, 219; 248/562; 180/312

[56] References Cited

U.S. PATENT DOCUMENTS

| 4,432,441 | 2/1984 | Kurokawa | 267/140.1 E |
| 4,638,983 | 1/1987 | Idigkeit et al. | 267/140.14 |
| 4,650,170 | 3/1987 | Fukushima | 267/140.1 AE |
| 4,789,142 | 12/1988 | Hoying et al. | 267/140.1 AE |
| 4,793,599 | 12/1988 | Ishioka | 267/140.1 AE |
| 4,869,474 | 9/1989 | Best et al. | 267/140.14 |
| 4,919,402 | 4/1990 | Doi | 267/140.1 AE |
| 5,116,029 | 5/1992 | Gennesseaux | 267/140.1 AE |
| 5,291,967 | 3/1994 | Aoki | 180/312 |

FOREIGN PATENT DOCUMENTS

| 0106483A2 | 4/1984 | European Pat. Off. . |
| 0347666 | 12/1989 | European Pat. Off. . |
| 3821368A1 | 12/1989 | Germany . |
| 3902604A1 | 8/1990 | Germany . |
| 3902605A1 | 8/1990 | Germany . |
| 3916539A1 | 11/1990 | Germany . |
| 4041011A1 | 6/1991 | Germany . |
| 4110601A1 | 10/1991 | Germany . |
| 59-183137 | 10/1984 | Japan . |
| 63-53617 | 3/1988 | Japan . |
| 63-261300 | 10/1988 | Japan . |
| 2-261940 | 10/1990 | Japan . |

Primary Examiner—Matthew C. Graham
Attorney, Agent, or Firm—Jordan and Hamburg LLP

[57] ABSTRACT

A damping apparatus comprises an actuator consisting of an oscillating element for transforming an electric oscillation into a mechanical oscillation and an amplifying mechanism for amplifying the resulting mechanical oscillation as interposed between two structures at least one of which is a source of vibration so that the mechanical oscillation output of the actuator is superimposed on the vibration to be controlled. As such, it may include a sensor disposed in the path of propagation of the vibration to be attenuated and a control device which, in response to the output signal from said sensor, applies an electric oscillation associated with the vibration to be attenuated. A sensor transforms the mechanical vibration to be attenuated into an electric oscillation and, in response to this output electric oscillation, the control device applies an electric signal associated with the vibration to be attenuated to the oscillating element. This oscillating element transforms the applied electric signal into a mechanical oscillation having a very small amplitude. This small-amplitude mechanical oscillation is amplified by the amplifying mechanism and an amplified mechanical oscillation is made available from the actuator. This output mechanical oscillation from the actuator interposed between two structures is superimposed on the target vibration in its path of propagatin to produce the desired damping effect.

40 Claims, 49 Drawing Sheets

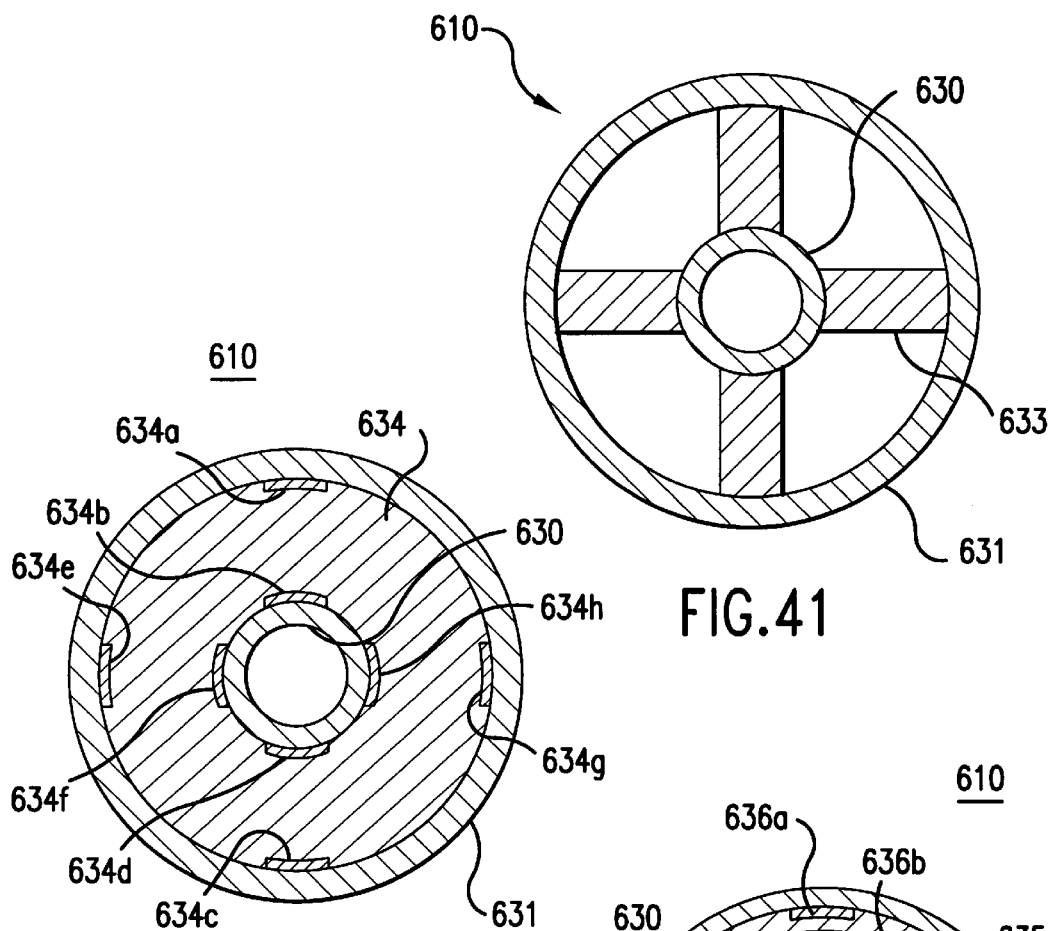
FIG.41
FIG.41(A)
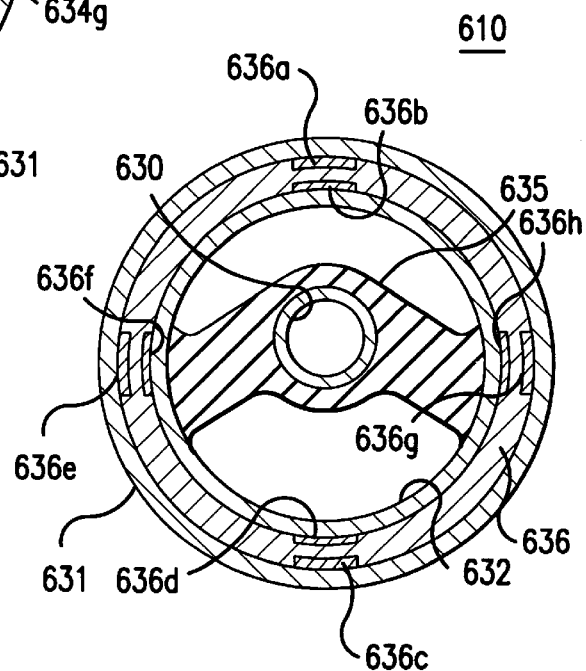
FIG.42

DAMPING APPARATUS

This application is a continuation of application Ser. No. 08/783,709 filed Jan. 16, 1997, now abandoned, which is a continuation of application Ser. No. 08/570,269 filed Dec. 11, 1995, now abandoned, which is a continuation of application Ser. No. 08/216,597 filed Mar. 22, 1994, now abandoned, which is a continuation of application Ser. No. 07/702,670 filed May 17, 1991, now abandoned.

BACKGROUND OF THE INVENTION

The present invention relates to a damping apparatus for preventing transmission of mechanical vibrations (vibration isolation) and/or controlling mechanical vibrations (damping).

The active damping apparatus utilizing an oscillating element as an actuator for transformation of electrical oscillation into mechanical oscillation has been disclosed in Japanese Laid-open Patent Specifications No. 63-53617 and No. 63-261300. In these systems, an actuator-load sensor series is interposed between two structures at least one of which is a source of vibration and an acceleration sensor is mounted on the vibration source structure. According to this system, the mechanical vibration of a vibration source structure is transformed into an electric oscillation and the oscillating element is driven in accordance with the output electric oscillation signal. The underlying principle is that the mechanical vibration of a vibration source is cancelled by active mechanical oscillation of the actuator to preclude propagation of the source vibration. As an example of the oscillating element, there by may be mentioned a stack of piezoelectric ceramic wafers of plates.

The stacked piezoelectric ceramic oscillating element used in the above damping device, however, does provide only a minuscular dimensional change of about 1 μm at the maximum per mm of the element. On the other hand, the amplitude of the mechanical oscillation of the automotive engine damping mount, for instance, is generally ± about 0.5 mm to ± about 0.05. Therefore, in order to prevent transmission of the mechanical vibration of an engine to the body of the motor vehicle by means of said conventional active damping device, one would have to employ an oscillating element as large as 10 cm to even 1 m, which is near to impossibility.

It is, therefore, a first object of the invention to provide an active damping apparatus employing an oscillating element capable of converting an electric oscillating signal to a mechanical oscillation, which is capable of attenuating the large-amplitude mechanical vibrations of vibration source structures.

A hitherto-known damping apparatus for automotive and equivalent use comprises a housing constituted by a resilient wall and a cup-shaped wall, a fluid chamber defined by these walls and a diaphragm disposed in the housing and an orificed plate disposed in the fluid chamber. This damping apparatus is able to cope with vibrations of low frequencies in the neighborhood of 10 Hz, such as shake vibrations, by resonance of the liquid column in the orifice but can hardly attenuate vibrations in any selected and wide range of frequency band, including idling and other vibrations of frequencies in the neighborhood of 30 Hz, vibrations in the neighborhood of 100 Hz such as trapped sounds, or high-frequency vibrations in the vicinity of a few hundred Hz such as transmission sounds.

It is, therefore, a second object of the present invention to provide a damping apparatus which can selectively cope with any of low-frequency, large-amplitude vibration, intermediate-frequency, intermediate-amplitude vibration, and high-frequency, small amplitude vibration.

As one of the known damping apparatuses, there is a cylindrical engine mount.

FIG. 59 is a view illustrating a mode of application of the conventional cylindrical engine mount to an FF type motor vehicle.

As shown, a cylindrical engine mount 610 is supported by a metal member 604 secured to the engine by way of a shaft 606. The outer side of the engine mount 610 is supported by a metal member 612 secured to the vehicle body. In the conventional engine mount as shown, an inner cylinder 620 is eccentrically located within an outer cylinder 621 and these inner and outer cylinders are bridged by resilient elastomer 622 and by the shaft 606 passed into the inner cylinder 620, this inner cylinder 620 is supported on the metal 604 on the engine side while the outer cylinder 621 is supported on the metal 612 on the vehicle body. Thus, a rubber-like elastomer 622 is interposed between the inner cylinder 620 which oscillates with the engine and the outer cylinder rigidly secured to the body through the intervening material. However, as the engine load is applied to the inner cylinder 620 the elastomer deforms to bring the inner cylinder 620 into a substantially concentric position with respect to the outer cylinder 621. As shown in FIG. 60, a construction wherein a resilient elastomer is filled between the inner and outer cylinders 620, 621 is also known.

As aforesaid, the vibrations of an engine run the whole gamut from shake vibrations in the neighborhood of 10 Hz during driving and vibrations in the neighborhood of 30 Hz during idling to high-frequency vibrations in the vicinity of several hundreds of Hz.

However, the above conventional cylindrical engine mount 610 including resilient elastic embers 622, 623 between the inner and outer cylinders 620, 621 cannot sufficiently attenuate the low-frequency vibrations.

Therefore, a fluid-seal cylindrical engine mount as shown in FIG. 61 has recently come into use. In this engine mount 610, the eccentrically disposed inner and outer cylinders 620, 621 are internally bridged by resilient elastomer 622 to define a couple of radially juxtaposed fluid compartments 624, 625 which are communicating with each other through an orifice 626. In this fluid-seal cylindrical engine mount 610, low-frequency vibrations are attenuated by the flow of the fluid through the orifice 626 on input of vibration.

As an example of the actuator which generates a mechanical oscillation, there is known an oscillating element comprising a stack of piezoelectric ceramics. However, since there has been no cylindrical engine mount which performs positive damping of engine vibrations by the active mechanical oscillation of an actuator, no prior art devices offer a free choice of damping characteristics.

It is, therefore, a third object of the present invention to provide an active cylindrical damping apparatus containing a built-in actuator.

A further example of the cylindrical fluid-seal engine mount for an FF motor vehicle is illustrated in FIG. 72. In this engine mount 910, an inner cylinder 914 is eccentrically disposed in an outer cylinder 912 and the two cylinders 912 and 914 are bridged by supporting rubber 916. The outer cylinder 912 and supporting rubber 916 define a first fluid compartment 918, while a second compartment 924 is defined by the outer cylinder 912 and a diaphragm 922 supported by a stopper 920 secured to the edge of the supporting rubber 916 on the opposite side with respect to said first fluid chamber. Disposed slightly inwardly of the inner circumferential wall of the outer cylinder 912 is a divider 926 which extends from the first fluid chamber to the second fluid chamber. This divider 926 has ports 928, 930 opening into the two fluid compartments 918, 924, respectively, thus forming a circumferential orifice 930 through which the first fluid compartment and the second fluid compartment are intercommunicated. The outer cylinder is connected to the body of the motor vehicle, while the inner cylinder is connected to the engine side.

In the cylindrical engine mount illustrated in FIG. 72, low-frequency and intermediate-frequency vibrations can be attenuated by resonance of the liquid column in the circumferential orifice 930 but high-frequency vibrations cannot be adequately suppressed.

It is, therefore, a fourth object of the present invention to provide a cylindrical damping apparatus which can cope with both low-frequency and high-frequency vibrations (in common with the second object).

SUMMARY OF THE INVENTION

The damping apparatus provided for the purpose of accomplishing the first object comprises an actuator such as a piezoactuator consisting of an oscillating element for transforming an electric oscillation into a mechanical oscillation and an amplifying mechanism for amplifying the resulting mechanical oscillation as interposed between two structures at least one of which is a source of vibration so that the mechanical oscillation output of the actuator is superimposed on the vibration to be controlled. As such, it may include a sensor disposed in the path of propagation of the vibration to be attenuated and a control means which, in response to the output signal from said sensor, applies an electric oscillation associated with the vibration to be attenuated.

In this damping apparatus of the invention, a sensor transforms the mechanical vibration to be attenuated into an electric oscillation and, in response to this output electric oscillation, the control means applies an electric signal associated with the vibration to be attenuated to the oscillating element. This oscillating element transforms the applied electric signal into a mechanical oscillation having a very small amplitude. This small-amplitude mechanical oscillation is amplified by the amplifying mechanism and an amplified mechanical oscillation is made available from the actuator. This output mechanical oscillation from the actuator interposed between two structures is superimposed on the target vibration in its path of propagation to produce the desired damping effect.

Since the above damping apparatus employs an oscillating element and, as associated therewith, an amplifying mechanism for amplifying its output mechanical oscillation as an actuator for cancelling the source vibration, it can be applied also to mechanical vibrations having a large amplitude. Therefore, the above apparatus can be advantageously applied as an active damping device to an automotive engine mount, for instance. Furthermore, this damping apparatus is able to control a broad spectrum of mechanical vibrations of an engine and, therefore, is able to cope with any situations inclusive of driving, idling and so on.

Moreover, the damping apparatus for accomplishing the aforesaid first object of the invention comprises a casing having two apertures, large and small, which are communicating with each other, with the small aperture being closed by a bellowsphragm (This member is shown by the numeral 264 in FIG. 22 and by the numeral 340 in FIG. 26. As shown, this member consists of an elastic tubular material, which is in its section folded into two tubs connected to each other and allows the relative axial movement of the two tubes.) and the large aperture closed by a diaphragm to constitute a fluid chamber which is filled with a liquid and an oscillating element capable of transforming an electric oscillation signal into a mechanical oscillation for driving the diaphragm, which apparatus is interposed in the path of transmission of vibrations between two structures.

In this damping apparatus, the mechanical oscillation of the diaphragm driven by the oscillating element is transferred to the bellowsphragm through the liquid medium. Since the aperture of the fluid chamber where the bellows is disposed is smaller than the aperture of the fluid chamber where the diaphragm is disposed, the amplitude of oscillation of the bellowsphragm is larger than that of the diaphragm. Thus is formed an actuator incorporating an amplifying mechanism in addition to an oscillating element. As this actuator is interposed between two structures at least one of which is a source of vibration so that the mechanical oscillation output of the actuator is superimposed on the vibration to be attenuated, a satisfactory damping effect can be obtained even when the amplitude of vibration of the source structure is large. Furthermore, because the apertures of the fluid chamber are closed by the diaphragm and bellowsphragm having high sealing effects, there occurs no leakage of the liquid medium and the amplifying mechanism can be expected to function properly.

In this connection, the oscillating element and the diaphragm are preferably disposed as follows. A preferred damping device comprises a cylinder having a top aperture, an oscillating element adapted to move vertically in response to an electric oscillation signal, with its lower end being supported by the bottom of said cylinder, a first piston guided within said cylinder and resting on said oscillation element, a diaphragm disposed to obstruct said aperture of said cylinder and in contact with the top surface of said first piston, and a flange formed with a fluid chamber having a large and a small aperture, said flange being jointed to said cylinder with the peripheral edge of said diaphragm being sandwiched therebetween.

Since the peripheral edge of the diaphragm is supported as sandwiched as above, the oscillation of the oscillating element is efficiently transmitted through the first piston to the diaphragm and the large aperture of the fluid chamber can be hermitically closed by the diaphragm.

The preferred disposition of the bellowsphragm is as follows. The bellowsphragm is disposed to obstruct the small aperture of said flange and a retainer having a vertically extending through-hole is connected to the flange to support the peripheral edge of the bellowsphragm as sandwiched between the retaineer and the flange. This damping apparatus further includes a second piston which is smaller in diameter than said first piston and this second piston is guided by a through-hole of said retainer and rests on the top center of the bellowsphragm bulging out into said through-hold.

In this arrangement, the oscillation of the bellowsphragm is effectively outputted through the second piston and, moreover, a hermetic seal of the small aperture of the liquid chamber is insured by the bellowsphragm.

In the damping apparatuses described above the fluid chamber is hermetically isolated by the bellowsphragm at top and the diaphragm at bottom. When such bellowsphragm and diaphragm are not employed, it is necessary to provide O-rings around the outer peripheries of the small-diameter and large-diameter pistons. In this type of apparatus, the liquid pressure in the fluid chamber reaches as high as several tens of kg per cm². Generally, in order to permit vertical motion of small-sized and large-sized pistons within a cylinder, the fitting clearance between the inner surface of the cylinder and the outer surface of the piston must be 10 to 20 μm when O-rings are used and 1.0–1.5 mm when a bellowsphragm is used for the small-diameter piston for dealing with a large displacement. The high-pressure fluid finds its way into this clearance to deform the O-rings, if they are used, or stretch or break the bellowsphragm, if it is used upper super-high pressure, thus failing to accomplish an effective amplification and presenting the risk of leakage from the fluid chamber.

To eliminate the above risk and enhance the effectiveness of the damping apparatuses, the inventors of the present invention have developed the following construction.

Thus, a propagation chamber, in lieu of said fluid chamber, is provided and this propagation chamber is filled with a resilient elastomer, gel-like substance or particulate material. In this arrangement, the displacement induced by the large-diameter piston under-going a mechanical oscillation is positively transferred to the small-diameter piston. Moreover, the propagation medium which is a rubber or gel, for instance, seldom find its way through the fitting clearance between the cylinder and the piston even if it could make some ingress into the clearance.

The propagation chamber may be filled with fine granules or powder in lieu of said medium. The granules are preferably spherical granules such as steel balls, ceramic balls, glass balls, etc. and are more preferably surface-coated with lubricating oil or the like beforehand. Then, when only a local portion of the aggregate mass is displaced, the behavior of that portion is effectively propagated to the rest of the mass.

It is also preferable that the diameter of granules be larger than the fitting clearance between the cylinder and the small-diameter piston. In that case, emigration of the granules through said fitting clearance can be prevented.

Moreover, said propagation chamber may be filled with a rubbery film-wrapped liquid substance, elastomer, gel-like substance or particulate material as mentioned above.

The elastomer mentioned above is preferably as elastic as possible to facilitate the transmission of displacements (for example, 10–20 kgf/cm² as modulus), while the rubbery film is preferably as rigid as possible to minimize its ingress into the clearance (for example, 50–100 kgf/cm² as modulus). In the case where the transmission medium for mechanical vibration is an elastomer or a gel-like substance, its leakage can thus been prevented more positively. In the case of the particulate material, too, its leakage can be prevented even if its grain size is smaller than the fitting clearance between said cylinder and small-sized piston. Furthermore, a liquid substance can also be employed as long as it is covered with such a rubbery film. Being elastic, the film is ready to follow the deformation of the propagation space. Moreover, even if compressed by the large-diameter piston, this film will not be tucked deeply into the fitting clearance between the cylinder and small-sized piston, although it may ingress into the clearance only to a negligible extent.

Since, the peripheral edge of said diaphragm is rigidly secured as sandwiched between the cylinder and the retaining member, the top surface of the piston and the upper surface of the holder must be in exactly the same plane. If the top surface of the piston lies above the upper surface of the retaining member, a step will be formed in the diaphragm to present a risk of breakage of the diaphragm. If, conversely, the top surface of the piston lies below the upper surface of the retaining member, a gap will be formed between the diaphragm and the top surface of the piston to adversely affect the amplification efficiency.

To solve the above problem, the inventors of the present invention have developed the following construction.

An adjusting screw which can be abutted against the lower end of the actuator such as the piezoactuator is threaded into the cylindrical holder for retaining the piezoactuator.

As this adjusting screw is rotated by a suitable means to raise or lower the actuator, the vertical position of the piston is fine-adjusted to make the diaphragm flat and level.

The above means for fine-adjusting the level of the actuator can be applied to a different type of damping device, namely the damping device comprising a cylinder having two apertures, large and small, which internally communicates with each other, with the larger aperture being closed by a piston and the smaller aperture closed by a top plate disposed on said cylinder either directly or indirectly through rubber to constitute a propagation chamber which is filled with a propagation medium such as a liquid substance, a resilient elastomer, a gel-like substance or a particulate material, and an actuator for driving said piston as disposed on the side of the piston which is opposite to said propagation chamber. In this type of damping device, the supporting rubber interposed between the top plate and the top surface of the cylinder is designed to have a predetermined spring gradient or constant and, hence, prevents decrease of the efficiency in amplifying vibrations. However, when such a damping device is mounted on a motor vehicle or the like, the top plate is usually subjected to a load as great as several hundreds of kilograms so that the supporting rubber is markedly compressed and fails to exhibit the predesigned spring gradient.

However, by rotating the adjusting screw as mentioned above to elevate or lower the actuator to raise the top plate by way of the medium in the propagation chamber and thereby allow the supporting rubber to stretch beforehand, it is possible to ensure that when the damping apparatus mounted on a motor vehicle or the like is subjected to a given load, the supporting rubber will be in a neutral or equilibrium state (the condition neither compressed nor extended).

In the damping apparatus proposed for accomplishing the aforementioned second objective of the invention, a free oscillation or a large displacement under external loading can be controlled by applying a loss resistance or by forced restriction of displacement. Thus, application of loss resistance absorbs the energy of vibration, while forced restriction of displacement prevents any increase of amplitude beyond a certain range. In this manner, low-frequency, large-amplitude vibrations such as shake vibrations in the neighborhood of 10 Hz can be quickly attenuated. In contrast, idling and other vibrations in the neighborhood of 30 Hz, trapped sounds in the neighborhood of 100 Hz, and super-transmission sounds of several hundreds of Hz are controlled by causing the actuator to generate oscillations of the same phase. Thus, vibrations of any optional amplitude can be controlled by resisting low-frequency, large-amplitude vibrations on the one hand and accepting intermediate-frequency, intermediate-amplitude vibrations and high-frequency, small amplitude vibrations on the other hand.

The above means for controlling a free oscillation or a large displacement may be a means which does not involve liquid column resonance or a means which involves liquid column resonance.

As an example of said means which does not involve liquid column resonance, utilization of a dash pot may be mentioned.

When the dash pot is employed, the damping apparatus of the invention is constructed as follows. The apparatus comprises a casing containing a liquid, a plate member disposed therein in vertically slidable relation, a center stem extending upwards from the center of said plate member, with its free end projecting out of said casing, a first flange mounted on said center stem externally of said casing, a second flange disposed substantially in parallel with said two flanges, with said actuator being disposed between said two flanges, said plate member being held in slidable contact with the inner circumferential wall of said casing either directly or indirectly through an elastic member, and said casing and said second flange being respectively connectable, either directly or indirectly, to two structures at least one of which is a source of vibration. In this apparatus, low-frequency large displacements are restricted by the reaction of intimate contact between the inner circumferential surface of said casing and the peripheral edge of said plate member. Furthermore, as a still large displacement is introduced and the plate member begins to move vertically, the liquid flows through the clearance between the peripheral edge of the plate member and the inner circumferential wall of the casing and the resulting viscosity resistance absorbs the oscillation energy. Furthermore, the displacement is effectively restricted by the solid-to-solid friction between the peripheral edge of the plate member and the inner circumferential surface of the casing which are in intimate contact with each other, the vortex of fluid generated by dislocation of the plate member, and the concomitant cavitation. On the other hand, high-frequency, small-amplitude vibrations are controlled by the actuator. It should be understood that when an elastic member is attached to the peripheral edge of the plate member, low-frequency, small-displacement vibrations can be absorbed by deformation of the elastic member.

The plate member mentioned above may be provided with a longitudinally extending through-orifice for intercommunication of the two compartments defined by the plate member and the casing. In this case, oscillations are restricted by the viscosity resistance of the fluid flowing through the orifice. There occurs no cavitation. The vortexes generated by passage of the fluid through the orifice also contributes effectively to restriction of the oscillation.

The aforesaid orifice may be obliquely disposed. In this case, the vertical motion of the plate member stirs the fluid to provide additional resistance to oscillations.

As an alternative means for controlling a free oscillation or a large displacement, a stirring paddle can be used in lieu of said dash pot. As the stirring paddle moves vertically within the fluid, the fluid is stirred and vortexes of fluid are generated, and these effects join forces with the viscosity resistance of the fluid to help restrict the oscillation.

As a further means for controlling a free oscillation or a large displacement, a casing filled with an elastomer can be employed. The elastomer is preferably a high-damping material such as polynorbornene rubber. Vibrations can also be attenuated by the high spring gradient of the elastomer and the energy loss due to exothermic deformation of the elastomer under vibration as well.

As still another mean for controlling said free oscillation or large displacement, where can be employed an apparatus including a plate member disposed in the casing and an abutting means for limiting the vertical and lateral strokes of said plate member within a certain range. In that case, vibrations are restricted by the loss coefficient of the material and the limitation of stroke of the plate member. Moreover, when an elastic member is disposed in the position of abutment of said plate member and the casing, vibrations can be move effectively restricted by the high spring gradient of the elastic member.

As a further means for controlling a free oscillation or a large displacement, there may be employed an apparatus including a casing made of an electrically conductive material and a plate member fitted with magnet means along its peripheral edge as disposed in vertically slidable relation within said casing. Then, motion of the plate member generates an induced current between the magnet means and the casing, yielding a magnetic force which restricts the motion of the plate member and creating the eddy current loss.

The damping apparatus according to this invention may be constituted as follows.

The apparatus comprises a casing having a fluid chamber defined by a resilient wall and a diaphragm, a divider for dividing said fluid chamber into two compartments communicating with each other through a circumferentially extending orifice formed in said divider, a first flange disposed at a first end on the resilient wall side of said casing, a second flange disposed substantially in parallel with said first flange, with said actuator being disposed between said two flanges, and a second end of said casing which lies on the opposite side of said first end and said second flange being respectively connectable, either directly or indirectly, to two structures at least one of which is a source of vibration.

In this damping apparatus, shake vibrations are controlled by the viscosity resistance of the fluid which acts when the fluid passes through the orifice in the plate member or the clearance between the peripheral edge of the plate and the inner surface of the cup, while high-frequency, small amplitude vibrations such as vibrations due to idling are controlled by the actuator.

A damping apparatus of this kind may also be constituted as follows. Thus, the apparatus comprises a casing consisting of an elastic wall and a cup-shaped wall, a cylinder disposed in the center of said elastic wall, a piston disposed therein in slidable relation, a bottomed holder disposed below the cylinder and extending into said casing, an actuator such as a piezoactuator disposed within said holder, with its lower end being abutted against the bottom of the holder while the top end of the piston being abutted against a top flange either directly or indirectly through an intervening object, said U-shaped cup and said top flange having respective connectors for connection to two structures at least one of which is a source of vibration, a diaphragm disposed within said casing to define a fluid chamber between it and said cup, with said holder projecting into said fluid chamber, and an annular plate disposed in said holder, with the peripheral edge of said plate being held in intimate contact with the inner circumferential surface of said cup, and said plate having an orifice extending in a vertical direction or in a circumferential direction or alternatively a clearance for passage of the fluid being provided between a seal rubber disposed along the peripheral edge of said plate and the inner circumferential surface of the cup. The diaphragm may be omitted and, instead, the top surface of the fluid may be left free or be exposed to the resilient wall. In this damping apparatus, too, shake vibrations are controlled by the viscosity resistance which acts when the fluid passes through the orifice in the plate or the clearance between the peripheral edge of the plate and the inner surface of the cup, while high-frequency, small-amplitude vibrations such as idling vibrations are controlled by the actuator.

In the damping apparatus, the space in said casing may be filled with air or elastic rubber instead of providing said fluid chamber. In this case, shake vibrations can be absorbed by the loss resistance of the air or elastic rubber in the casing instead of exploitation of viscosity resistance.

The actuator to be employed in this invention is not limited to a piezoactuator by may be a magnetic strain, solenoid, liquid pressure or other type of actuator.

The damping device proposed for accomplishing the aforesaid third object of the invention comprises at least two cylinders concentrically disposed and an actuator for generating a mechanical oscillation as interposed between adjacent cylinders.

Taking an engine mount as an example, the damping apparatus according to this invention is used with the cylinder on the outermost side being fixedly connected to the engine which is a source of vibration and the cylinder on the innermost side being fixed connected to the vehicle body which is a supporting member. Conversely, the cylinder on the outermost side and that the inner most side may be connected to the body and the vehicle, respectively. Thus, either the cylinder on the outermost side or the cylinder on the innermost side supports the engine. In the arrangement of at least two cylinders concentrically disposed, an actuator is interposed between adjacent cylinders, and as the actuator is driven in normal phase or reverse phase in response to vibration of the engine, the oscillation of the actuator is superimposed on the vibration of the engine to produce a satisfactory damping effect.

Thus, this apparatus is a cylindrical damping apparatus comprising at least two cylinders concentrically disposed and an actuator for generating a mechanical oscillation as interposed between adjacent cylinders, and functions on the active damping principle.

In the situation where the actuator alone is not sufficient to provide a necessary oscillation amplitude, an oscillating unit comprising such an actuator and an amplifying mechanism for amplifying the mechanical oscillation of the actuator is interposed between the adjacent cylinders. The amplifying mechanism may be a mechanical one such as linkage, lever, wedge, or the like, a liquid pressure device using a sealed liquid, or a combination thereof.

Since, in this arrangement, the actuator oscillation is amplified by said amplifying mechanism, large vibrations of the source of vibration can be cancelled by the oscillating unit. Therefore, this apparatus can be advantageously applied, as an active damping device, to the engine mount of a motor vehicle, for instance. Furthermore, since the apparatus exhibits a damping effect faithfully following the varying mechanical vibrations of the engine, it can cope with a whole spectrum of vibrations from low-frequency, large-amplitude vibrations such as shakes during driving and idling vibrations to high-frequency, small-amplitude vibrations.

To back up the function of the actuator, an elastic material such as rubber is interposed between the adjacent cylinders. In that case, even if the actuator becomes faulty, the elastic member helps maintain the damping effect. Moreover, the actuator need not be caused to bear an unnecessary load (such as a large static load).

A fluid-seal elastic structure in which adjacent cylinders are bridged by an elastic material to form a couple of fluid compartments radially juxtaposed, with the two fluid compartments communicating with each other through orifice means, may be interposed between the adjacent cylinders. In this arrangement, the damping function of the actuator and the damping function of the fluid-seal elastic structure can be complimentarily utilized to attenuate vibrations in a broad frequency range with high efficiency.

The cylinders other than those on the outermost and innermost sides may be circumferentially segmented. Even in such an arrangement, the respective segments can support the corresponding ends of the actuator, oscillating unit or elastic member.

For the purpose of accomplishing the aforesaid fourth object of the invention, an actuator unit is built into the conventional cylindrical damping device.

In this arrangement, high-frequency vibrations are actively controlled by the mechanical oscillation of the actuator unit on the one hand and low-frequency vibrations are controlled by resonance of the liquid column or the viscosity resistance of the fluid.

More particularly, this damping apparatus comprises a double cylinder structure consisting of an inner cylinder and an outer cylinder which are bridged by supporting rubber to constitute a couple of fluid compartments internally of said outer cylinder on both sides of said supporting rubber, with said fluid compartments communicating with each other through an orifice, a jacket cylinder for holding an actuator unit disposed externally of said outer cylinder in concentric relation therewith, and an actuator unit disposed between said jacket cylinder and said outer cylinder. In this arrangement, low-frequency oscillations are attenuated by said orifice while the positive oscillation of said actuator unit is super-imposed on high-frequency vibrations to produce a satisfactory damping effect on both low-frequency and high-frequency vibrations.

As a modification, this damping apparatus may comprise a double cylinder structure consisting of an inner cylinder and an outer cylinder which are bridged by supporting rubber and a dash pot operatively associated with relative displacement of the two cylinders as disposed in the space between said two cylinders, a jacket cylinder for holding an actuator unit as disposed externally of said outer cylinder in concentric relation therewith, and an actuator disposed between said jacket cylinder and said outer cylinder. In this arrangement, low-frequency vibrations are attenuated by the viscosity resistance of the dash pot.

As a further modification, this damping apparatus comprises a double cylinder structure consisting of an inner cylinder and an outer cylinder, an actuator unit interposed between said two cylinders through resilient elastomer, with an output end of said actuator unit being abutted against either of said cylinders, and a dash pot operatively associated with relative displacement of said two cylinders as interposed between the two cylinders. In this arrangement, high-frequency vibrations are cancelled by the actuator unit while low-frequency vibrations are attenuated by the dash pot.

Throughout the four inventions of this application, the actuator in general can be applied. A piezo-actuator is merely an example. Thus the term 'actuator' is used here to mean any of the actuators utilizing any of electric strain, magnetic strain, liquid pressure, air pressure, solenoid motor, electric fluid, magnetic fluid and so on.

BRIEF DESCRIPTION OF THE DRAWINGS

FIG. 41 is a sectional view showing a damping apparatus as an embodiment of the third invention;

FIGS. 41 (A) through 50 each is sectional view showing another embodiment;

DETAILED DESCRIPTION OF THE PREFERRED EMBODIMENTS

Figure 1:
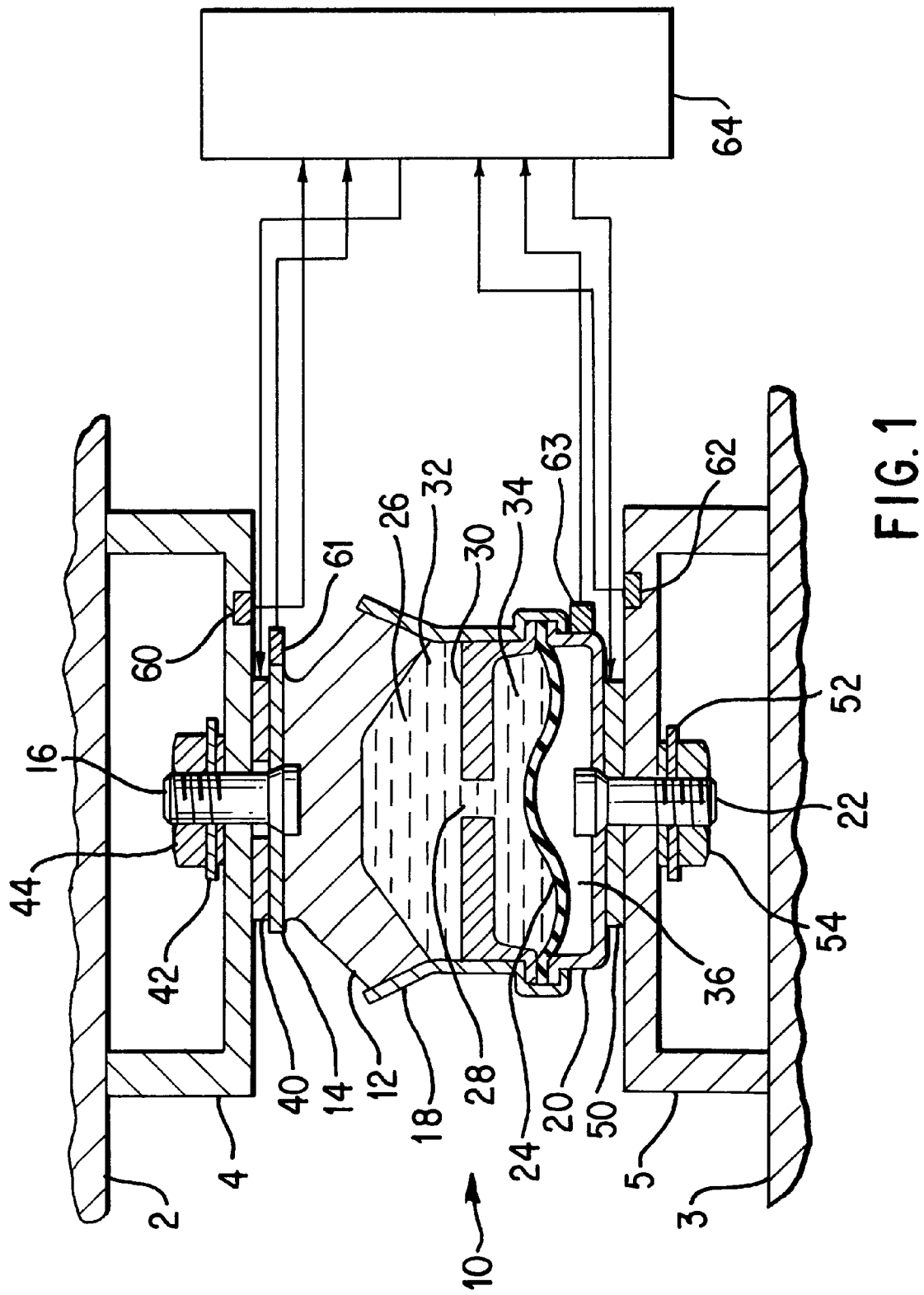
FIG. 1 is a longitudinal section view showing a damping apparatus embodying the principles of the first invention which is used in combination with the conventional fluid damping engine mount for a motor vehicle.

FIG. 1 is a sectional elevation view showing a vibration damping apparatus embodying the principles of the present invention, which indicates the application of active damping to the conventional automotive fluid damping type engine mount.

Rigidly secured to the underside of an engine 2 and the upper surface of a vehicle body 3, respectively, are mounting jigs 4 and 5 which are commonly used for supporting a fluid damping engine mount 10 for the purpose of precluding propagation of the mechanical vibrations of the engine 2 to the vehicle body 3.

The construction of such fluid damping engine mount 10 is as follows.

Secured to the upper surface of a rubber base 12 having a concave underside configuration is a plate metal 14, to which a bolt 16 extending upwards is affixed as shown. A downwardly extending generally cylindrical metal jacket 18 is secured to the lower tapered periphery of said rubber base 12. The lower end portion of the metal jacket 18 is affixed to the open end of a bottomed support 20 having a generally bracket-like sectional configuration. Further secured to this bottomed support 20 is a downwardly extending bolt 22. A resilient member 24 in the shape of a membrane is sandwiched between the jacket 18 and the support 20 to close the top aperture of the support 20. A fluid 26 is sealed into a space defined by and between the rubber base 12 and the resilient member 24. This space is divided by a rigid horizontal divider 30 having an orifice 28 into two compartments 32 and 34. The peripheral edge of this divider 30 is sandwiched, together with the peripheral edge of the elastic resilient member 24, between the metal jacket 18 and the support 20 and secured in position. The length and sectional area of said orifice 28 are appropriately chosen to allow free circulation of the fluid 26 between the two compartments 32, 34. The space between the support 20 and the elastic member 24 is an air chamber 36.

The fluid damping engine mount 10 described above is interposed between the engine 2 and the vehicle body 3 in the following manner.

The top part of the engine mount 10 is rigidly secured to the mounting jig 4 of the engine side by means of said bolt 16 secured to the plate metal 14, a washer 42 and a nut 44, with an actuator 40 serially interposed between the mounting jig 4 and the plate metal 14 on the rubber base 12. The lower part of the engine mount 10 is secured to the mounting jig 5 on the body side by means of said bolt 22 rigidly secured to the support 20, a washer 52 and a nut 54, with another actuator 50 serially interposed between the bottom surface of the support 20 and the mounting jig 5. As will be described in detail hereinafter, each of these actuators 40, 50 comprises an oscillating element, which is a stack of piezoelectric ceramic wafers, and an amplifying mechanism for increasing the amplitude of its mechanical oscillation. Acceleration sensors 60, 61 are affixed to the mounting jig 4 on the engine side and the plate metal 14 on the rubber base 12, respectively, while acceleration sensors 62, 63 are affixed to the mounting jig 5 on the body side and the support 20. The outputs of these acceleration sensors 60, 61, 62, 63 are fed to an actuator controller 64, which applies electric oscillations proportional to the outputs of the respective sensors 60, 61, 62, 63 to the actuators 40, 50.

Figure 2:
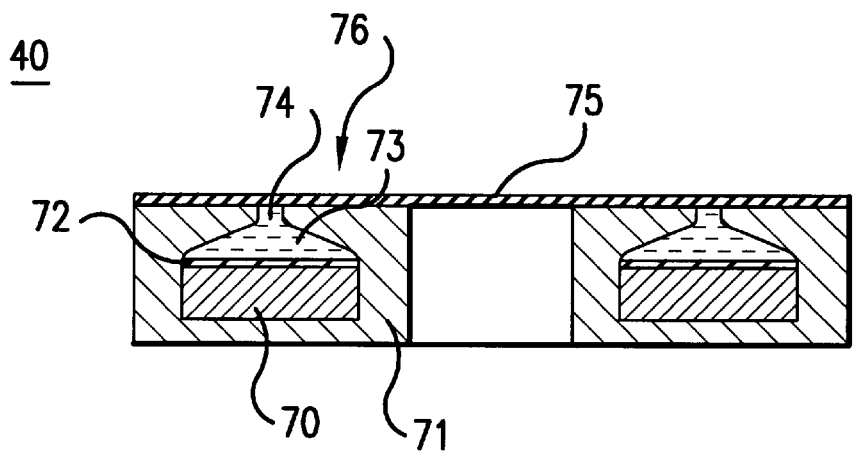
FIG. 2 is a longitudinal section view illustrating the construction of the actuator shown in FIG. 1.

FIG. 2 is a longitudinal section view showing the actuator 40 in detail. Of course, the same construction may apply to the other actuator 50.

Embedded in a plate housing 71 is an oscillating element 70 comprising a vertical stack of piezoelectric ceramic wafers. A seal rubber 72 is affixed to the top of this oscillating element 70 so that the fluid filled into a fluid chamber 73 located above is not allowed to contact the oscillating element 70. However, the fluid chamber 73 is equal to the oscillating element 70 in sectional area at its base and decreases gradually in sectional area toward its top end. The fluid chamber 73 has a top aperture 74 which is closed by a rubber diaphragm 75 affixed to the top of the housing 71 so as to seal off the fluid within the fluid chamber 73. As the oscillating element 70 expands in a vertical direction, the fluid in the fluid chamber 73 transmits the resultant pressure upwards according to Pascal's law so that the rubber diaphragm 75 bulges out in the position corresponding to the top aperture 74 of the fluid chamber 73. Here is formed an amplifying mechanism 76 which amplifies the mechanical oscillation of the oscillating element 70. The relative mechanical oscillation between the engine 2 and the plate metal 14 as detected by the acceleration sensors 60, 61 is cancelled by the mechanical oscillation of the actuator 40 controlled by the actuator controller 64. Thus, when the engine 2 sags in the process of its vibrations, the height of bulging of the rubber diaphragm 75 is decreased by the same amount, while the height of bulging of the rubber diaphragm 75 is increased when the engine 2 rises. It should be understood that the fluid chamber 73 may be impregnated with non-compressible rubber in lieu of said fluid. In that case, a functionally equivalent actuator 40 can be constructed without using the seal rubber 73 and rubber diaphragm 75. For the control of the actuator 50, the relative mechanical oscillations picked up by the acceleration sensors 62, 63 on the body side 3 are utilized.

In the above arrangement, the thickness of the actuator 40 that is required for a fluid damping engine mount 10 having a diameter of 10 cm and a height of about 10 cm, for instance, can be reduced to, say, not more than 1 cm. The oscillating element 70 has a sufficiently high load bearing capacity of about 350 kgf per $cm^2$ sectional area for both the static and dynamic loads of the engine 2. Furthermore, this actuator can cope with mechanical vibrations over a broad frequency range of 5 Hz to 500 Hz.

Modified forms of said actuator 40 are now described with reference to FIGS. 3 through 14.

Figure 3:
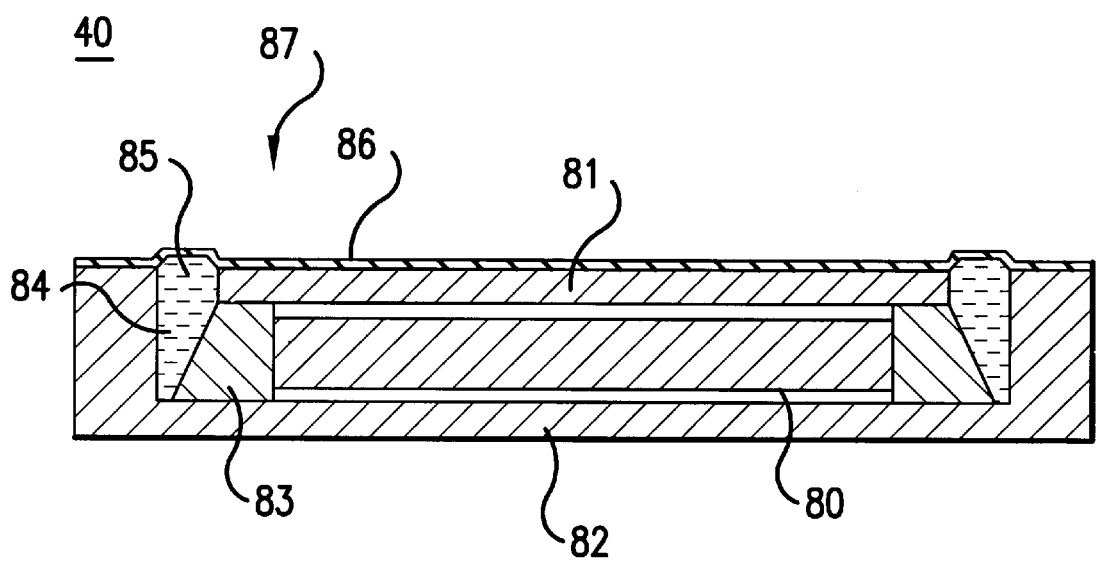
FIGS. 3 through 14 each is a longitudinal section view showing another actuator.

In the actuator 40 shown in FIG. 3, an oscillating element 80 comprising a transverse stack of piezoelectric ceramic wafers is embedded in a dish-shaped housing 82 provided with a cover 81. Each of the lateral end faces of the oscillating element 80 is abutted against a piston 83 which is laterally slidable. Externally disposed of this piston 83 is an upwardly extending fluid chamber 84, with its small top aperture 85 being closed by a rubber diaphragm 86 affixed to the top of the housing 82 to hermetically seal off the fluid chamber 84. As the oscillating element 80 expands in a lateral direction, the fluid within the fluid chamber 84 transmits the resultant pressure upwards via the piston 83 so that the rubber diaphragm 86 bulges in the position corresponding to the top aperture 85 of the fluid chamber 84. Thus, an amplifying mechanism 87 depending on the area ratio of the external end face of the piston 83 to the top aperture 85 of the fluid chamber 84 is formed for amplifying the mechanical oscillation of the oscillating element 80. It should be understood that the rubber diaphragm 86 need not be provided if the fluid chamber 84 is impregnated with non-compressible rubber.

The actuators 40 shown in FIGS. 4 through 11 incorporate a pantagraph type amplifying mechanism.

Figure 4:
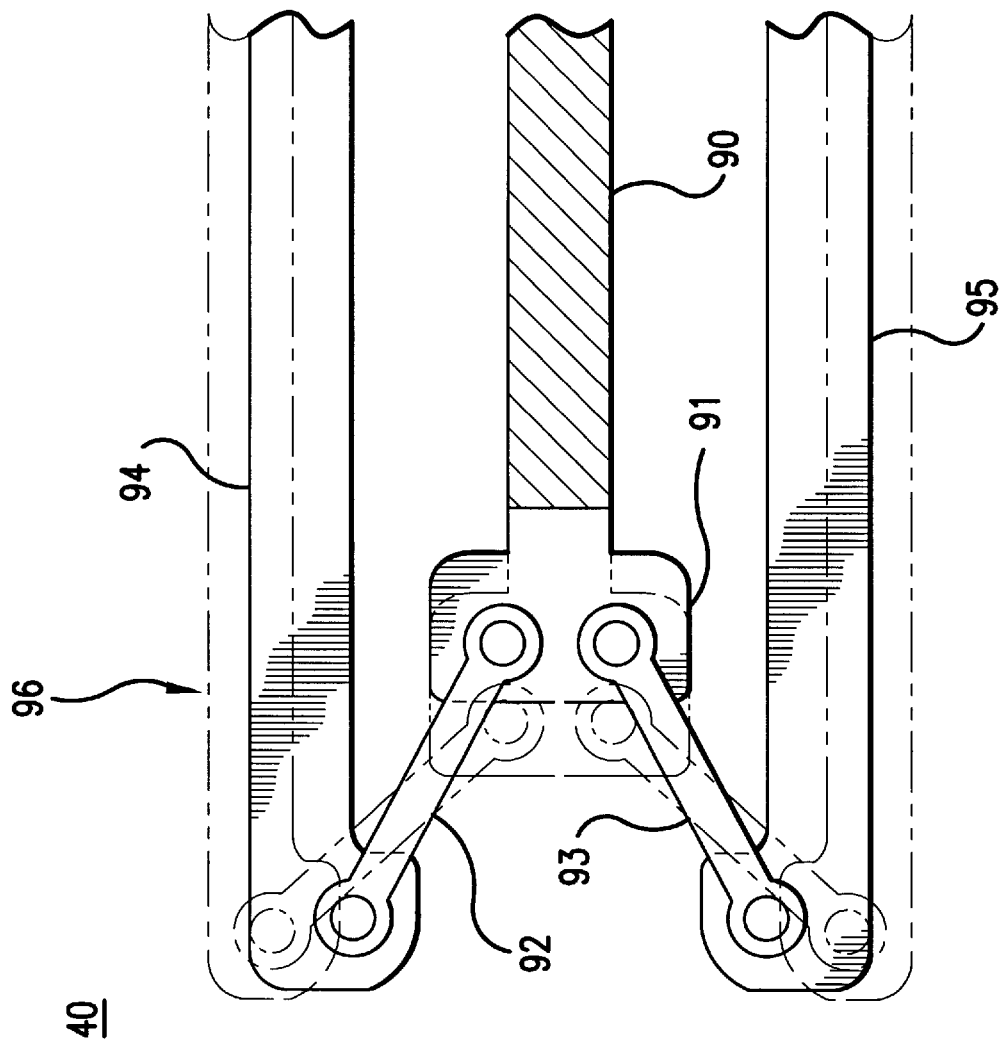

In the actuator 40 shown in FIG. 4, a connecting member 91 is affixed to either end of an oscillating element 90 comprising a transverse stack of piezoelectric ceramic wafers and each of two arms 92, 93, upper and lower, is pivotably connected at one end thereof to this connecting remember 91. The other end of the upper arm 92 is pivotally connected to the end of an upper plate 94, while the end of the lower arm 93 is pivotally connected to the end of a lower plate 93. Here is formed an amplifying mechanism 96 for amplifying the mechanical oscillation of the oscillating element 80.

Figure 5:
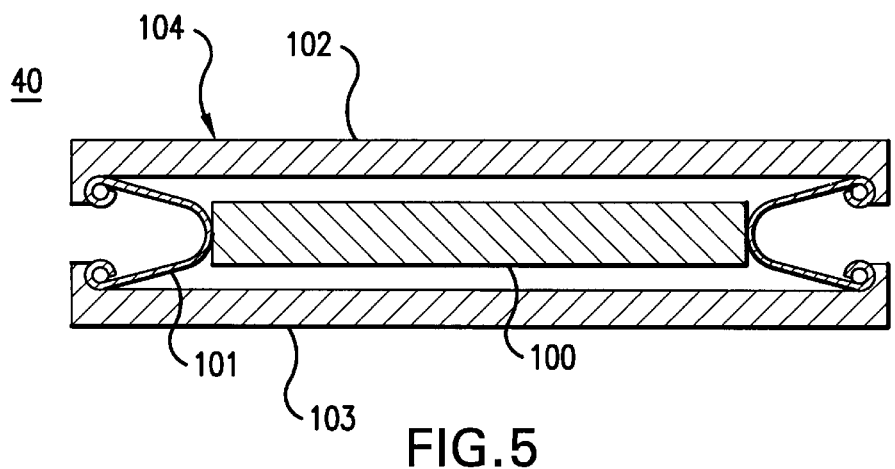

In the actuator 40 shown in FIG. 5, the apex of a U-shaped plate spring 101 is abutted against either lateral end face of an oscillating element 100 comprising a transverse stack of piezoelectric ceramic wafers and both ends of this plate spring 101 are pivotally connected to one end of an upper plate 102 and the corresponding end of a lower plate 103, thus forming an amplifying mechanism 104.

Figure 6:
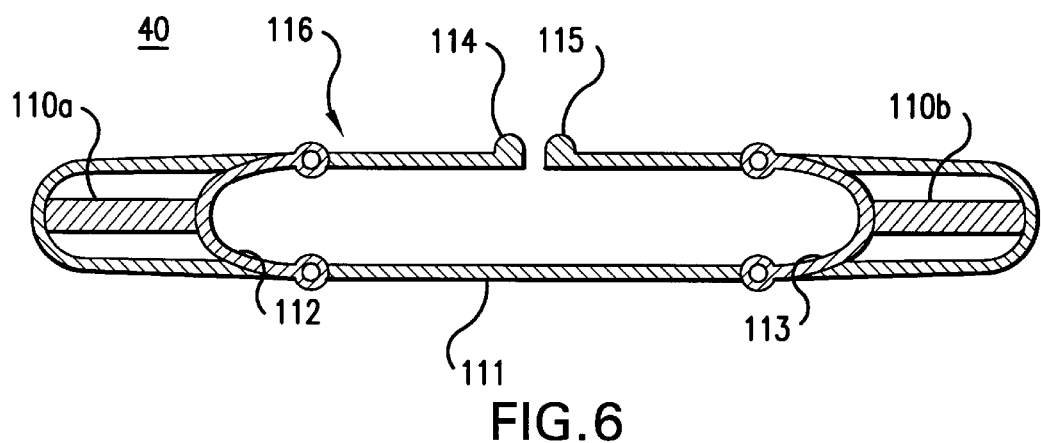

The actuator 40 shown in FIG. 6 comprises a couple of oscillating element 110a, 110b each of which is a transverse stack of piezoelectric ceramic wafers. The left oscillating element 110a is supported between the inner surface of a left bend of a resilient supporting member 111 aperture at top and having a flattened O sectional configuration and the outer surface of the apex portion of a plate spring 112 bent in the shape of U with both ends supported by said supporting member 111. The right oscillating element 110b is supported between the inner surface of a right bend of said supporting member 111 and the outer surface at the apex of a U-shaped plate spring 113 similar to said plate spring 112. Thus is formed an amplifying mechanism 116 with the ends 114, 115 of the supporting member 111 serving as points of action on the mounting jig 4 on the engine side.

Figure 7:
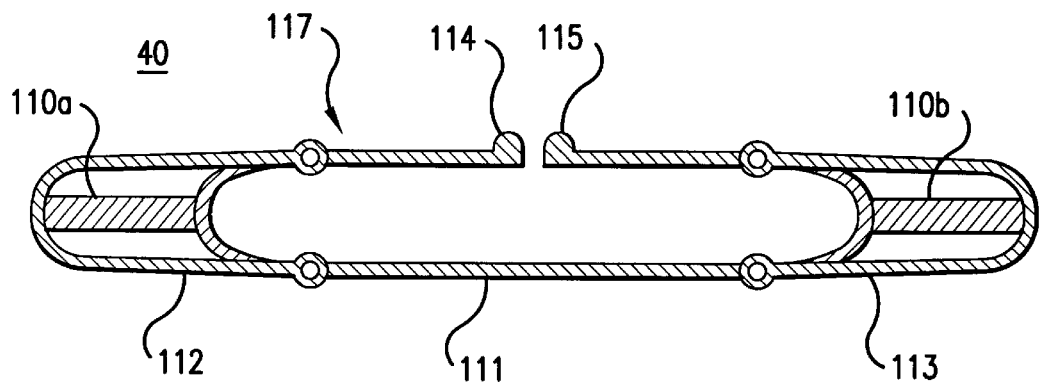

The mode of connection between the supporting member 111 and the plate spring 112 may be modified as shown in FIG. 7. In the actuator 40 shown in FIG. 7, the left oscillating element 110a is supported between the outer surface of the left bend of the supporting member 111 and the inner surface of the apex of the plate spring 112, while the right oscillating element 110b is supported between the outer surface of the right bend of the supporting member 111 and the inner surface of the apex of the plate spring 113, thus forming an amplifying mechanism 117 with the ends 114, 115 of the supporting member 111 serving as points of action.

Figure 8:
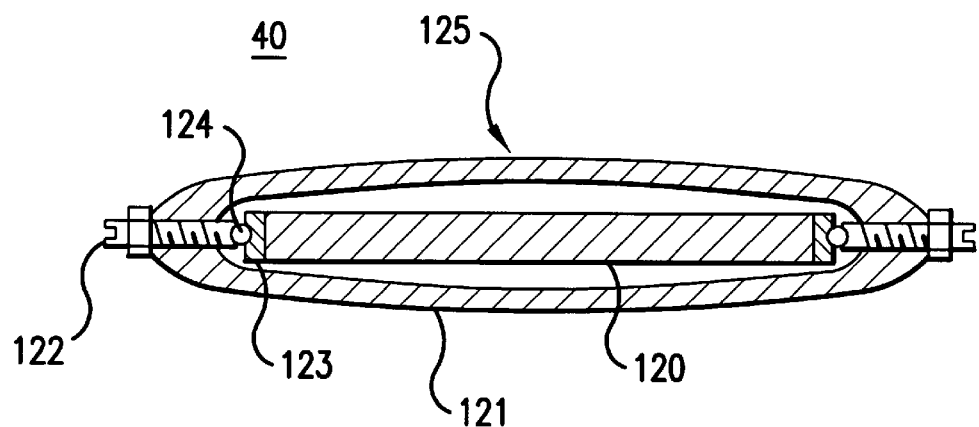

In the actuator 40 shown in FIG. 8, an oscillating element 120 comprising a transverse stack of piezoelectric ceramic wafers is disposed within a resilient supporting member 121 having a flattened O sectional configuration. A preload screw 122 is threaded inwardly from each of the lateral bends of said supporting member 121 and the leading end of this screw is abutted against the outer surface of a platen 123 affixed to the corresponding end face of the oscillating element 120 through a ball 124. Here is an amplifying mechanism 125 for amplifying the mechanical oscillation of the oscillating element 120. It should be understood, however, that, unlike in the embodiments illustrated in FIGS. 4 through 7, the actuator 40 diminishes in thickness as the oscillating element 120 expands.

Figure 9:
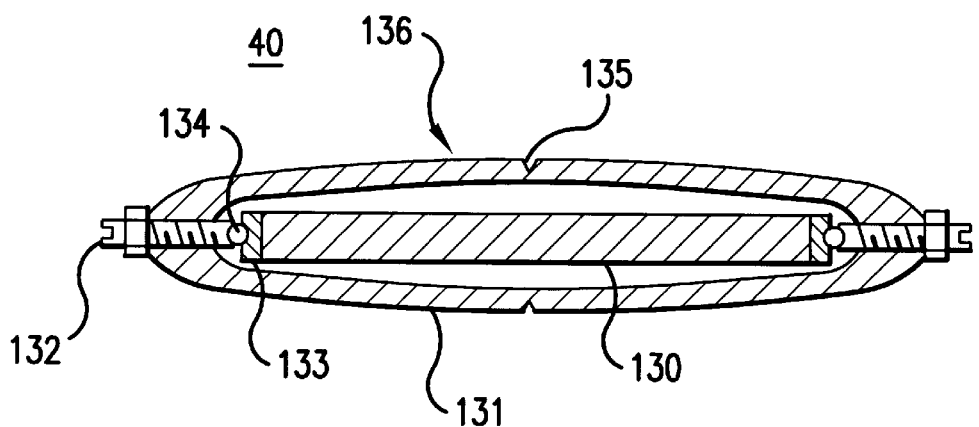

The actuator 40 shown in FIG. 9 is similar to that shown in FIG. 8 in that it also comprises an oscillating element 130 within a resilient supporting member 131 and a preload screw 132 threaded at each of the lateral bends of said supporting member 131, with the leading end of said screw 132 being abutted against the corresponding end face of said oscillating element 130 through a platen 133 and a ball 134. However, this actuator 40 is different from that of FIG. 8 in that the upper and lower arms of the supporting member 131 are each provided with a niche 135 for facilitating the local deflection. This feature contributes to a smooth action of the amplifying mechanism 136.

Figure 10:
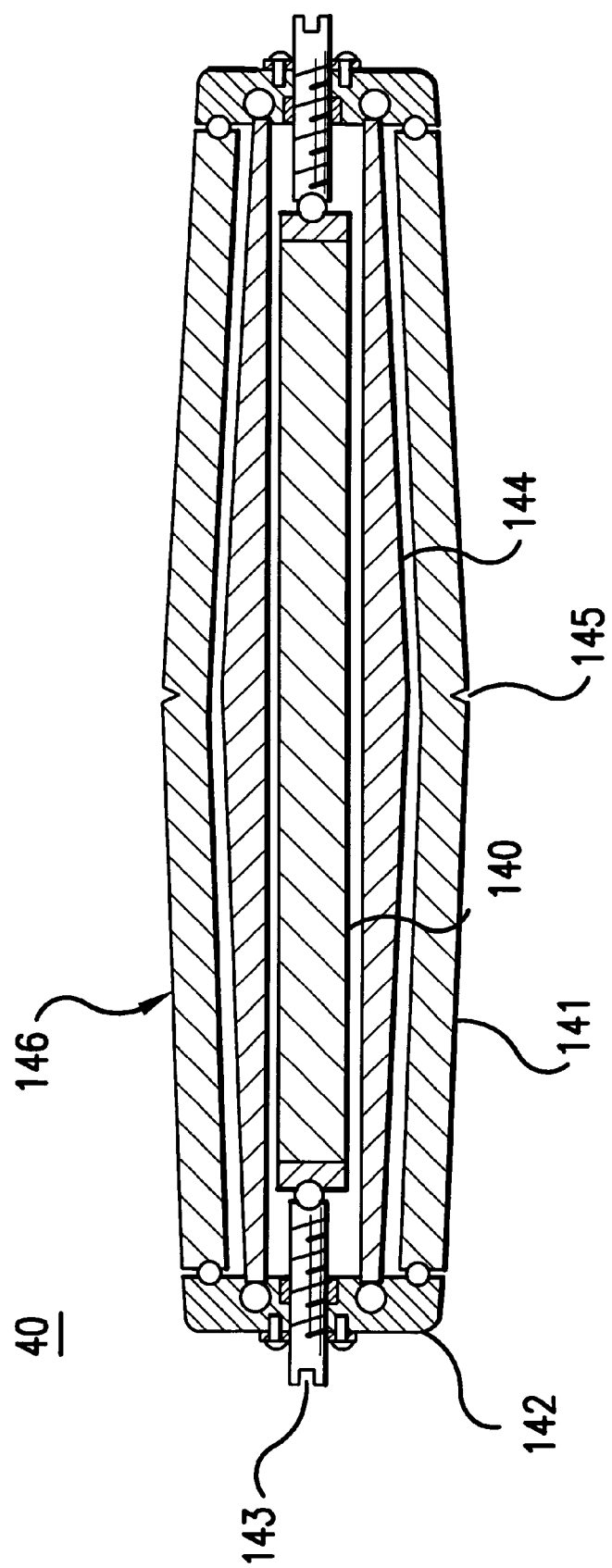

In the actuator 40 shown in FIG. 10, an oscillating element 140 comprising a transverse stack of piezoelectric ceramic wafers is disposed within a resilient supporting member consisting of upper and lower plates 141, 141 and sides plates 142, 142 and having a flat rectangular cross-section. Each end of said oscillating element 140 is supported by a preload screw 143 threaded into the corresponding side plate 142. Furthermore, a rigid stay 144 is disposed along and on either side of the oscillating element 140, with both ends of the stay 144 being pivotally connected to the side plates 142, 142. In addition, the upper and lower plates 141 are each provided with a niche 145 in a substantially median position for facilitating deflection of the actuator. Thus, as the oscillating element 140 expands, a compressive force acts on the upper and lower plates 141, 141 to deform them and increase the thickness of the actuator 40. Here is formed an amplifying mechanism 146 for amplifying the mechanical oscillation of the oscillating element 140.

Figure 11:
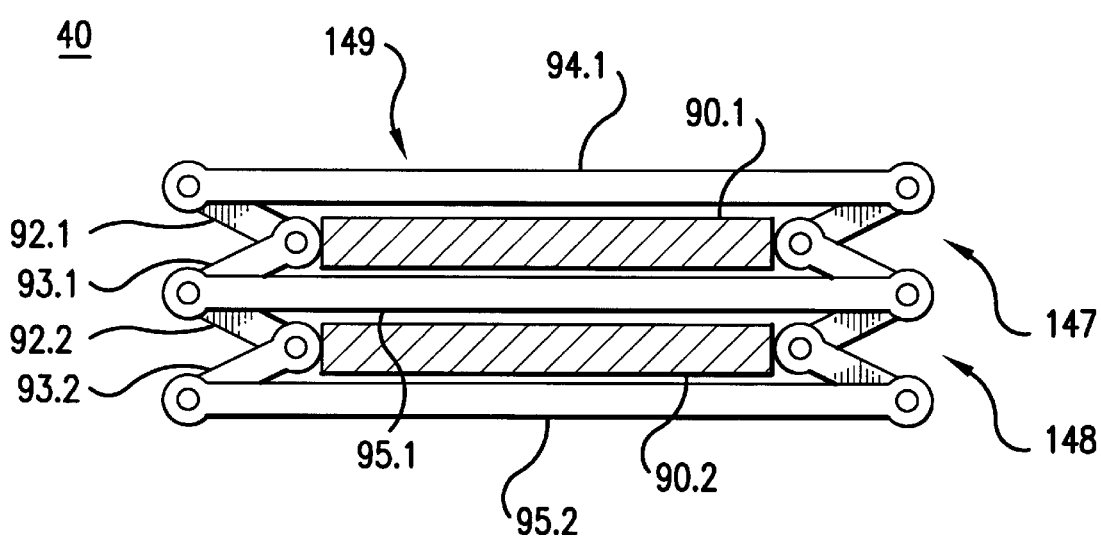

The actuator 40 illustrated in FIG. 11 is an assemblage of two units of the amplifying mechanism 96 shown in FIG. 4 as interconnected in two stages. The upper unit 147 comprises an oscillating element 90.1, an upper plate 94.1, a lower plate 95.1, an upper arm 92.1 and a lower arm 93.1. The lower unit 148 comprises an oscillating element 90.2, an upper plate 95.1, a lower plate 95.2, an upper arm 92.2 and a lower arm 93.2. Thus, the lower plate 95.1 of the upper unit 147 doubles as the upper plate of the lower unit. This amplifying mechanism 149 insures an amplification factor twice as large as that of the mechanism illustrated in FIG. 4. It is also possible to further increase the amplification factor by using an assemblage of 3 or more such amplifying units.

Figure 12:
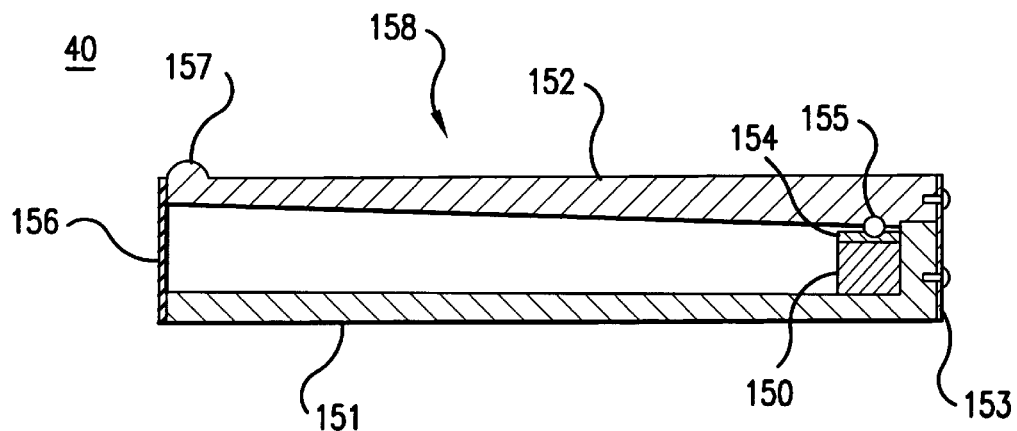
Figure 13:
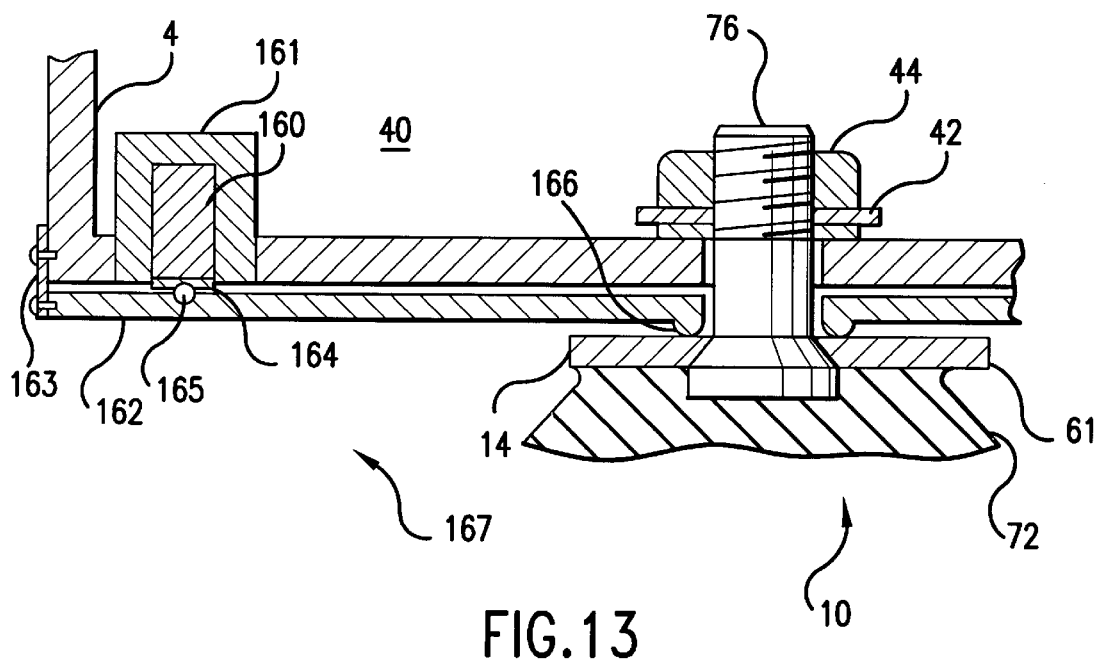
Figure 14:
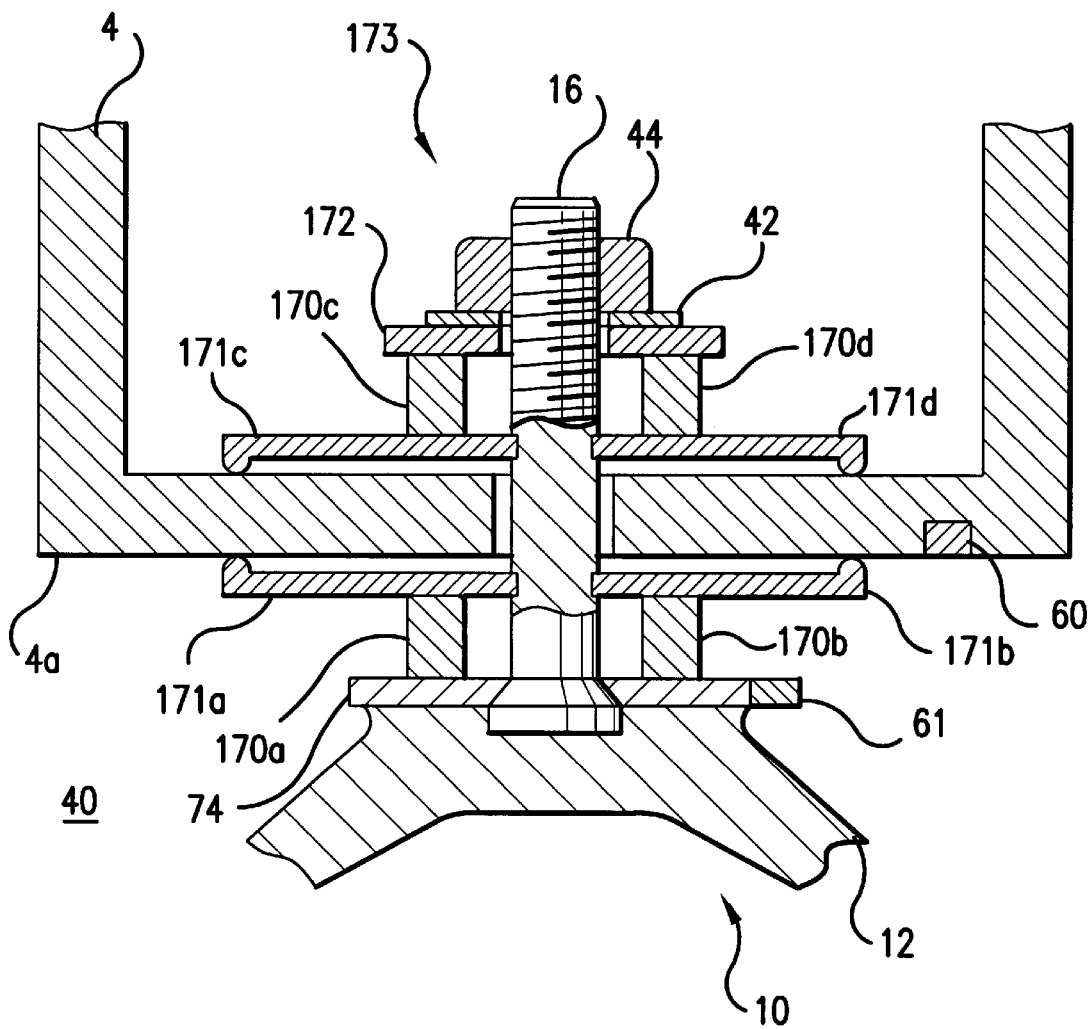

In the actuators 40 shown in FIGS. 12 through 14, the principle of leverage is utilized in the amplification mechanism. Thus, the actuator 40 shown in FIG. 12 employing an oscillating element 150 comprising a vertical stack of piezoelectric ceramic wafers. This oscillating element 150 is disposed inwardly of the bend of an L-shaped supporting member 151, with a horizontal arm 152 thereof being disposed above the oscillating element 150. The base of the horizontal arm 152 is connected to the rising portion of the supporting member 151 at its end face by way of a plate spring 153 and is abutted against a platen 154 affixed to the upper end face of the oscillating element 150 through a ball 155. The free end of the horizontal section of the L-shaped supporting member 151 and the free end of the horizontal arm 152 are interconnected by a rubber membrane 156. Thus is formed an amplifying mechanism 158 with the forward end 157 of the horizontal arm 152 constituting a point of action on the mounting jig 4 of the engine side. The rubber membrane 156 serves to pull back the forward end 157 of the horizontal arm which has been shifted upwards. In the actuator 40 illustrated in FIG. 13, an oscillating element 160 comprising a vertical stack of piezoelectric ceramic wafers is embedded in a recessed portion 161 formed in the peripheral region of the underside of the mounting jig 4 on the engine side. Disposed below the oscillating element 160 is a horizontal arm 162. This horizontal arm 162 extends from the edge of the underside of the mounting jig 4 to the vicinity of the bolt 16 fixed to the plate metal 14 at the top of the engine mount 10. The base of the horizontal arm 162 is connected, at the end face thereof, to the lateral side of the mounting jig 4 via a plate spring 163 and is abutted against the underside of a platen 164 affixed to the lower end face of the oscillating element 160 through a ball 165. Thus is formed an amplifying mechanism 167 with the forward end 166 of the horizontal arm 162 constituting a point of action on the plate metal 14 of the engine mount 10.

The actuator 40 illustrated in FIG. 14 employs four oscillating elements 170a, 170b, 170c and 170d each comprising a vertical stack of piezoelectric ceramic wafers. Thus, four arms 171a, 171b, 171c and 171d extend from the bolt 16 affixed to the plate metal 14 at the top of the engine mount 10. However, two lower arms 171a, 171b are disposed between the bottom plate 4a of the mounting jig 4 and the plate metal 14 and the remaining two lower arms 171c, 171d are disposed at a level above the bottom plate 4a of the mounting jig 4. Furthermore, the lower arms 171*a*, 171*b* support lower oscillating elements 170*a*, 170*b* in proximity with their respective bases in cooperation with the plate metal 14 and are abutted at their respective free ends against the underside of the mounting jig bottom plate 4*a*. The upper arms 171*c*, 171*d* support upper oscillating elements 170*c*, 170*d* in proximity with their respective bases in cooperating with a retaining plate 172 and are abutted at their respective free ends against the upper surface of the mounting jig bottom plate 4*a*. The retaining plate 172 is secured in position, together with a washer 42, by a nut 44 threaded onto the bolt 16. Here is formed an amplifying mechanism 173 for amplifying the mechanical oscillations of the oscillating elements 170*a*, 170*b*, 170*c* and 170*d*. When the mounting jig 4 sags in the process of engine vibration, the forward ends of all the arms 171*a*, 171*b*, 171*c* and 171*d* are depressed, with the result that the two lower oscillating elements 170*a*, 170*b* contract while the two oscillating elements 170*c* and 70*d* expand. When the mounting jig 4 rises, the oscillating elements 170*a*, 170*b*, 170*c* and 170*d* move in the reverse direction.

Figure 15:
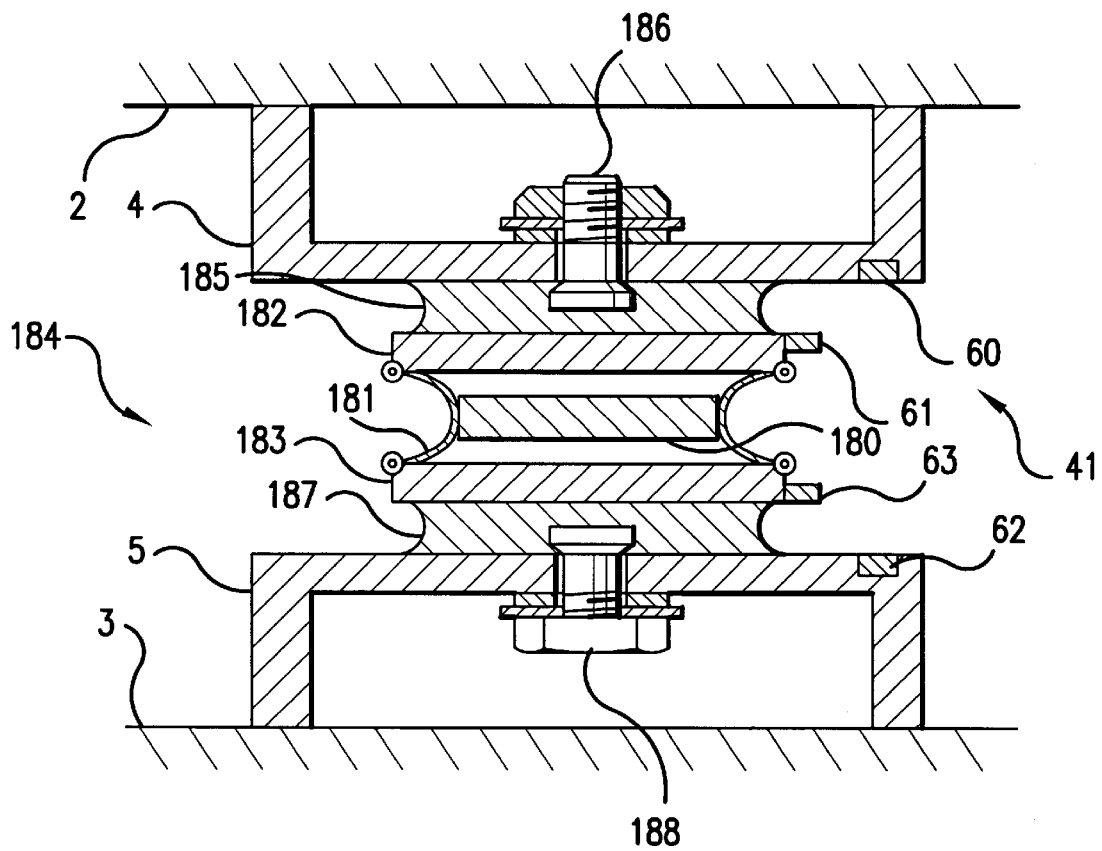
FIG. 15 is a longitudinal section view showing another damping apparatus embodying the principles of the invention which is used in lieu of the conventional fluid damping engine mount for a motor vehicle.

Whereas the foregoing embodiments are relevant to the application of the active damping principle of the invention to the conventional fluid damping type engine mount 10, the embodiments shown in FIG. 15 et seq. pertain to embodiments which can be used in lieu of the fluid damping engine mount 10.

The actuator 41 of the damping apparatus illustrated in FIG. 15 is such that, as in the actuator of FIG. 5, the apex of a U-shaped plate spring 18 is abutted against either lateral end of an oscillating element 180 comprising a transverse stack of piezoelectric ceramic wafers and both ends of said plate spring 181 are pivotally connected to the end of the upper plate 182 and the end of the lower plate 183 to constitute an amplifying mechanism 184 for the oscillating element 180. A flat damping rubber 185 is affixed to the top surface of the upper plate 182 and a bolt 186 whose head is embedded in this damping rubber 185 extends upwards and fastens the top of this damping device to the mounting jig 4 secured fixedly to the underside of the engine 2. A similar flat damping rubber 187 is affixed to the underside of the lower plate 183 and a bolt 188 whose head is embedded in this damping rubber 187 extends downwards and fastens the bottom of this damping apparatus to the mounting jig 5 secured fixedly to the upper surface of the vehicle body 3.

Acceleration sensors 60, 61 are affixed to the mounting jig 4 on the engine side and the top plate 182 of an actuator 41, respectively, and similarly acceleration sensors 62, 63 are affixed to the mounting jig 5 on the body side and the under plate 183 of the actuator 41. The outputs of these acceleration sensors 60, 61, 62 and 63 are applied to an actuator controller 64 as in the case of FIG. 1 and this controller 6 applies an electric oscillation to the oscillating element 180 of the actuator 41 according to the outputs of said acceleration sensors 60, 61, 62. 63.

Figure 16:
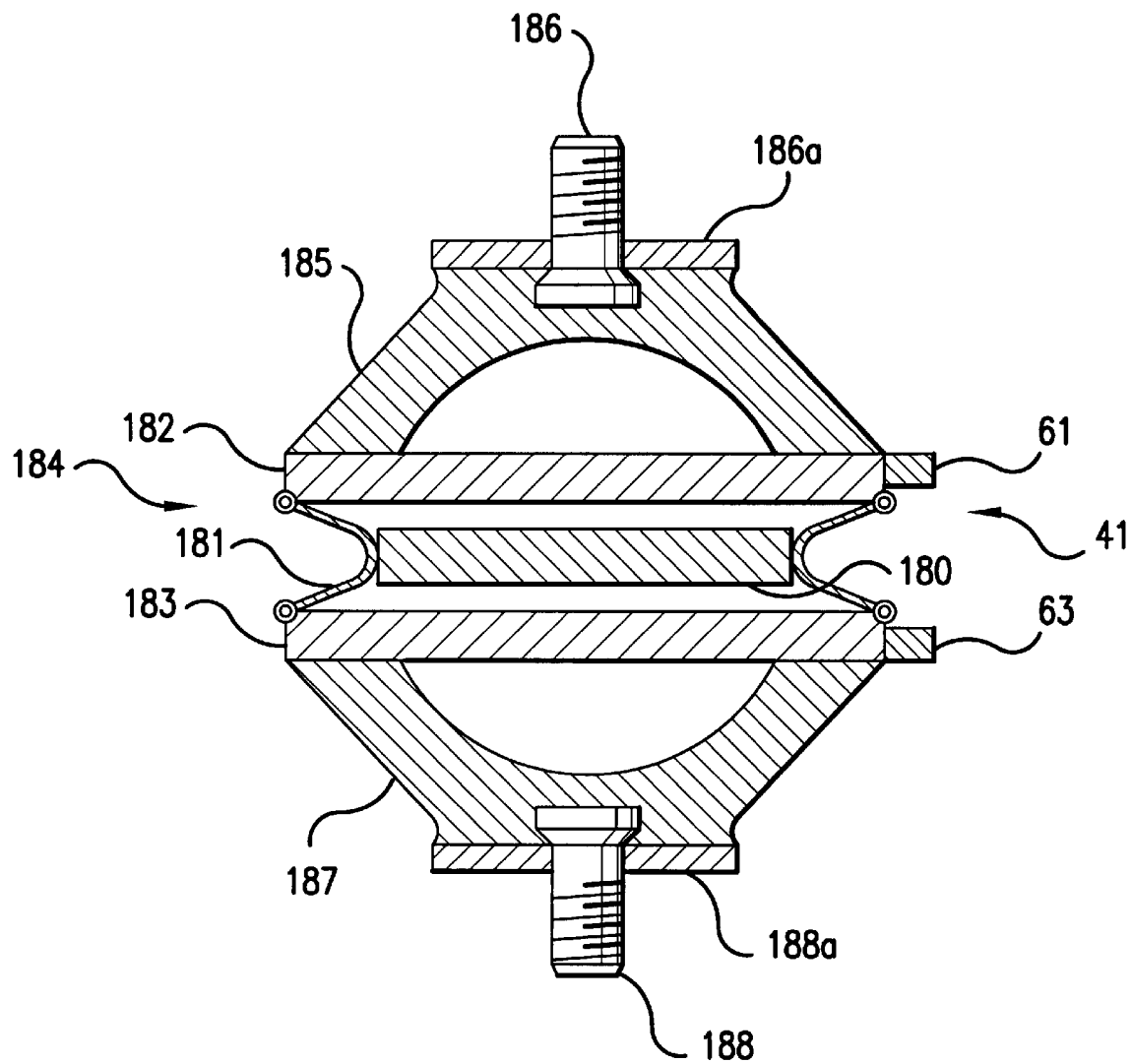
FIG. 16 is a longitudinal section view showing a modification of the apparatus shown in FIG. 15.
Figure 17:
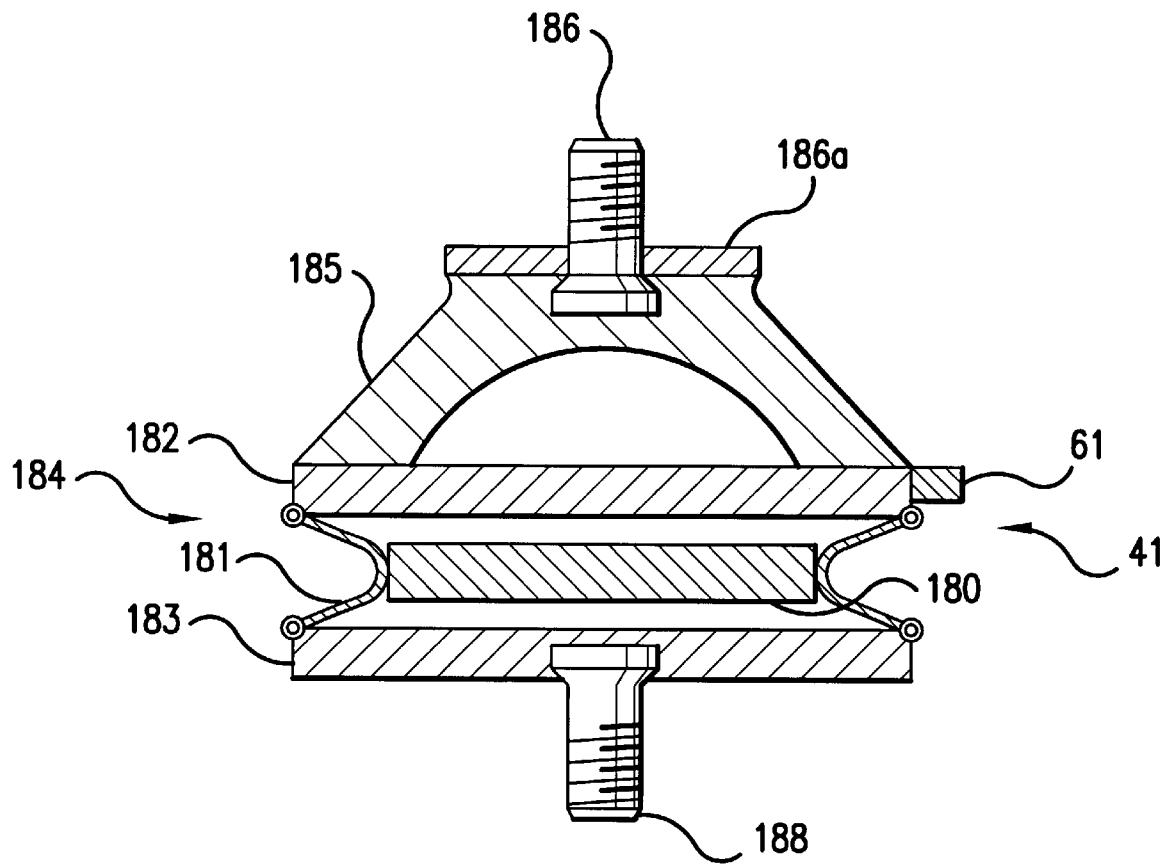
FIG. 17 is a longitudinal section view showing still another modification.

Modifications of the above damping apparatus are illustrated in FIGS. 16 and 17.

The damping apparatus of FIG. 16 employs a different configuration for the upper and lower damping rubber members 185, 187. Thus, a plate metal 186*a* is affixed to the upper surface of a damping rubber member 185 which is downwardly recessed and a bolt 186 extending upwards is securely attached to this metal 186*a*. Similarly, a plate metal 188*a* is affixed to the under side of the damping rubber material 187 which is upwardly recessed and a downwardly extending bolt 188 is secured to this metal 188*a*. The remainder of the construction of this damping apparatus is similar to that of the apparatus shown in FIG. 15.

In the damping apparatus illustrated in FIG. 17, the lower damping rubber is omitted and the bolt 188 is directly secured to the lower plate 183 of the actuator 41. The configuration of the upper damping rubber member 185 is similar to that shown in FIG. 16 and the bolt 186 is secured to the plate metal 186*a*. However, whereas an acceleration sensor is mounted on the lower plate 183 of the actuator 41 in the apparatuses illustrated in FIGS. 15 and 16, this sensor may be omitted in the apparatus of FIG. 17.

Figure 18:
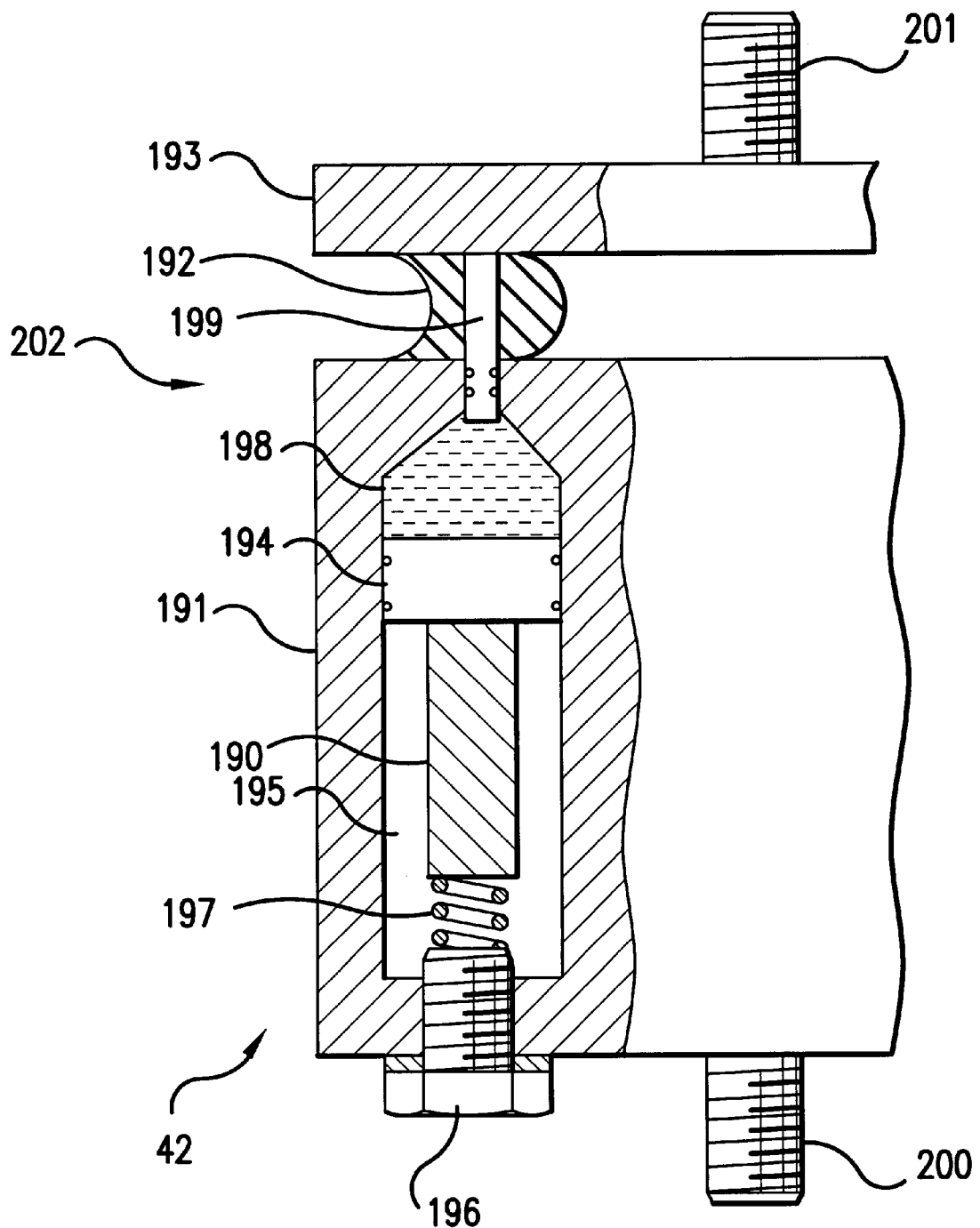
FIG. 18 is a partially exploded side elevation view showing still another damping apparatus of the invention which is used in lieu of the conventional fluid damping engine mount for a motor vehicle.

The damping apparatus illustrated in FIG. 18 also finds application in a motor vehicle as a substitute for the fluid damping engine mount 10 and as in the embodiments shown in FIGS. 2 and 3, employs an actuator 42 according to Pascal's law.

This damping apparatus comprises a housing 191 for accommodating an oscillating element 190 comprising a vertical stack of piezoelectric ceramic wafers and a top plate 193 connected to the top of the housing 191 by way of the resilient rubber member 192. The oscillating element 190 is installed in an elongated cavity within the housing 191. Inserted into this cavity is a piston 194 in vertically slidable relation via O-rings or the like, with an actuator chamber 195 for housing said oscillating element 190 being defined beneath the piston 194. Below this actuator chamber 195 is a preload bolt 196 threaded upwards through the housing to bias the oscillating element 190 against the underside of the piston 194. A cavity defined above the piston 194 is filled with a fluid to provide a fluid chamber 198. This fluid chamber 198 is equal in sectional area to the piston 194 at the base but diminishes in sectional area towards its top end. A piston 199 ingresses into the fluid chamber 198 from its top aperture and reaches the underside of the top plate 193 through the connecting rubber member 192. The housing 191 is provided with a downwardly extending bolt 200 for connection to the mounting jig 5 on the body side and an upwardly extending bolt 201 for connection to the mounting jig 4 on the engine side. As the oscillating element 190 expands, the fluid pressure in the fluid chamber 198 is transmitted upwards to raise the top plate 193 via the piston 199 on an exaggerated scale. Thus is formed an amplifying mechanism 202 for amplifying the mechanical oscillation of the oscillating element 190.

Figure 19:
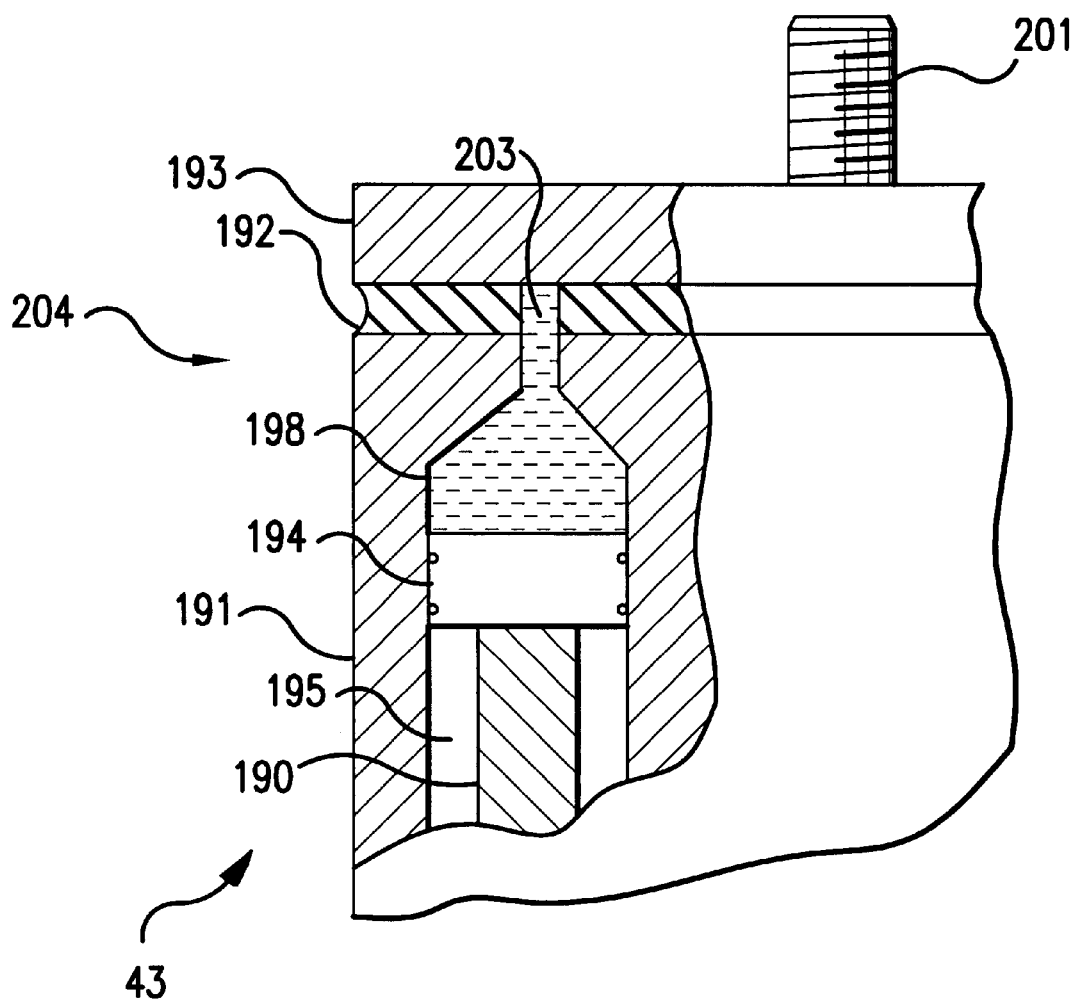
FIG. 19 is a partially exploded side elevation view showing a modification of the apparatus shown in FIG. 18.

It may be so arranged, as shown in FIG. 19, that, with the piston 199 omitted, a small-lumen duct 203 extending from the upper end of the fluid chamber 198 to the underside of the top plate 193 is installed within the connecting rubber member 192 to constitute an amplifying mechanism 204. The remainder of the construction of this actuator 43 is similar to that shown in FIG. 18 and is, therefore, not described in further detail.

Figure 20:
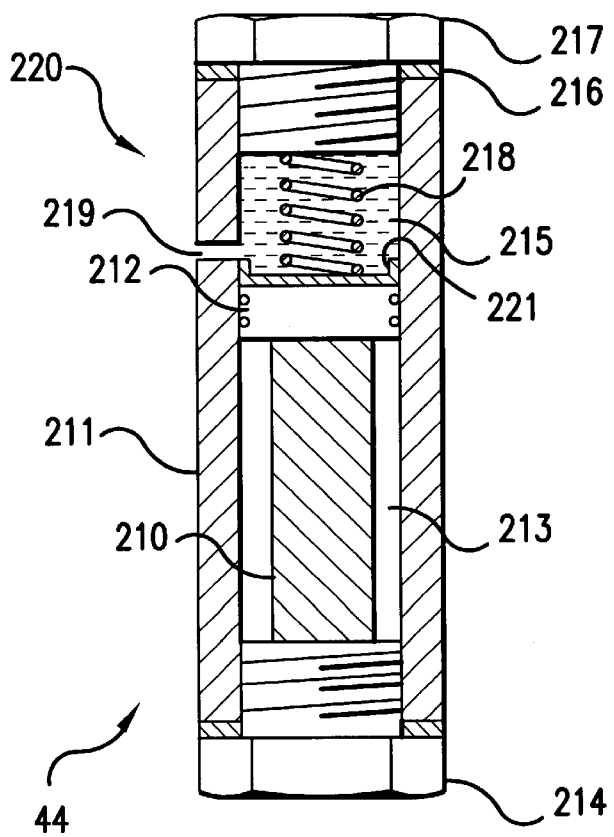
FIG. 20 is a longitudinal section view showing a unit type cylinder as a modification of the apparatuses shown in FIGS. 18 and 19.

FIG. 20 is a longitudinal section view showing a unit type cylinder which can be employed in the damping apparatuses shown in the preceding two views.

Here, an oscillating element 210 comprising a vertical stack of piezoelectric ceramic wafers is accommodated in a cylinder 211. Guided into this cylinder 211 is a piston 212 in a vertically slidable relation via O-rings or the like, with an actuator chamber 213 for housing the oscillating element 210 being defined below. Furthermore, an upwardly extending bolt 214 is threaded into the lower end of the cylinder 211 to bias the oscillator element 210 within the actuator chamber 213 against the underside of the piston 212. A plenum above the piston 212 is filled with a fluid to provide a fluid chamber 215. At the top of the cylinder 211, the upper end of the fluid chamber 215 is hermetically sealed with a seal member 216 and a preload bolt 217. The preload bolt 217 biases the piston 212 via a spring 218 in a downward direction. The cylinder 211 is provided with a small orifice 219 alongside the fluid chamber 215. This orifice 219 is either plugged with a small piston or covered over the surface of exposure with a rubber element. Thus formed is an actuator having an amplifying mechanism 220 for amplifying the mechanical oscillation of the oscillating element 210 in proportion to the area ratio of the piston 212 to the orifice 219. Incidentally, the top surface of the piston 212 is covered with a seal rubber 221 for preventing entry of the fluid into the actuator chamber 213.

Figure 21:
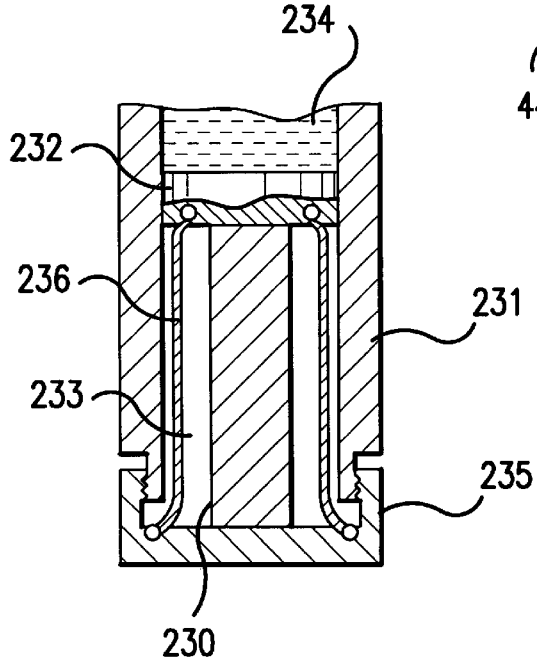
FIG. 21 is a partial longitudinal section view showing a modification of the unit type cylinder illustrated in FIG. 20.

An alternative sealing structure for preventing the contact of the oscillating element with the fluid in a unit type cylinder is shown in FIG. 21.

Thus, a piston 232 is guided into a cylinder 231 through O-rings or the like in vertically slidable relation, with an actuator chamber 233 for housing an oscillating element 230 being formed below, while a fluid chamber 234 is formed above the piston 232. Threaded onto the lower end of the cylinder 231 is a cover member 235 which biases the oscillating element 230 against the underside of the piston 232. Moreover, within the actuator chamber 233, a seal rubber membrane 236 extends from the underside of the piston 232 to the inner surface of the cover member 235. Therefore, even if the fluid within the fluid chamber 234 leaks out through the periphery of the piston 232 into the actuator chamber 233, the oscillating element 230 is not wetted, thus being protected against degradation.

By using single amplifying mechanisms in a plurality of stages, not being limited to the relationship of FIGS. 4 and 11, a still larger amplification factor can be implemented. Furthermore, while the damping apparatuses so far described are all intended to prevent transmission of the mechanical vibration of the engine to the vehicle body, the principles of the present invention can be applied with equal success to the prevention or control of propagation of mechanical vibrations between any two structures at least one of which is a source of vibration.

Figure 22:
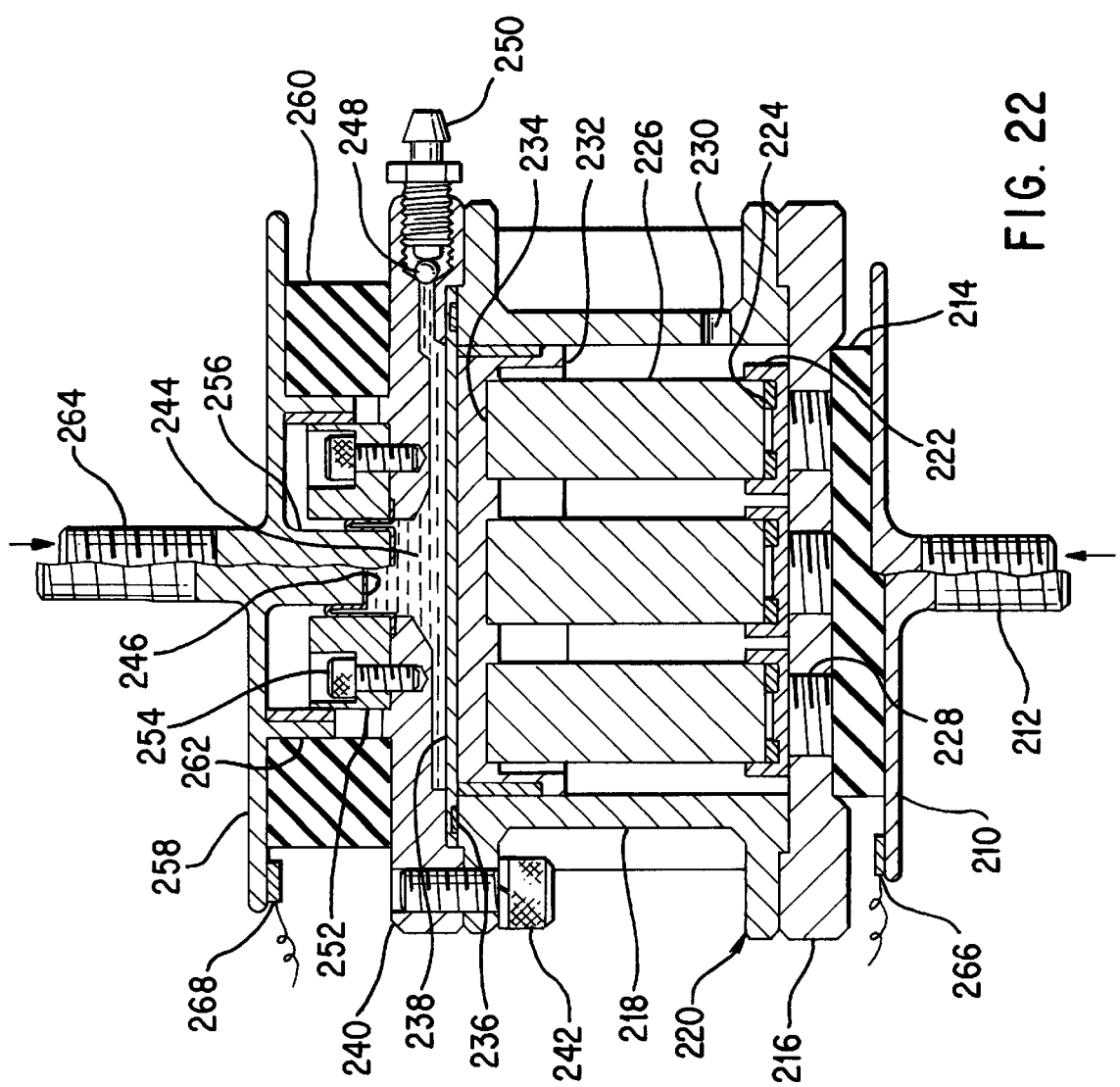
FIG. 22 is a longitudinal section view showing still another damping apparatus embodying the principles of the invention, with the left half of the view representing the unloaded condition and the right half representing the loaded condition.

FIG. 22 is a longitudinal section view showing still another damping apparatus embodying the principles of the first invention which is used in lieu of the conventional fluid damping engine mount in a motor vehicle, with the left half representing the unloaded condition and the right half representing the loaded condition.

Extending downwards from the center of a plate base 210 is a threaded portion 212 for connection to the body of a motor vehicle. A cylinder 220 consisting of a flange portion 216 and a drum-shaped portion 218 and having a top aperture is installed on the base 210 through a rubber plate 214. In the bottom of the cylinder 220, a total of seven bar-shaped oscillating elements 226 which expand and contract vertically in response to electric oscillation signals are supported through respective spacers 222 and metal washers 224. Each of these oscillating elements 226 comprises a stack of piezoelectric ceramic wafers. Threaded into the flange portion 216 are setscrews 228 for use in adjusting the height of said oscillating elements 226, with the tip of each setscrew 228 being abutted against the underside of the corresponding spacer 222. The lateral side of the drum portion 218 is formed with an outlet 230 for the lead wires for the oscillating elements 226. Guided into the cylinder 220 is a large-diameter piston 232, the underside of which is formed with seven recesses 234 for accepting the top ends of the corresponding oscillating elements 226.

A diaphragm 238 covering the top aperture of the cylinder 220 and contacting the upper surface of the large-diameter piston 232 is installed via a metal ring 236. Further disposed on the diaphragm 238 is a flange 240 which is connected to the cylinder 220 by a bolt 242 so that the peripheral edge of the diaphragm 238 and the metal ring 236 are sandwiched and secured in position between the cylinder 220 and the flange 240. The flange 240 is formed with a fluid chamber 244 extending through the upper and lower sides thereof, with the aperture on the lower side being larger than the aperture on the upper side. The larger aperture on the lower side which has a diameter substantially equal to the inner diameter of the cylinder 220 is hermetically closed by said diaphragm 238, while the smaller aperture on the upper side is hermetically closed by a bellowsphragm 246. The tubular passageway extending laterally from the fluid chamber 244 within the flange 240 is closed by a ball 248 and a breed screw 250 so that the fluid chamber 244 can be selectively evacuated and filled with the fluid via the breed screw 250.

A retainer 252 having a vertically-extending through-hole is disposed centrally on the flange 240 and this retainer 252 is connected to the flange 240 by bolts 254 so that the peripheral edge of the bellowsphragm 246 is sandwiched in position between the flange 240 and the retainer 252. The diameter of the throughhole of the retainer 252 is substantially equal to the diameter of the top aperture of the flange 240. The bellowsphragm 246 bulges out in the center thereof into the through-hole of the retainer 252 and a small-diameter piston 256 is positioned on the central bulge of the bellowsphragm 246. The top portion of the small-diameter piston 256 has a horizontally extending flange 256 which is supported by the flange 240 through a rubber ring 260. Extending downward from the underside of the flange 258 is a guide means 262 fitted along the periphery of the retainer 252 and a threaded portion 264 is projecting upwards from the center of the flange 258 for connection to the engine of a motor vehicle.

In addition, acceleration sensors 266, 268 are mounted on the base 210 and the flange 258, respectively. It should be understood that either one of these acceleration sensors may be omitted.

By means of the damping device of this embodiment, the engine can be supported without allowing its mechanical vibrations to be transmitted to the vehicle body as explained below.

The outputs of the acceleration sensors 266, 268 are fed to an actuator controller not shown and this controller applies an electric oscillation signal corresponding to the magnitude of outputs of acceleration sensors 266, 268 to the oscillating element 226. The oscillating elements 266 given this electrical oscillation signal expand or contract by minuscular amounts in the vertical direction. These small mechanical oscillations of the oscillating elements 226 are transmitted to the fluid sealed into the fluid chamber 244 through the large-diameter piston 232 and the diaphragm 238. Since this oscillation of the fluid causes the bellowsphragm 246 to oscillate on an exaggerated scale and, hence, drives the small-diameter piston with an increased amplitude. In this manner, as the engine is depressed, the small-diameter piston 256 responsive to the outputs of acceleration sensors 266, 268 is depressed by the same amount as the amount of depression of the engine, while the small-diameter piston 256 is raised similarly as the engine rises.

Each oscillation element 226, as shown, has a diameter of 20 mm and a length of 50 mm. The whole device is compact, with an outer diameter of 130 mm and a distance under no load of 120 mm between the base 210 and the flange 258. Assuming, now, that the area ratio of the lower aperture to the upper aperture of the fluid chamber 244 is 30:1, for instance, the oscillation amplitude of the oscillating elements 226 is increased 30-fold. Therefore, if one selects oscillating elements 226 giving a dimensional chamber of 0.7 μm per mm length, it is possible to sufficiently cancel an engine vibration with an amplitude of ±0.5 mm by setting the element length at only 50 mm. Furthermore, each of the oscillating elements 226 has a sufficiently high load-bearing capacity of about 350 kgf per cm² sectional area against both the static and dynamic loads of the engine. In addition, it is able to deal with mechanical vibrations over a broad frequency range of 5 Hz to 500 Hz.

Furthermore, since said large-diameter piston 232 is positioned on oscillating elements 226 within the cylinder 220 and said diaphragm 238 and said flange 240 defining the fluid chamber 244 are superimposed in succession, with the peripheral edge of the diaphragm 238 being supported by and between the cylinder 220 and the flange 240, the oscillations of the oscillating elements 226 are efficiently transmitted through the large-diameter piston 232 to the diaphragm 238 and, at the same time, an effective sealing of the large aperture of the fluid chamber 244 by the diagram 238 is insured. Moreover, since the flange 240 and the overlying retainer 252 support the peripheral edge of the bellowsphragm 246 securely in position and the small-diameter piston 256 rests on the upper surface of the belows 246 bulging out centrally into the throughhole of the retainer 252, the oscillating of the bellowsphragm 246 is efficiently transmitted out through the small-diameter piston 256 and, at the same time, a very effective sealing of the small aperture of the fluid chamber 244 by the bellowsphragm 246 is insured. Therefore, the damping action will not be adversely affected by leaks from the fluid chamber 244, nor does it happen that the oscillating elements 226 are wetted by the leaking fluid and degraded.

Figure 23:
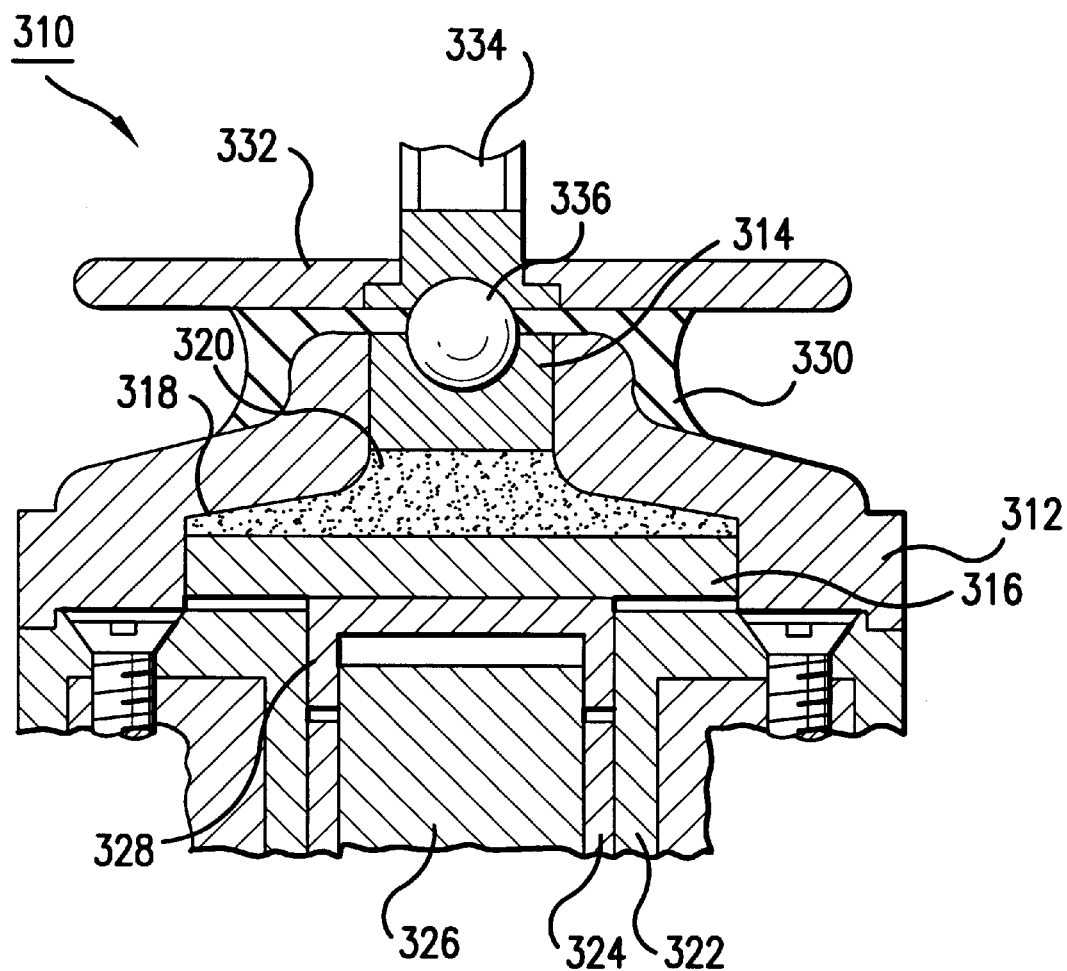
FIG. 23 is a sectional view showing the cardinal part of still another damping apparatus embodying the principles of the invention.

A further embodiment of the first invention is illustrated in FIG. 23. This damping device includes a cylinder 312 having a small to aperture and a large bottom aperture. Installed in these apertures are a small-diameter piston 314 and a large-diameter piston 316, respectively, each in vertically slidable relation with respect to the apertures. Defined by these pistons is a propagation chamber 318 in which a rubbery elastomeric substance 320 is disposed as a medium for amplification propagation and transmission of the mechanical oscillation of a piezoactuator to be described hereinafter. In lieu of this resilient elastomer 320, there may optionally be incorporated a gel-like substance or a particulate substance.

The cylinder 312 has a cylindrical lower segment in which a cylindrical holder 322 having a bottom (not shown) is closely fitted. Disposed in this holder 322 through a sleeve 324 is a piezoactuator 326. The bottom, not shown, of the holder 322 constitutes a means for supporting the piezoactuator 326. Guided above the sleeve 324 within the holder 322 is an actuator cap 328 which is abutted against the underside of the large-diameter piston 316.

A top flange 332 affixed to the upper surface of the cylinder 312 through a supporting rubber 330 has a central threaded projection 334 for connection to the engine of a motor vehicle. Indicated by 336 is a ball disposed in a spherically recessed top of the small-diameter piston 314, with the apex of the ball being abutted against the underside of the top flange 332. The oscillation of the small-diameter piston 314 is transmitted through the ball 336 to said top flange 332 and threaded projection 334.

It should be understood that the installation position of the apparatus of FIG. 23 may be vertically inverted.

Figure 24:
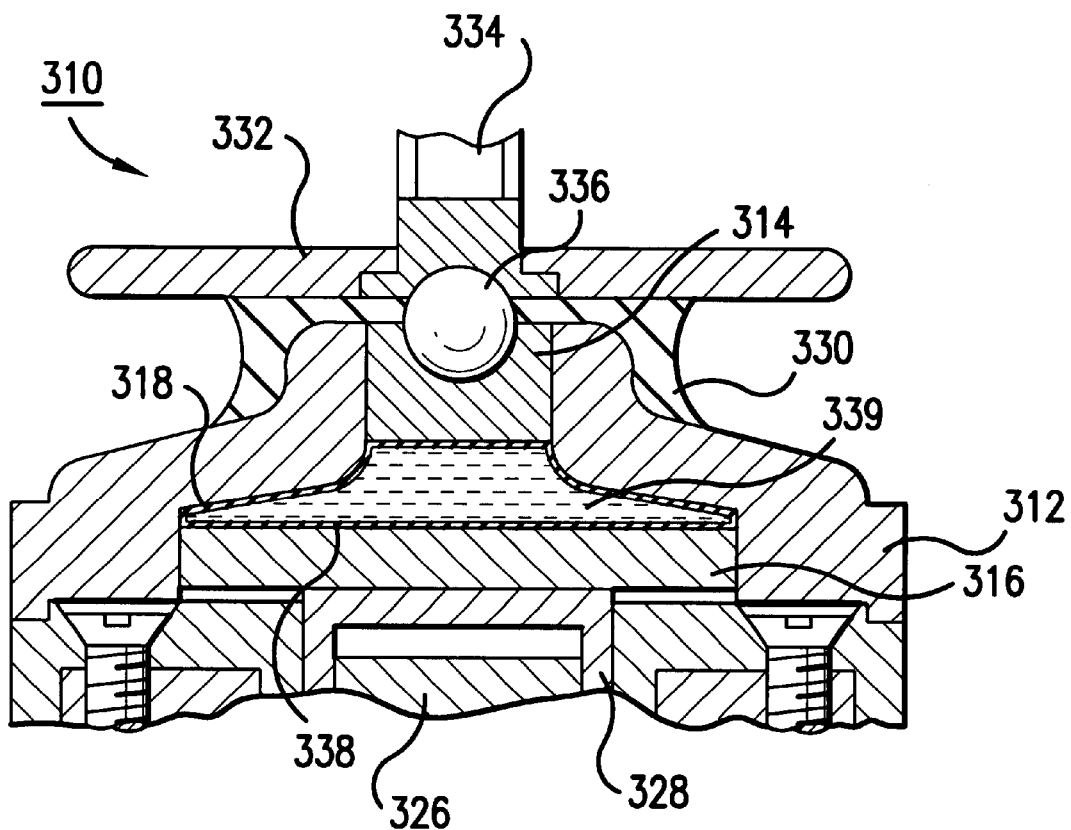
FIG. 24 is a sectional view showing the cardinal part of a modification of the apparatus illustrated in FIG. 23.

A still another embodiment is shown in FIG. 24. While this apparatus represents a minor modification in shape of the device shown in FIG. 23, the like parts are indicated by the like numerals used in FIG. 23. The aspect in which this damping device differentiates itself from the device of FIG. 23 is that a liquid substance 339 enclosed by a resilient rubbery film 338 is filled into the fluid chamber 318. In lieu of such liquid substance 339, there may be employed a resilient elastomer, a gel or a powder, just as mentioned hereinbefoe.

Figure 25:
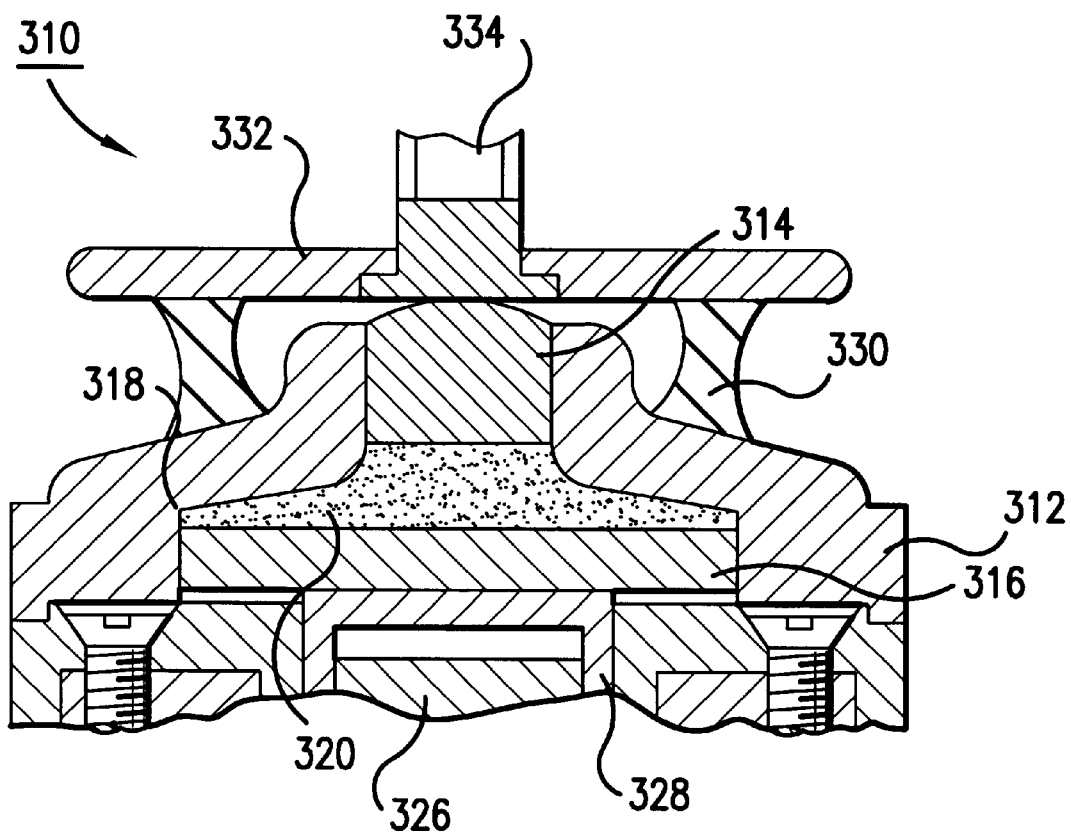
FIG. 25 is a sectional view showing the cardinal part of still another modification.

In the damping apparatus shown in FIG. 25, a resilient elastomer, a gel-like substance or a powdery material is filled into a propagation chamber 318. The aspect in which this embodiment differentiates itself structurally from the apparatuses shown in FIGS. 23 and 24 is that, instead of the indirect contact of the small-diameter piston 314 and the top flange 332 via a ball, the apex of a dome-shaped top of the small-diameter piston 314 is in direct contact with the underside of the flange 332.

Since, in the above damping apparatus, a resilient elastomer, a gel-like substance or a powdery material is used as a propagation medium for transmitting the oscillation of the piezoactuator 326 to the small-diameter piston 314, it is very unlikely that the preparation medium, which is not a liquid, ever leaks out from the clearance between the cylinder and the small-diameter piston. This possibility of leakage is further decreased when, as in the embodiment of FIG. 24, the medium is enclosed by a rubbery film. When such a rubbery film is used, a liquid transmission medium can be employed without fear of leakage.

While, in any of the above embodiments, a diaphragm and a bellowsphragm are not used across the large and small apertures, respectively, of the cylinder 312, the use of these members is of course subsumed in the scope of the invention. Moreover, while it is not essential to use O-rings along the outer periphery of the small-diameter piston 314 or the large-diameter piston 316, it is of course possible, within the scope of the invention, to employ such O-rings.

Figure 26:
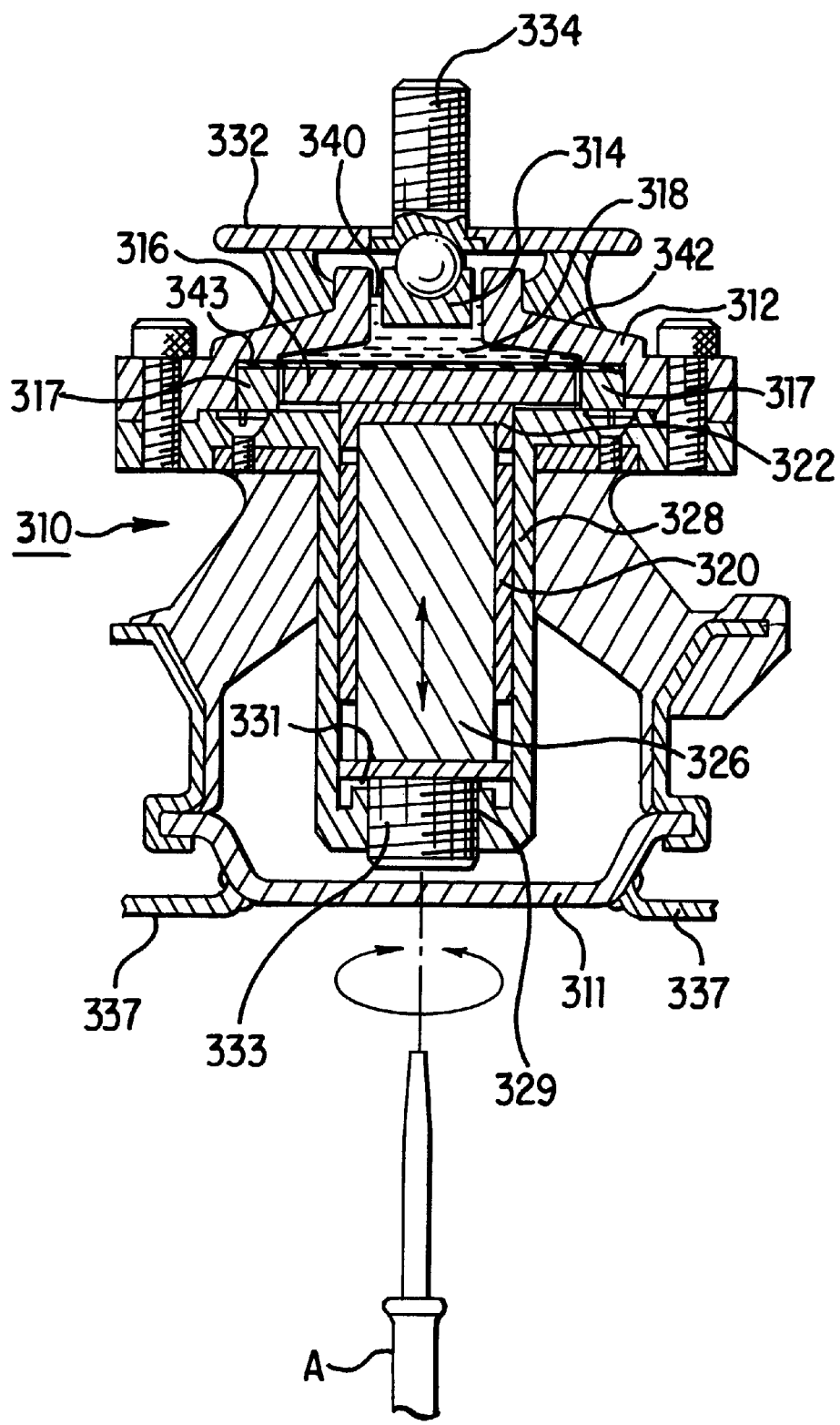
FIG. 26 is a longitudinal section view showing another yet damping apparatus embodying the principles of the invention.

A still another embodiment of the invention is shown in FIG. 26. This damping apparatus includes a cylinder 312 having a small-diameter top aperture and a large-diameter bottom aperture, which are interconnected to constitute a cavity. The top aperture is closed by a small-diameter piston 314, while the bottom aperture is closed by a large-diameter piston 316, thus forming a propagation chamber 318 filled with a fluid. Disposed below the large-diameter piston 316 is a piezoactuator 326 via a cylindrical holder 328. As the piezoactuator 326 expands or contracts in response to an electric oscillation signal, the resulting mechanical oscillation is transmitted through the fluid medium contained in the propagation chamber to the overhead small-diameter piston 314. Since the top aperture of the fluid chamber is smaller in area than its bottom aperture, the amplitude of oscillation of the small-diameter piston 314 is increased as compared with that of the piezoactuator 326. As a top threaded shaft 334 of this damping apparatus is connected to the engine of a motor vehicle and a bottom stay 337 thereof to the vehicle body, for instance, the mechanical oscillation output of the piezoactuator 326 is superimposed on the oscillation to be attenuated so that the transmission of engine vibrations to the vehicle body can be effectively prevented even if the amplitude of engine vibration is large. Indicated by 320 is a sleeve for the piezoactuator 326, while a cap therefor is indicated by 322. It should be understood that the propagation chamber 318 may be filled with a resilient elastomer, a gel-like substance or a powdery material in lieu of said fluid.

The cylindrical holder 328 for the piezoactuator 326 has a bottom 329 through which an adjusting screw 333 is threaded. The top end of this adjusting screw 333 is abutted against the lower end 331 of the piezoactuator 326. This damping apparatus has a bottom wall 311 provided with a central hole 313 in the position corresponding to the adjusting screw 333. A screwdriver A can be inserted from this central hole 313 into the housing to turn the adjusting screw 333 so as to fine-adjust the height of the piezoactuator 326. As the top of the piston 316 is made flush with the upper surface of a holder 317, a diaphragm 342 is made planar.

Figure 27:
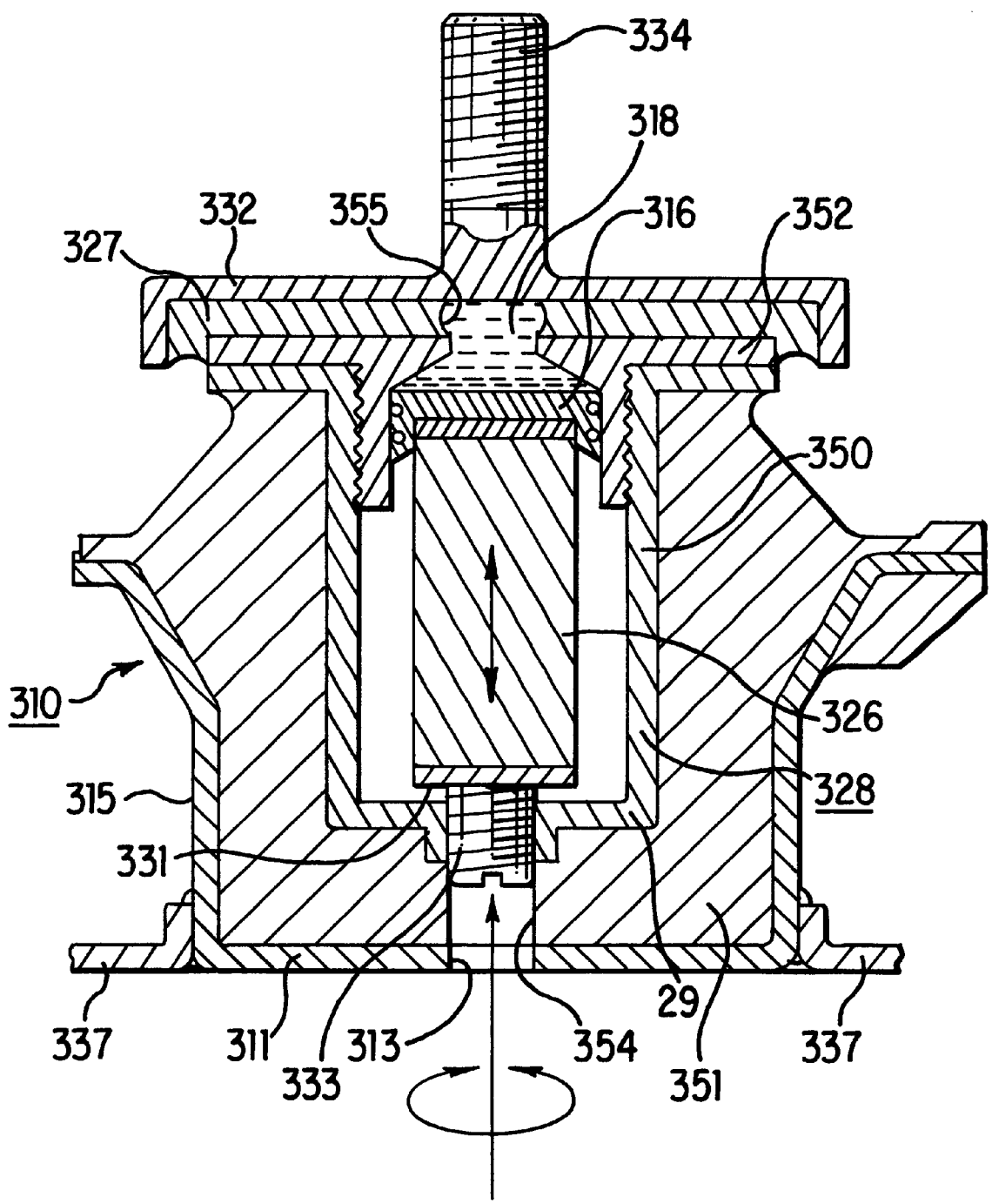
FIG. 27 is a longitudinal section view showing a modification of the apparatus illustrated in FIG. 26.

In the embodiment of FIG. 27, a cylindrical holder 328 for a piezoactuator 326 is disposed internally of a cup-shaped member 315, with a resilient elastomer 351 being filled into the space between them. Fitted into a cylindrical segment 350 of the holder 328 is a cylindrical segment of the cylinder 312. A top plate 332 having a threaded shaft 334 for connection to the engine side is mounted on a flange 352 of the cylinder 312 through a thin supporting rubber sheet 327. A piston 316 is disposed in the cylinder 312 in vertically slidable relation. Disposed below the piston 316 is a piezoactuator 326, the lower end 331 of which is situated close to a bottom wall 331 of the holder 328. Threaded into the holder bottom wall 331 is an adjusting screw 333, the top of which is abutted against the lower end of the piezoactuator. The resilient elastomer 351 is filled into the space between the holder 328 and the cup-shaped member 315 in a vulcanization process. After vulcanization, a through-hole 354 is drilled therein to allow axial movement of the adjusting screw 333.

A propagation chamber 318 is defined by the inner circumferential surface of the cylinder 312, the peripheral surface of an orifice 355 in the supporting rubber 327, the top surface of the piston 316 and the underside of the top plate 332.

Now, the adjusting screw 333 is rotated to shift the piezoactuator 326 in a vertical direction and thereby stretch the supporting rubber 327 vertically. This amount of stretching must be sufficient to allow the supporting rubber 327 to contract to the neutral point under conditions such that this damping apparatus is installed on a motor vehicle or the like and connected to the engine (under initial load).

Figure 28:
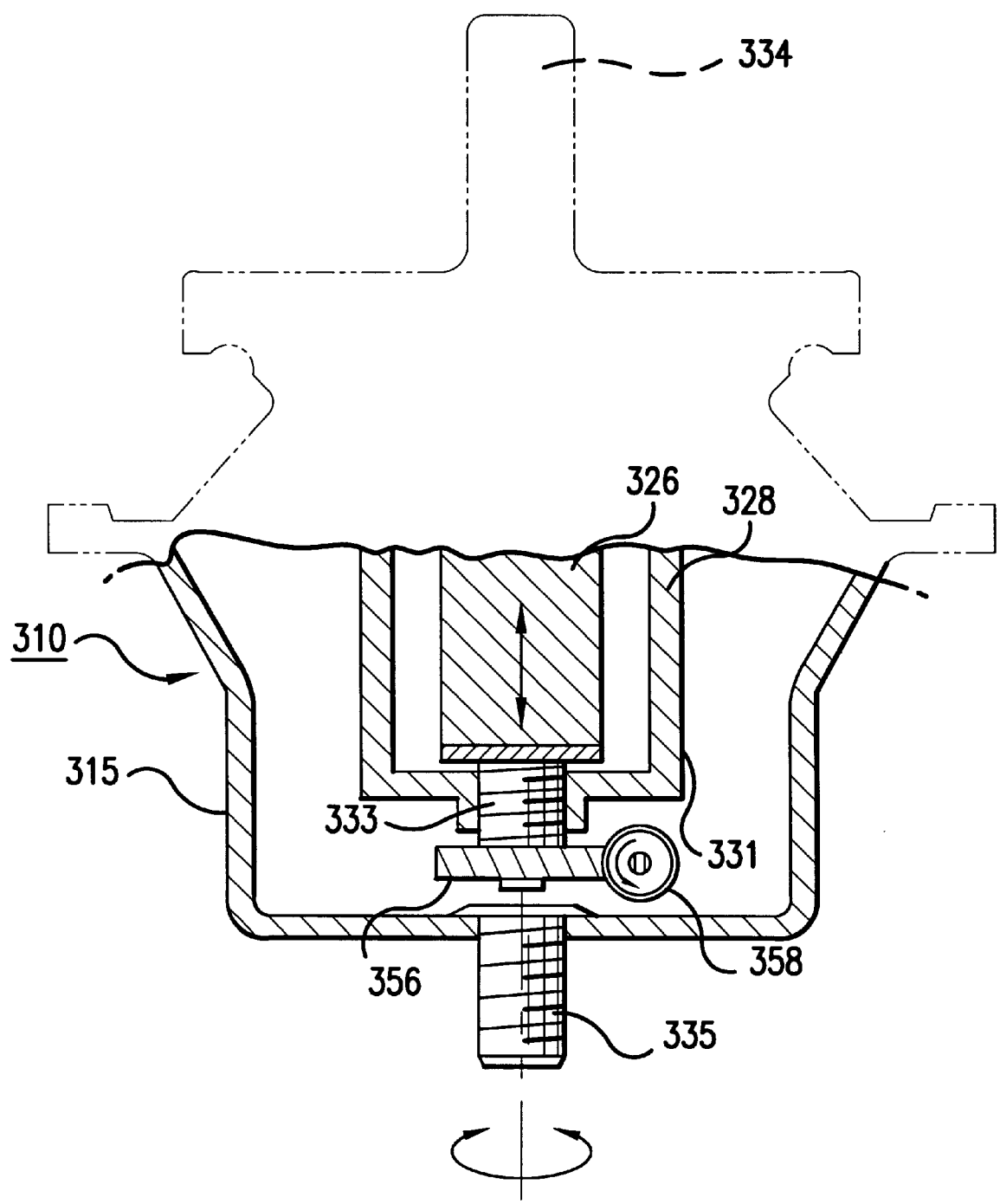
FIG. 28 is a longitudinal section view showing the cardinal part of the modification illustrated in FIG. 27.

FIG. 28 shows a modification of the damping apparatus of FIG. 27. In this embodiment, the bottom of a casing 310 is provided with a threaded shift 335 for attachment of the casing 310 to the vehicle body and, therefore, there is no access to the adjusting screw 333 from the bottom 311 side of the casing 310. To overcome this disadvantage, a worm gear 356 is affixed to the lower end of the adjusting screw 333 and another worm gear 358 extending out of the casing (not shown) is disposed in mesh with said worm gear 356. Then, by rotating the worm gear 358 from outside of the casing 310, the adjusting screw 333 can be rotated through the worm gear 356.

Figure 29:
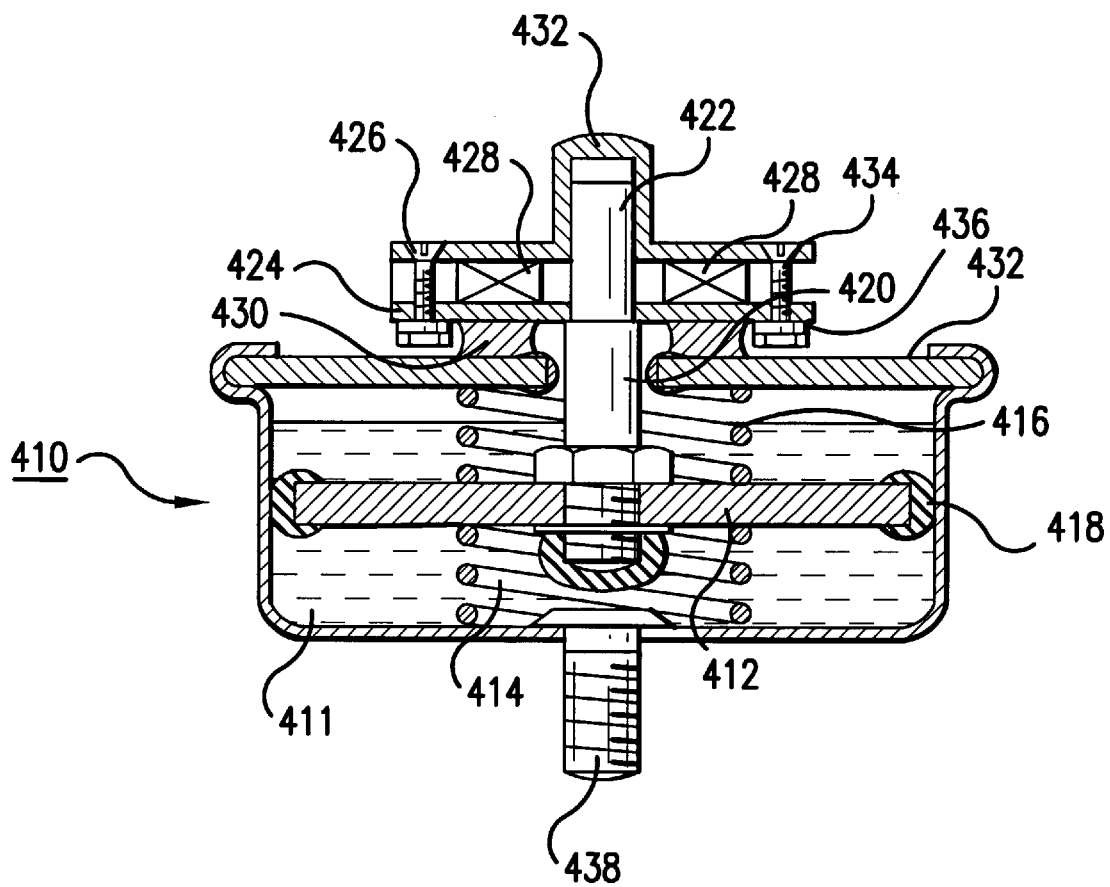
FIG. 29 is a sectional view showing a damping apparatus employing a dash pot as an embodiment of the second invention.

The damping apparatus shown in FIG. 29 employs a dash pot as a means for controlling the free oscillation or large displacement in accordance with the second invention. Indicated by 410 is a casing in which a plate member 412 is supported by springs 414, 416 in vertically movable relation. The peripheral edge of said plate member 412 is fitted with a rubber member 418 through which the peripheral edge of the plate member 412 is pressure-fitted against the inner circumferential surface of the casing 410. The reference numeral 420 indicates a center stem extending upwards from the plate member 412 and the top of this stem 420 projects out of the casing 410 to constitute a reduced-diameter sliding member 422. Outside of the casing 410, the center stem 420 is rigidly fitted with a first flange 424. Disposed in parallel with this flange 424 is a flange 426, with an actuator 428 being interposed between the two flanges 424 and 426. The first flange 424 is supported by a top plate 432 of the casing 410 through a resilient elastomer 430. A covered cylindrical member 432 extending centrally from the second flange 426 and contains said sliding member 422 of the center shaft 420 in freely slidable relation. Though not shown in detail, the peripheral edge of the second flange 426 is fitted with a plurality of bolts 434 which are loosely engaged by the corresponding holes in the peripheral edge of the first flange 424. A resilient elastomer 436 is interposed between the heads of the bolts and the first flange 424 as illustrated.

The covered cylindrical member 432 mentioned above is connected to the engine side and a shaft 438 erected from the lower end of the casing 410 is connected to the vehicle body. The above relation of connection may be reversed if necessary.

In the above arrangement, when vibrations of low frequency are inputted from the engine side, these vibrations are transmitted through the second flange 426, actuator 428, first flange 424 and center stem 420 to the plate member 412. When the amplitude of vibrations is small, the vibrations are absorbed by deformation of the rubber 418 and the function of the actuator 428. When the amplitude is large, the vibrations are initially attenuated by the reaction force arising from the intimate contact between the rubber 418 and the inner circumferential surface of the casing 410. As the amplitude increases further and the plate member 412 starts moving, the fluid 411 in the casing 410 flows through the clearance between the rubber 418 and the inner circumferential surface of the casing 410 and the viscosity resistance of the fluid suppresses the vibrations. The vibrations are further attenuated by cavitation as well as the vortexes of fluid generated by the movement of the plate member 412.

Figure 30:
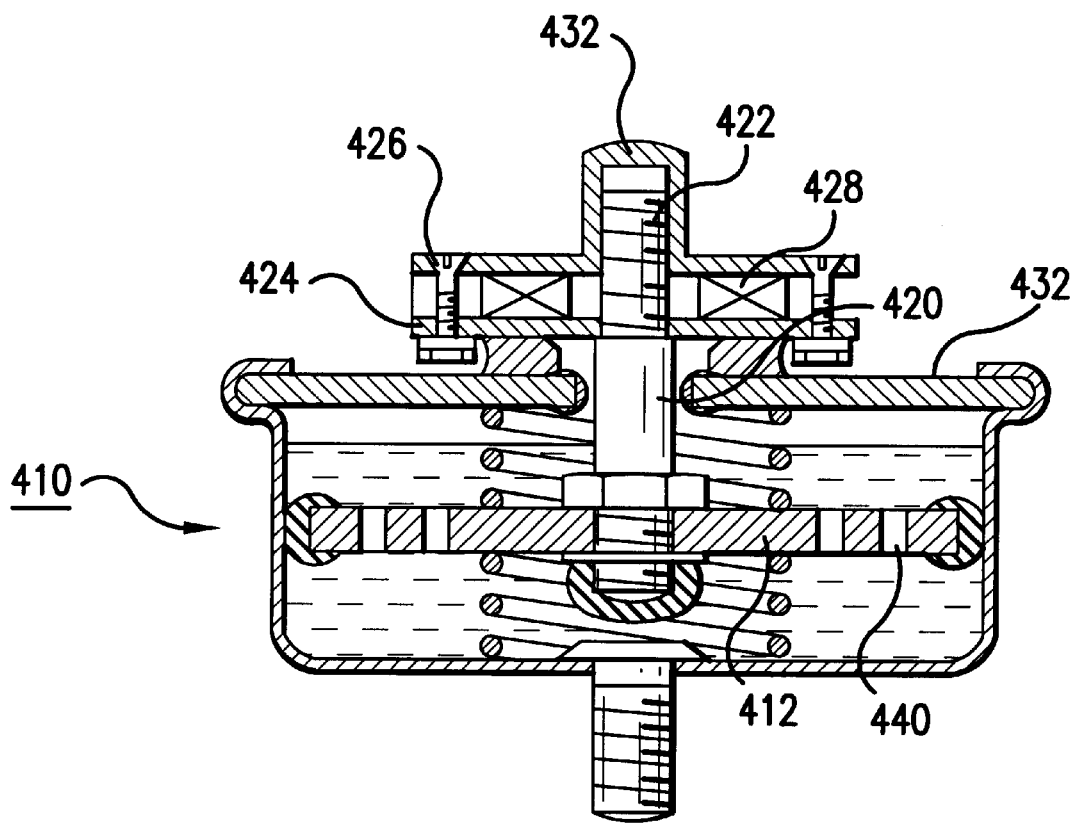
FIG. 30 is a sectional view showing a modification of the damping apparatus shown in FIG. 29.

FIG. 30 shows another embodiment of the invention. In this apparatus, the plate member 412 is provided with longitudinally extending orifices 440. The vibrations are controlled by the viscosity resistance of the fluid 411 flowing through the orifices 440 and the vortexes of fluid produced.

Figure 31:
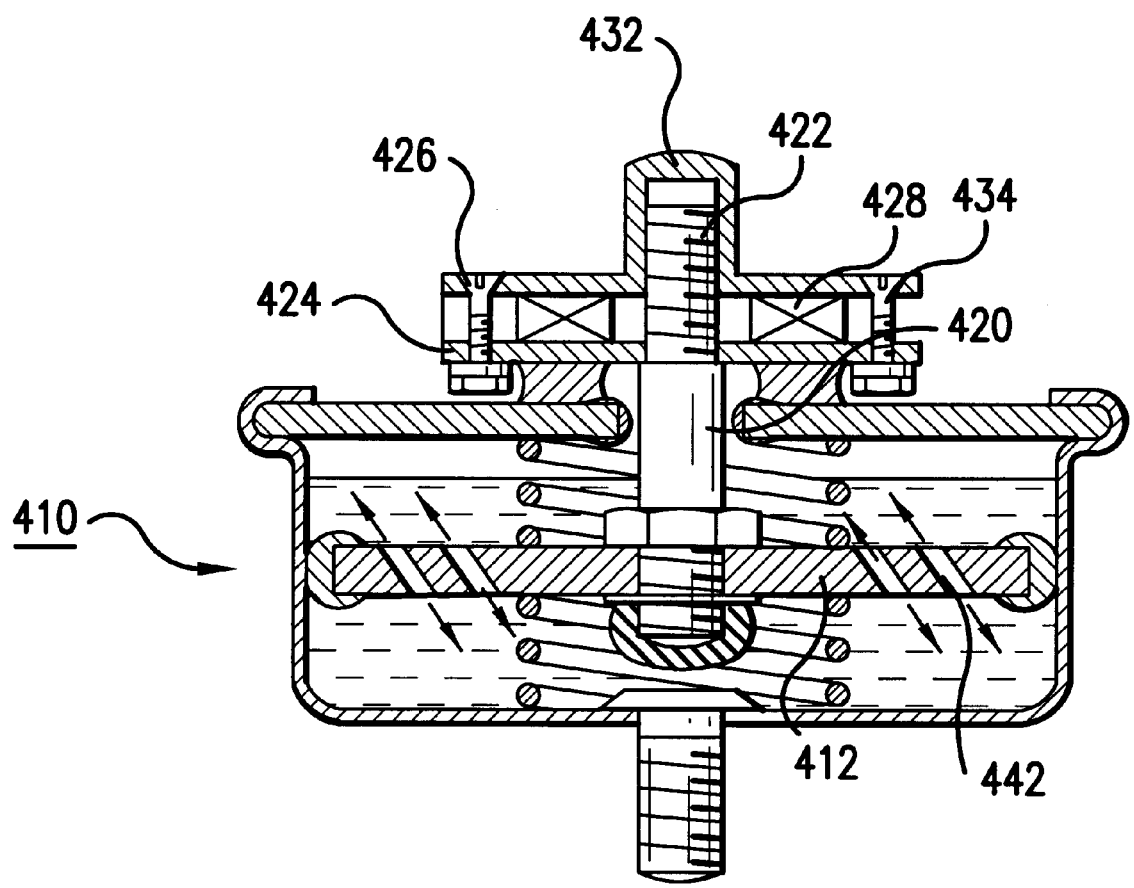
FIG. 31 is a sectional view showing another modification of the damping apparatus illustrated in FIG. 29.

In FIG. 31, the orifices 442 are oriented obliquely. In this case, the vertical motion of the plate member 412 stirs the fluid to provide a still greater resistance to vibrations.

Figure 32:
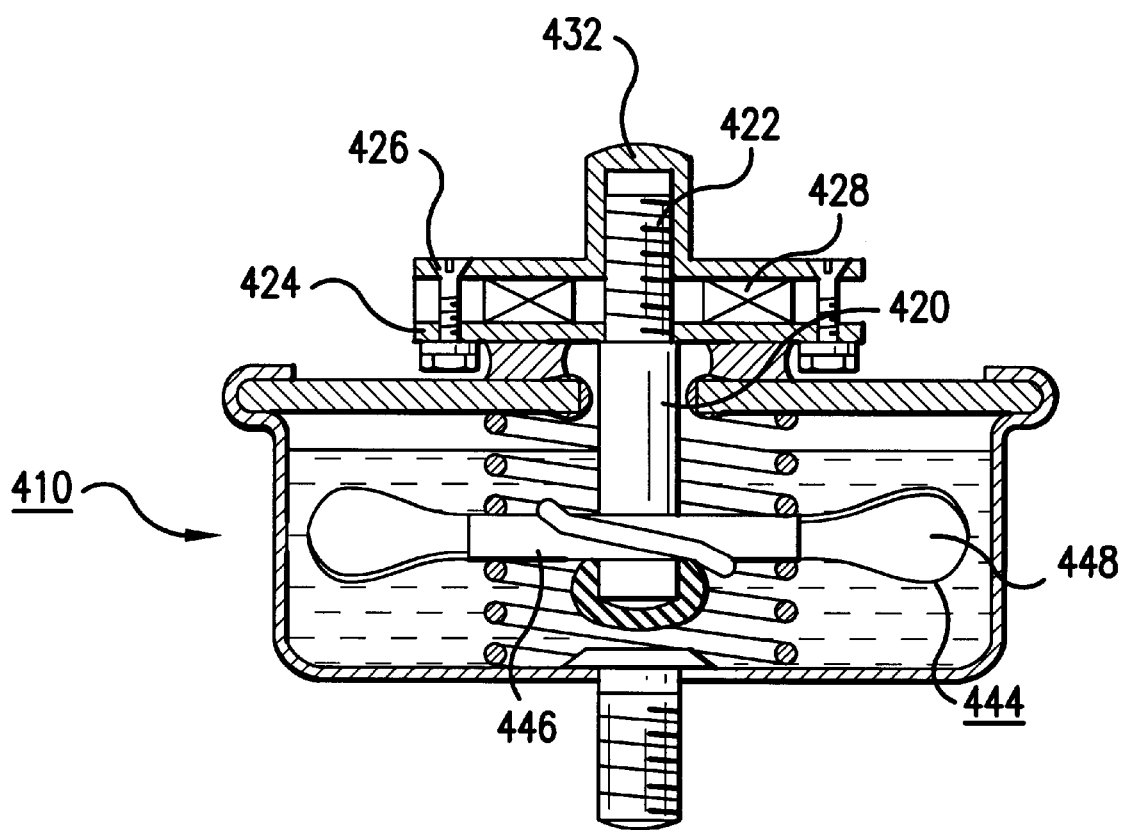
FIG. 32 is a sectional view showing a modification employing a stirring paddle.

In the embodiment illustrated in FIG. 32, a stirring paddle 444 is disposed in the body of fluid within the casing 410. Though not shown in detail, this stirring paddle 444 comprises a central plate 446 and a plurality of twisted blades 448 extending out from the central plate 446. As this stirring paddle 444 moves vertically, the fluid in the casing 410 is agitated. The vibrations are controlled by the resistance to agitation, viscosity resistance, and resistance due to vortexes of the fluid.

Figure 33:
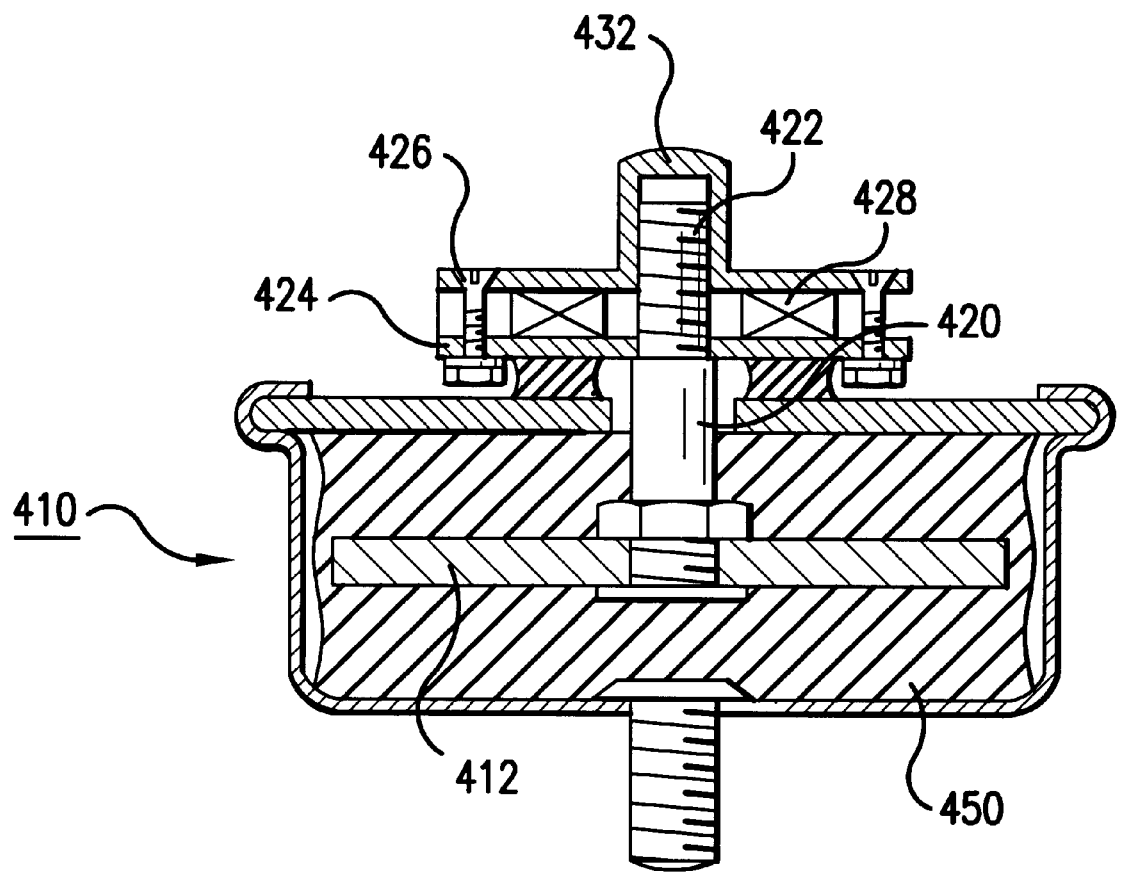
FIG. 33 is a sectional view showing a modification employing an attenuating material.

In the embodiment of FIG. 33, an elastomeric material 450 is filled in a casing 410, leaving a small free space adjacent to the inner circumferential surface of the casing 410. The elastomeric material 450 is preferably a high-damping material such as polynorbornene rubber. When the displacement due to vibrations is small, the vibrations are insulated by the deformation of the elastomeric material and the function of the actuator. In contrast, as the amplitude increases and the plate 412 embedded in the elastomeric material 450 is displaced, the energy is damped and thus the vibration is controlled by the exothermic reaction of the elastomeric material.

Figure 34:
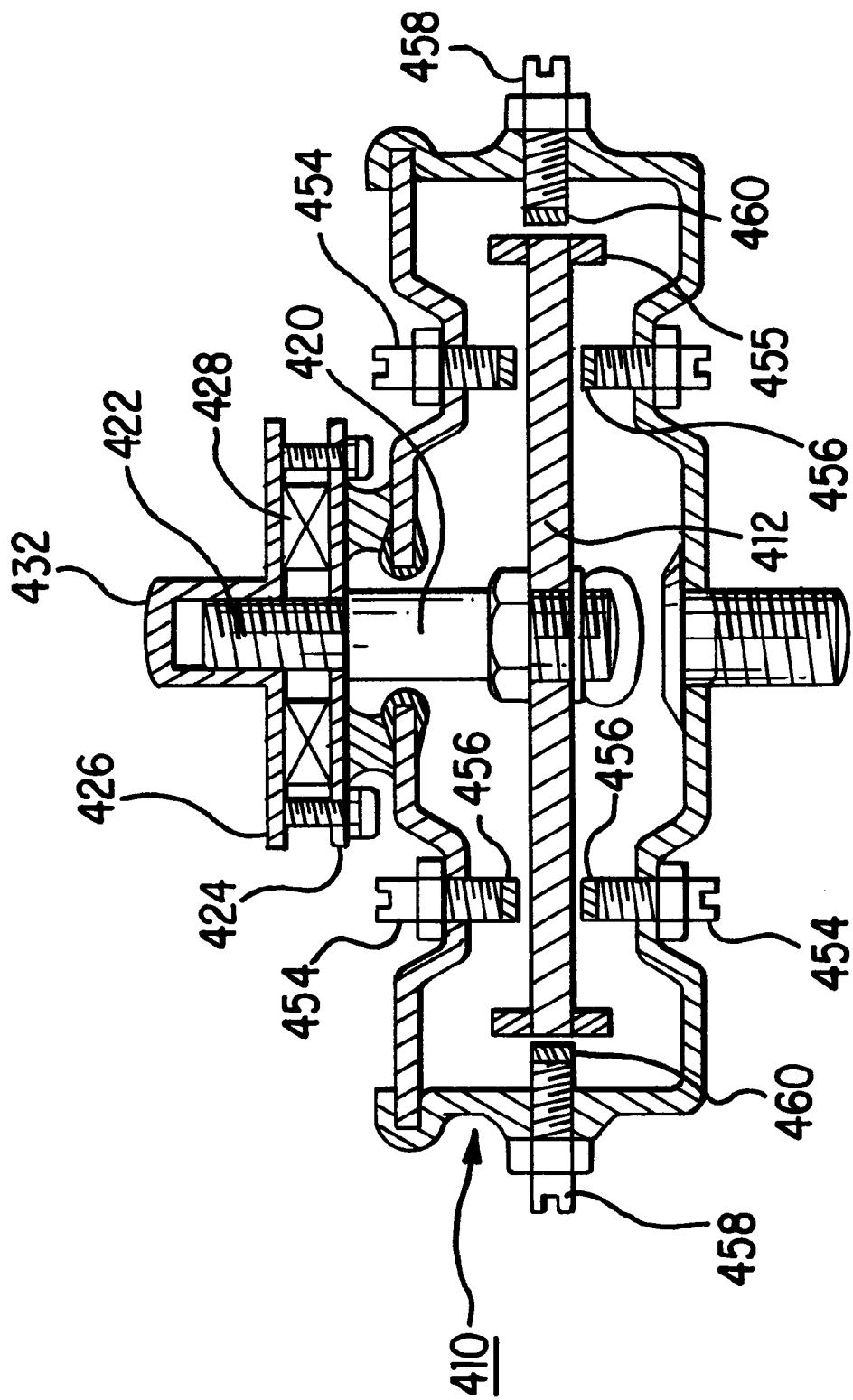
FIG. 34 is a sectional view showing a modification employing a stroke-limiting means.

In the embodiment of FIG. 34, a plate member 412 is supported centrally in a casing 410, with a plurality of pins 454 arranged in the circumferential direction of the casing 410 extending inwardly from the upper and lower plates of the casing 410. The end of each pin 454 is fitted with a resilient elastomeric member 456 and the peripheral edge of the plate member 412 is fitted with an annular flange 455. In a plurality of positions in the circumferential direction of the casing 410, pins 458 are extending towards the flange 455 and the forward end of each pin is fitted with a resilient member 460. The displacement of the plate member 412 is restricted by these pins 454 and 460 in both the vertical direction and the lateral direction. As an oscillation occurs and the plate member 412 is brought into contact with the rubbery elastomer 456 at the tips of the pins 454, the vibration is absorbed and controlled by the high spring constant of the rubber and any further displacement is restricted positively.

Figure 35:
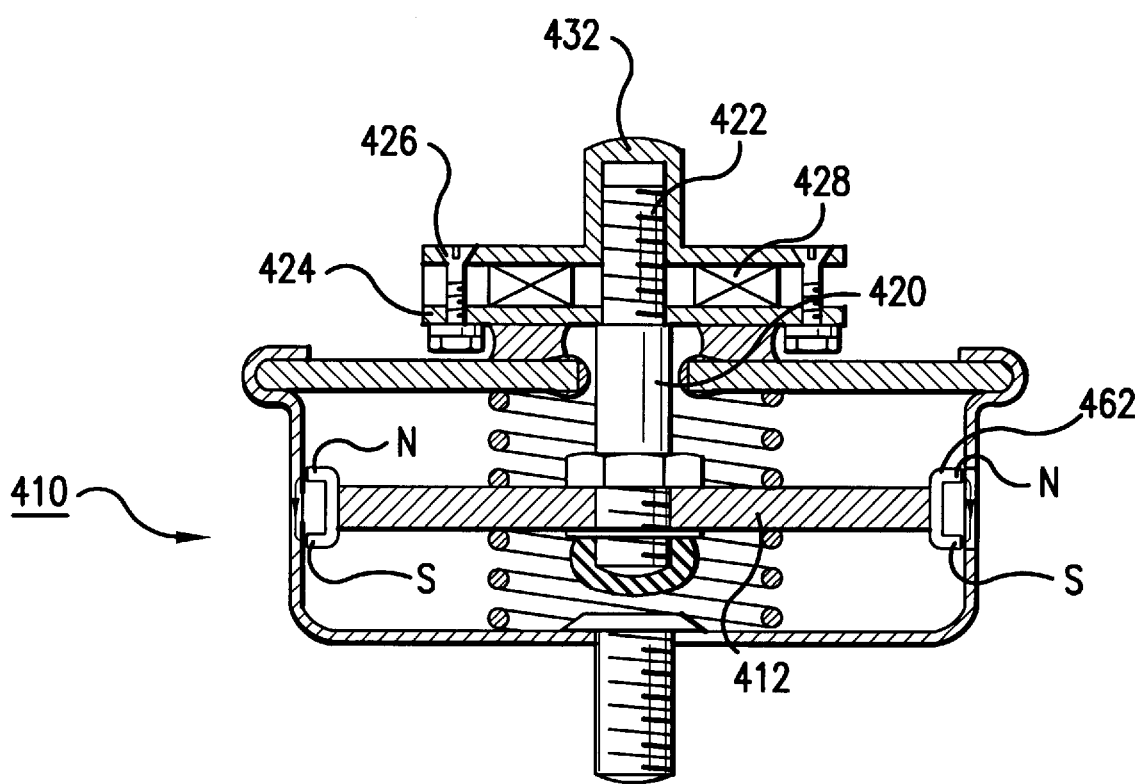
FIG. 35 is a sectional view showing a modification utilizing an electric loss.

In the embodiment of FIG. 35, the casing 410 is made of an electrically conductive material such as iron and brass. The plate member 412 has a plurality of magnets 462 along its peripheral edge. As the plate member 412 is displaced vertically by an oscillation, a inductance takes place between the magnet 462 and the casing 410 to generate a magnetic force acting against displacement of the plate member 412 so as to control the oscillation. Though not shown, this effect can be further enhanced by installing an electromagnetic coil on the inner circumferential surface of the casing 410 in a position corresponding to each of said magnets 462.

Figure 36:
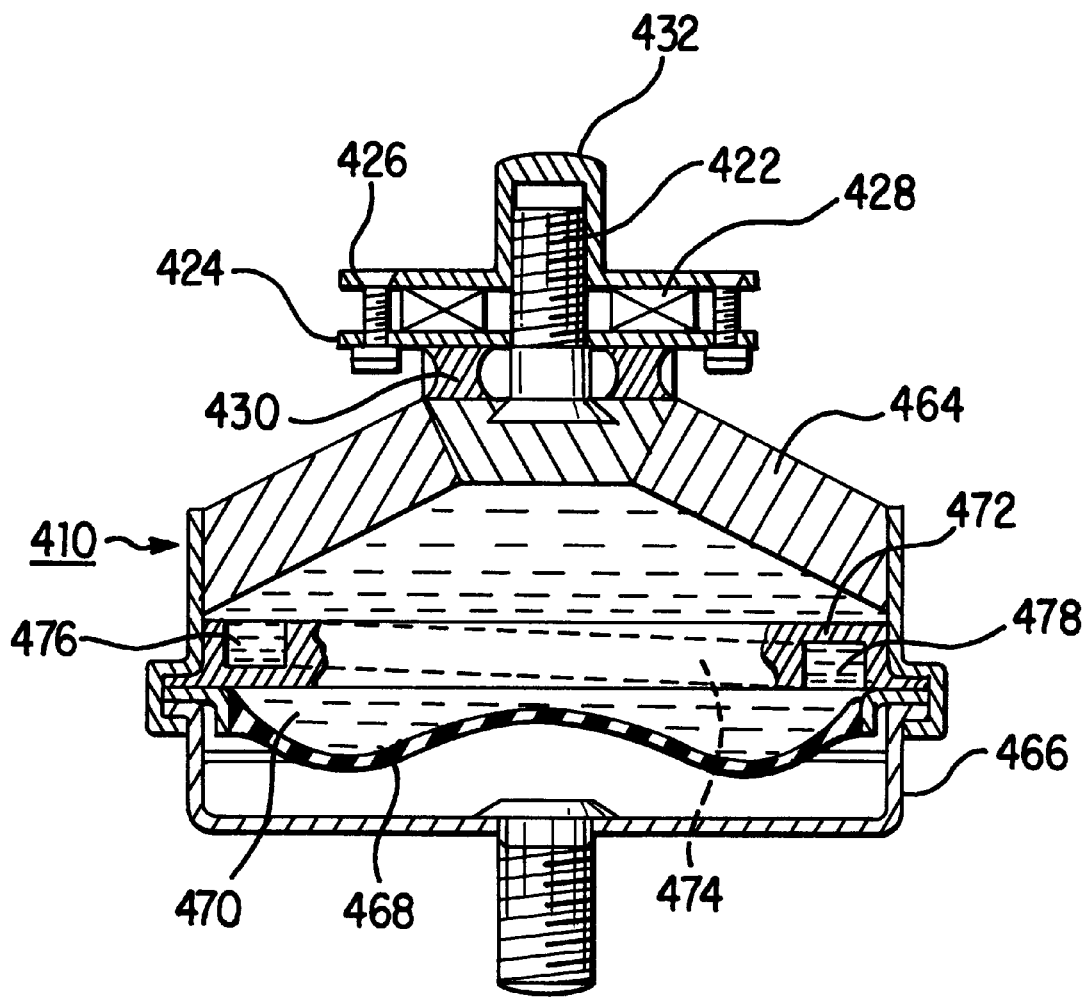
FIG. 36 is a sectional view showing a modification utilizing liquid column resonance.

In the embodiment illustrated in FIG. 36, a casing 410 comprises an elastomeric wall 464 and a cup-shaped wall 466, with a diaphragm 468 being disposed in the casing 410 in such a manner that a fluid chamber 470 is defined by said diaphragm 468 and elastic wall 464. Disposed in this fluid chamber is a divider 472 which is provided with a circumferential orifice 474. Indicated by 476 and 478 are apertures of the circumferential orifice 474 which communicate with the upper and lower compartments, respectively. As an oscillation is transmitted, the liquid column in the circumferential orifice 474 is displaced and the viscosity resistance of fluid and the resonance of the vortex and fluid column absorb the oscillation.

Figure 37:
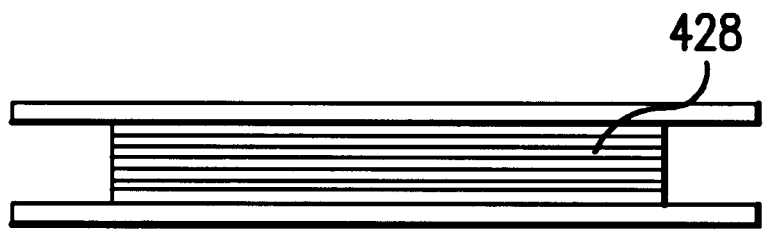
FIG. 37 is a an external view showing a piezoactuator used in accordance with the invention.
Figure 38:
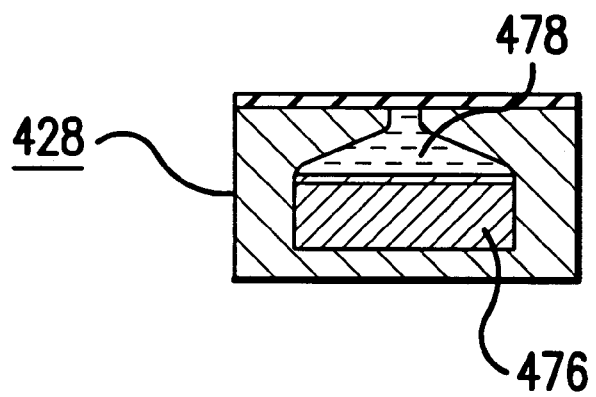
FIG. 38 is a sectional view showing a modification of the piezoactuator.

The piezoactuator 428 used in the above embodiment is a stack of many doughnut-shaped piezoelectric wafers as shown in FIG. 37. As an alternative, the oscillation of the actuator can be amplified by a fluid chamber 478 located above an actuator body 476 as illustrated in FIG. 38. As further alternatives, the amplifying mechanisms shown in FIGS. 2 through 21 can be selectively employed.

Figure 39:
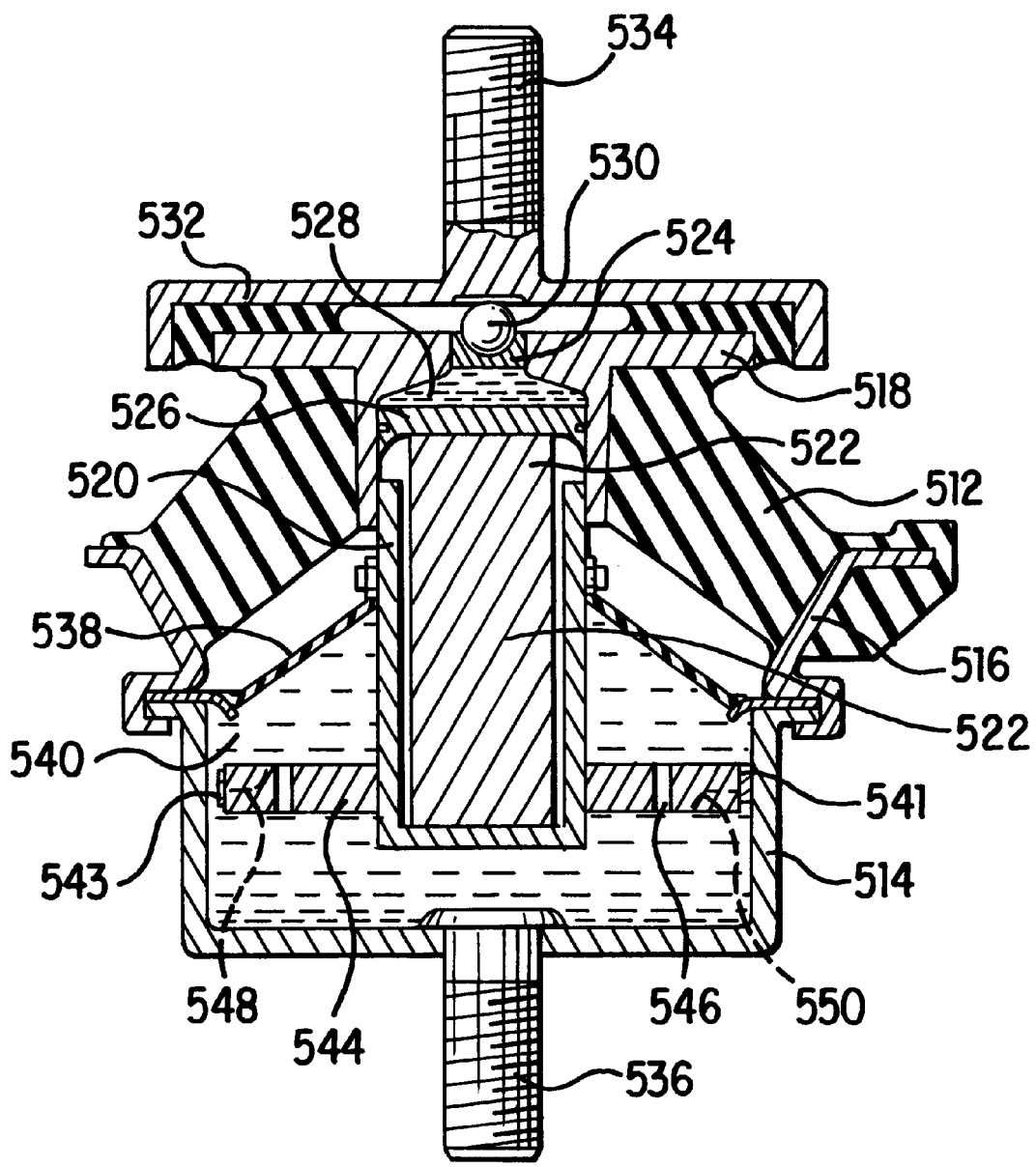
FIG. 39 is a longitudinal section view showing another embodiment of the invention (For convenience's sake, the case in which the annular plate is provided with a vertically extending orifice, the case in which it is provided with a circumferential orifice, and the case in which a clearance is provided between the outer peripheral edge of the annular plate and the inner surface of the cup are shown together)

In the apparatus illustrated in FIG. 39, a housing comprises an elastomeric wall 512 and a U-shaped cap 514 which are interconnected via an annular bracket 516. A cylinder 518 is disposed in the central bore of the elastomeric wall 512 and a bottomed cylindrical holder 520 is disposed internally of the lower cylindrical part of the cylinder. Disposed within the holder 520 is a piezoactuator 522, the lower end of the which rests on the bottom of the holder 520. The cylinder 518 has a large-diameter bottom aperture and a small-diameter top aperture which are intercommunicating to constitute a cavity. A small-diameter piston 524 and a large-diameter piston 526 are disposed in the upper and lower positions of said cavity.

Defined by the upper and lower pistons 524, 526 is a fluid chamber 528. The diameter of this fluid chamber is large at the bottom end and diminishes towards the top end, forming a amplifying mechanism corresponding to the area ratio according to Pascal's law. Thus, the mechanical oscillation of the piezoactuator 522 is amplified and transmitted to the small-diameter piston 524.

The small-diameter piston 524 is abutted against the underside of a top flange 532 through a ball 530. Disposed in the top center of the top flange 532 is a threaded shaft 534 for connection to the engine of a motor vehicle. Indicated by 536 is a threaded shaft extending perpendicularly from the center of the underside of the U-shaped cup 514 for connection to the vehicle body.

A diaphragm 538 divides the space within the U-shaped cup 514 into two spaces. The space defined by the diaphragm 538 and cup 514 is a fluid chamber 540 which is filled with a liquid such as ethylene glycol, oil or the like. In the fluid chamber 540, an annular plate 544 is rigidly secured to the outer periphery of the holder 520 and seal rubbers 541, 543 are disposed between the outer peripheral surface of said plate 544 and the inner circumferential surface of the U-shaped cup 514.

The annular plate 544 has a plurality of longitudinal orifices 546, indicated by solid lines, as arranged in its circumferential direction. In lieu of said orifices 546, a circumferential orifice having an inlet 548 and an outlet 550, both indicated by dotted lines, may be provided.

Furthermore, instead of providing the annular plate 544 with such orifice means, a small clearance may be provided between each seal rubber 541, 543 at the periphery of the annular plate 544 and the internal surface of the cup 514 so that the fluid may flow through the clearance. For convenience's sake, the seal rubber 541 at the right side in the view is shown in contact with the inner circumferential surface of the cup 514 (the embodiment in which the plate 544 has orifice means), while the seal rubber 543 at the left side is shown with a clearance provided between the same and the inner circumferential surface of the cup 514.

In accordance with the embodiment illustrated in FIG. 39, intermediate- or high-frequency vibrations associated with idling of the engine or the like can be cancelled by the small-amplitude mechanical oscillation of the piezoactuator 522, while low-frequency, large-amplitude vibrations such as those encountered at shakes can be attenuated by the viscosity resistance of the fluid passing through the orifice means 546 or 548–550 of the annular plate 544 or through the smaller clearance between the seal rubber 541, 543 and the inner circumferential surface of the U-shaped cup 514.

It should be understood that while the fluid chamber 528 is used for amplifying the oscillation of the piezoactuator 522 in the illustrated embodiment, a leverage means, a wedge means or any other appropriate means may be utilized as the means for amplification.

Furthermore, the fluid chamber 528 may be filled with an non-compressible elastic material, gel-like substance or finely divided power in lieu of the liquid mentioned. Since these materials are invariably non-compressible, displacement of the large-diameter piston 526 can be accurately transmitted to the small-diameter piston 524. Furthermore, since such transmission media are not liquid, they offer the advantage that no leakage occurs at the fitting clearance between the small-diameter piston 524 and the cylinder 518. For more positive prevention of leakage, the transmission medium to be filled into the chamber 528 may be covered with a rubber-like elastic film material.

Figure 40:
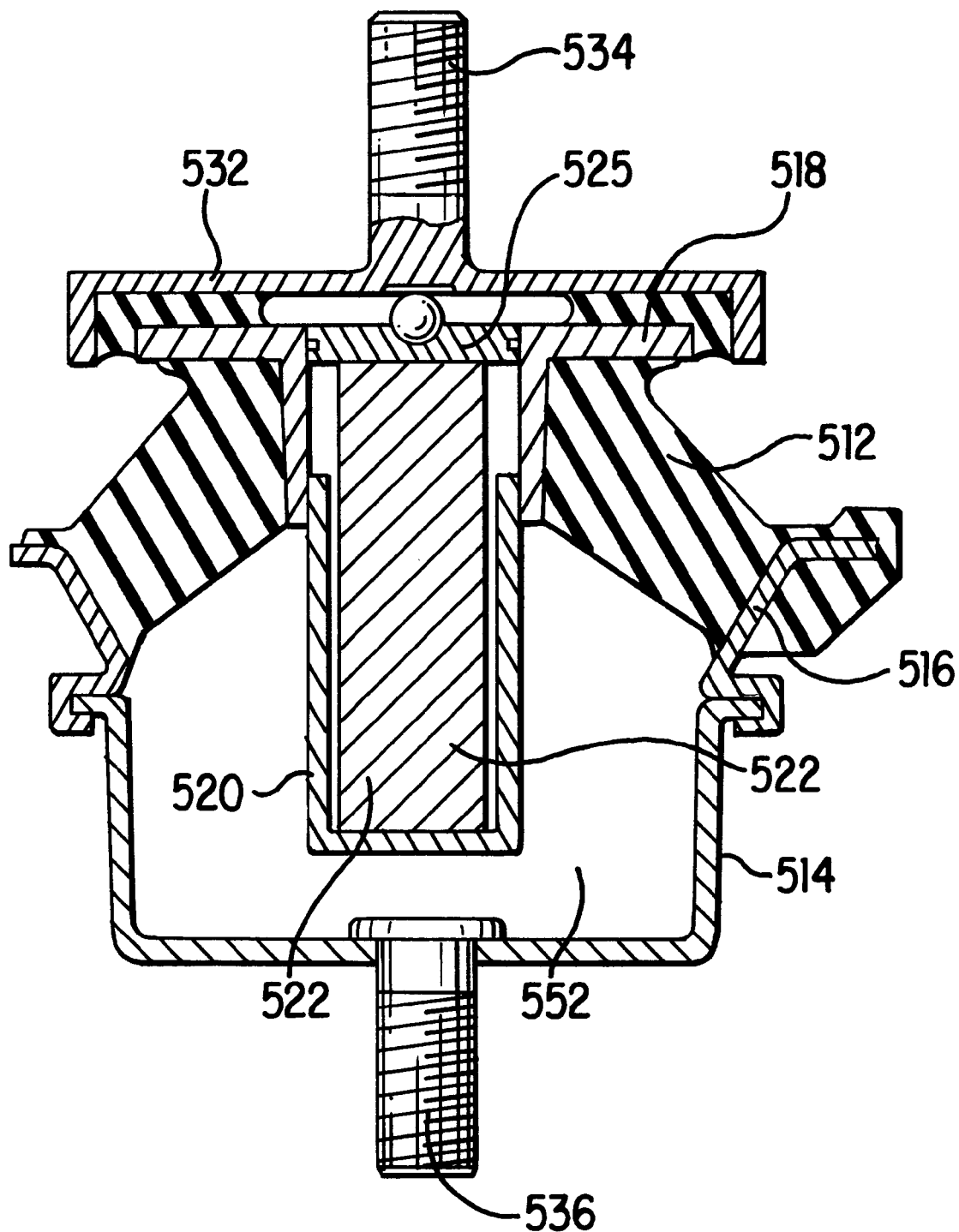
FIG. 40 is a longitudinal section view showing still another embodiment of the invention.

While an amplifying means is employed in the embodiment of FIG. 39, the case in which only one piston 525 is used without provision of such an amplifying means as in the embodiment of FIG. 40 also falls within the scope of the present invention.

In the embodiment illustrated in FIG. 40, a casing comprising an elastic wall 512 and a cup-shaped wall 514 is filled with air or an elastomeric material 522 which absorbs low-frequency vibrations.

FIG. 41 is a sectional elevation view showing a cylindrical engine mount which is a damping apparatus embodying the principles of the invention.

In this engine mount 610, an inner cylinder 630 is concentrically disposed in an outer cylinder, 631 and between the inner and outer cylinders 630, 631, four actuators 633 for generating mechanical oscillations are disposed at equal angular spacings of 90 degrees. The actuator 633 may for example be an actuator utilizing any of electrical strain, magnetic strain, liquid pressure, air pressure, electromagnetic force, motor-cam combination, electric fluid, magnetic fluid and so on.

Figure 59:
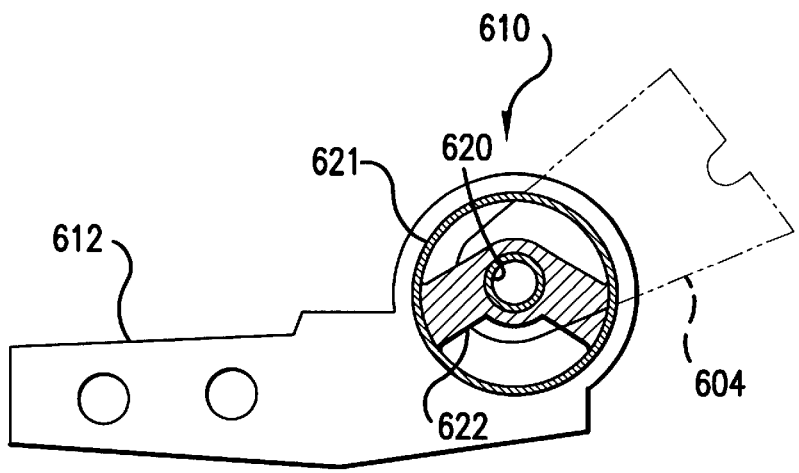
FIG. 59 is a sectional view showing an example of the conventional cylindrical engine mount as applied to an FF motor vehicle.
Figure 60:
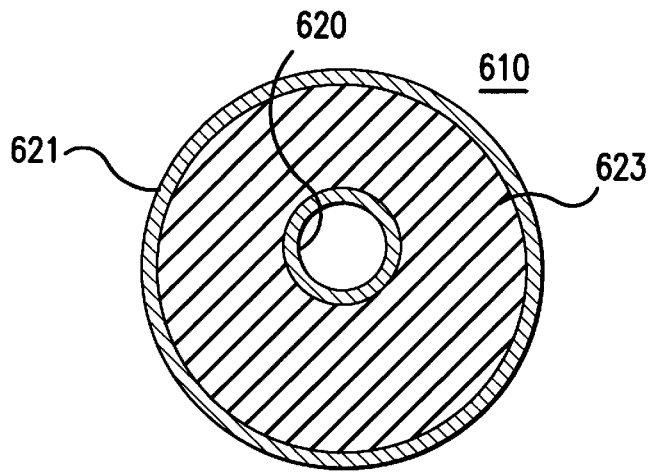
FIGS. 60 and 61 each is a sectional view showing another known cylindrical engine mount.
Figure 61:
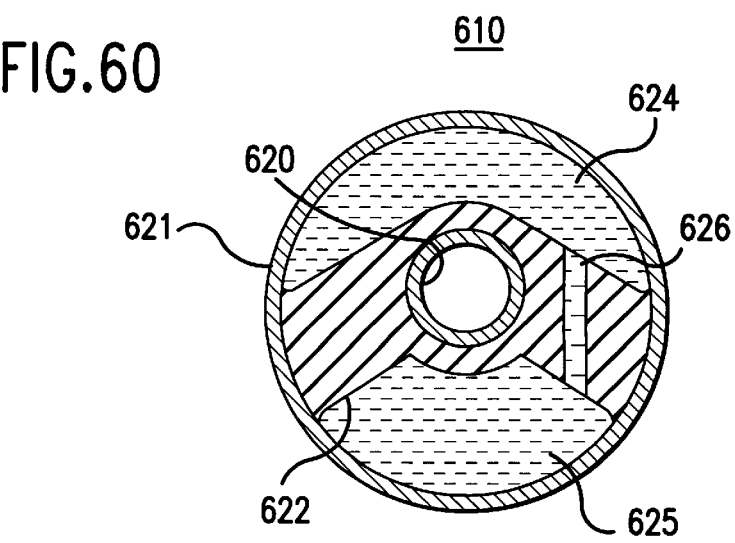

As in the case illustrated in FIG. 59, the inner cylinder 630 of this engine mount 610 is connected to the engine side, while its outer cylinder 631 is connected to the vehicle body. As the actuators 633 are excited by vibrations of the engine, the oscillations of the actuators are superimposed on the engine vibrations to produce an engine damping effect.

FIGS. 41 (A) through 49 are sectional views showing other cylindrical engine mounts embodying the principles of the invention.

In the cylindrical engine mount of FIG. 41 (A), the space between the inner and outer concentric cylinders 630, 631 is filled with a piezoelectric ceramic actuator 634, with four pairs of electrodes 634a, 634b; 634c, 634d; 634e, 634f; 634g, 634h being disposed flanking the filled piezoelectric ceramics at intervals angularly spaced apart by 90 degrees. However, the outer electrodes 634a, 634c, 634e and 634g may be omitted when the outer cylinder 631 is an electrode and the inner electrodes 634b, 634d, 634f and 634h may be omitted when the inner cylinder 630 is an electrode. Although either one of these electrode series can be omitted, both series cannot be omitted.

The cylindrical engine mount 610 illustrated in FIG. 42 includes an intermediate cylinder 632, which is disposed in concentric relation to the outer cylinder 631, between the inner and outer cylinders 630, 631. The inner cylinder 630 and the intermediate cylinder 632 are bridged by an elastomeric material 635, and the space between the outer cylinder 631 and the intermediate cylinder 632 is filled with a piezoelectric ceramic actuator 636. However, just as in the case illustrated in FIG. 41, four parts of electrodes 636a, 636b; 636c, 636d; 636e, 636f; and 636g, 636h are disposed flanking the filled piezoelectric ceramics at equal angular intervals of 90 degrees. It should be understood that either one of the electrode series can be omitted as in the case of FIG. 41. In this cylindrical engine mount 610, even if the actuator 636 becomes faulty, the elastomeric member 635 maintains at least the damping function available by the prior art technology.

Figure 43:
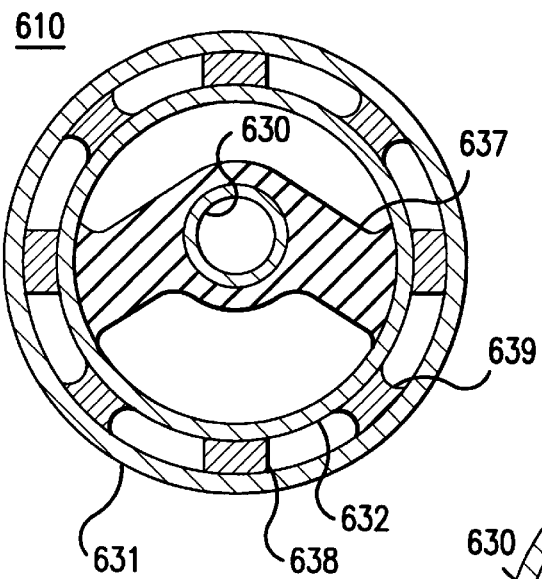

The cylindrical engine mount 610 illustrated in FIG. 43 also includes an intermediate cylinder 632 disposed between an inner cylindrical 630 and an outer cylinder 631 which are eccentric, said intermediate cylinder being concentric with the outer cylinder 631, and the inner cylinder 630 and the intermediate cylinder 632 are bridged by an elastomeric member 637. Interposed between the outer cylinder 631 and the intermediate cylinder 632 are four actuators 638 and four elastomeric members 639 in staggered relation. These actuators 638 and elastomeric members 639 are alternately disposed and spaced apart by 45 degrees.

Figure 44:
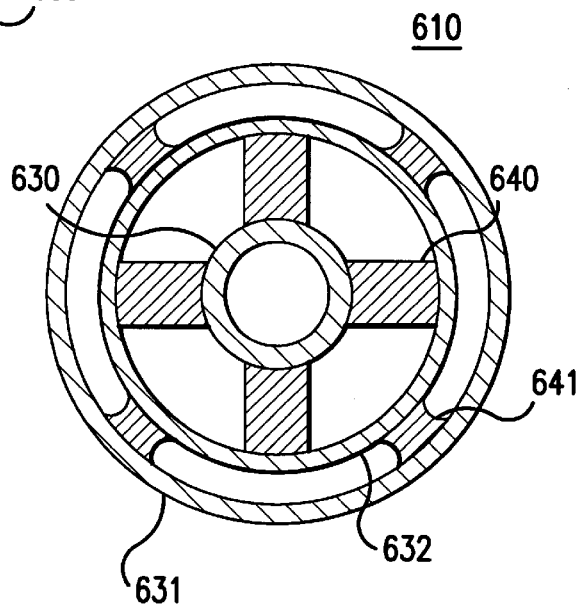

In the cylindrical engine mount shown in FIG. 44, all the inner, outer and intermediate cylinders 630, 631, 632 are disposed concentrically. Four actuators 640 are disposed between the inner cylinder 630 and the intermediate cylinder 632 and four elastomeric members 641 are disposed between the outer cylinder 631 and the intermediate cylinder 632, both at equal angular spacings of 90 degrees. However, each actuator 640 is displaced from the adjacent elastomers 641 by 45 degrees.

Figure 45:
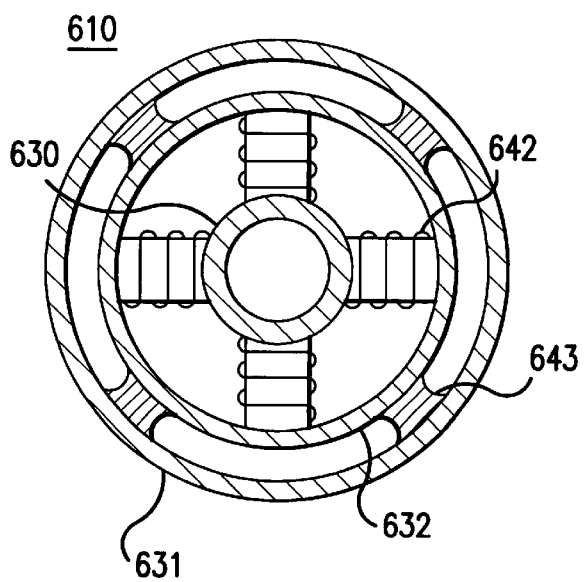

In the cylindrical engine mount 610 of FIG. 45, four magnetic strain actuators 642 are interposed between the inner cylinder 630 and the intermediate cylinder 632 and four elastomeric members 643 are interposed between the outer cylinder 631 and the intermediate cylinder 632, both at equal angular spacings of 90 degrees. However, there is an angular interval of 45 degrees between each magnetic strain actuator 642 and the adjacent elastomeric members 643.

Figure 46:
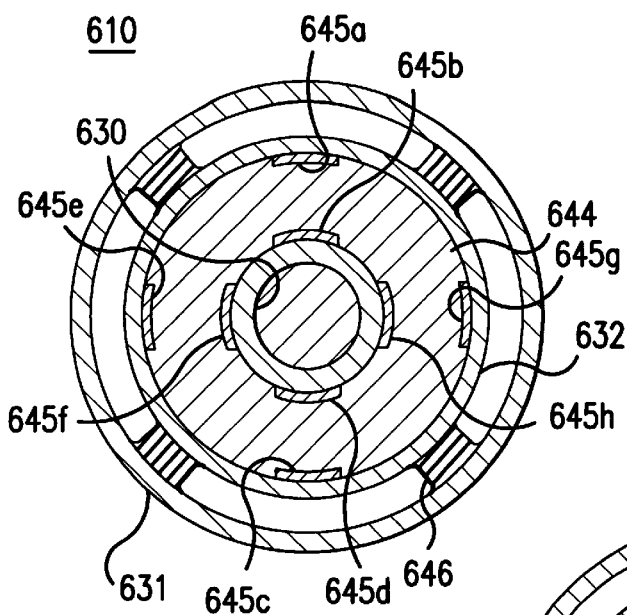

The cylindrical engine mount 610 illustrated in FIG. 46 includes an inner cylinder 630, an outer cylinder 631 and an intermediate cylinder 632, all in concentric relation. The space between the inner cylinder 630 and the intermediate cylinder 632 is filled with a piezoelectric ceramic actuator 644, with four pairs of electrodes 645a, 645b; 645c, 645d; 645e, 645f; and 645g, 645h being disposed flanking the filled piezoelectric ceramics at equal angular spacings of 90 degrees. Between the outer cylinder 631 and the intermediate cylinder 632, four elastomeric members 646 are arranged at equal angular spacings of 90 degrees. However, there is an interval of 45 degrees between each elastomeric member 646 and the adjacent electrodes. In this embodiment, too, either one of the electrode series may be omitted as in the case of FIG. 41.

Figure 47:
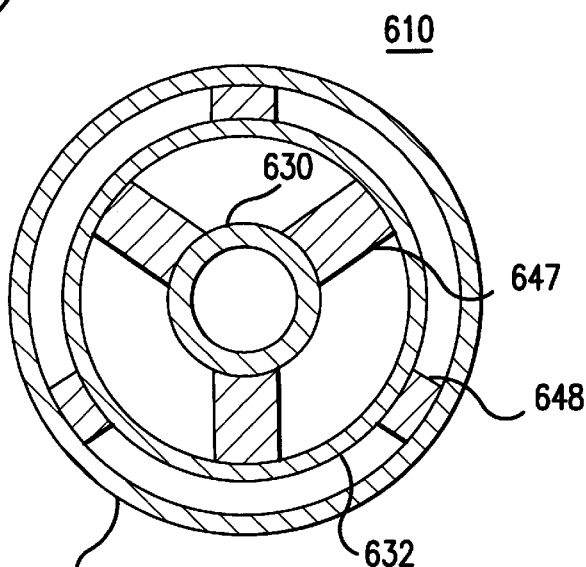

The cylindrical engine mount 610 illustrated in FIG. 47 also includes an inner cylinder 630, an outer cylinder 631 and an intermediate cylinder 632, all arranged in concentric relation. Three inner actuators 647 are interposed between the inner cylinder 630 and the intermediate cylinder 632 and three outer actuators 648 are interposed between the outer cylinder 631 and the intermediate cylinder 632, both at equal angular intervals of 120 degrees. However, the inner and outer actuators 647, 648 are staggered by 60 degrees. In this cylindrical engine mount 610, the two sets of actuators 647, 648 are connected in series between the engine and the vehicle body.

Figure 48:
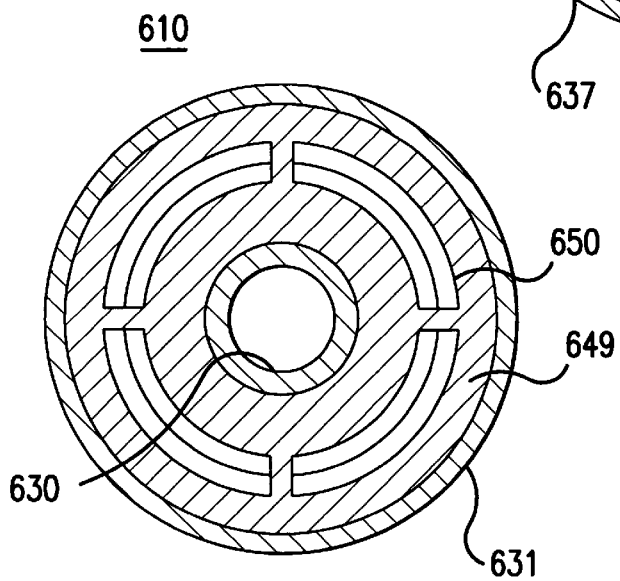

In the cylindrical engine mount 610 illustrated in FIG. 48, an elastomeric material 649 is filled between an inner cylinder 630 and an outer cylinder 631 which are in concentric relation, and four bimorph piezoactuators 650 are disposed within this elastomeric material 649 at equal angular intervals of 90 degrees. In lieu of the bimorph piezoactuator 650, an actuator comprising a pressure bag using the pressure of a liquid or air can likewise be employed.

Figure 49:
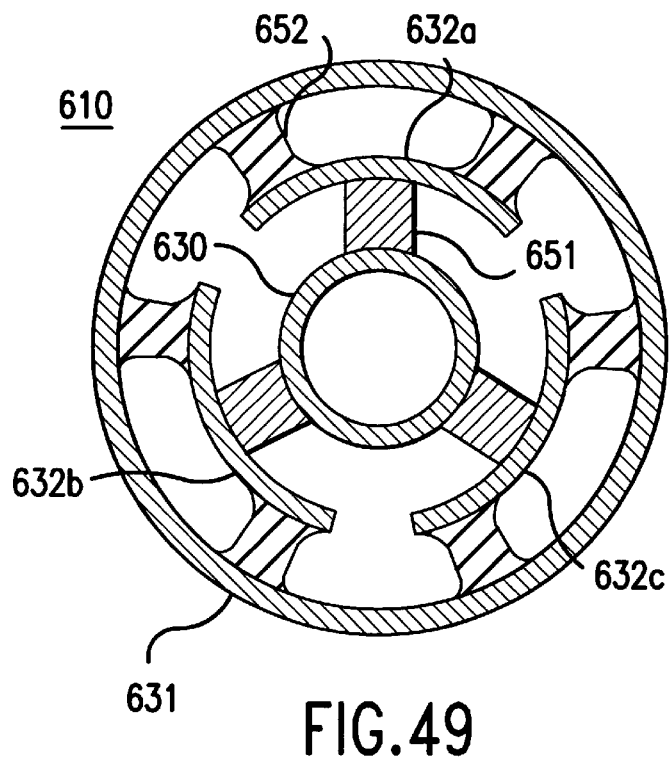

In the cylindrical engine mount 610 shown in FIG. 49, the intermediate cylinder 632 between the inner and outer cylinders 630, 631 is divided into three circumferential segments 632a, 632b and 632c. An actuator 651 is interposed between each of these three segments 632a, 632b, 632c and the inner cylinder 630, while a couple of elastomeric members 652 are interposed between each of the segments 632a, 632b, 632c and the outer cylinder 631.

Figure 50:
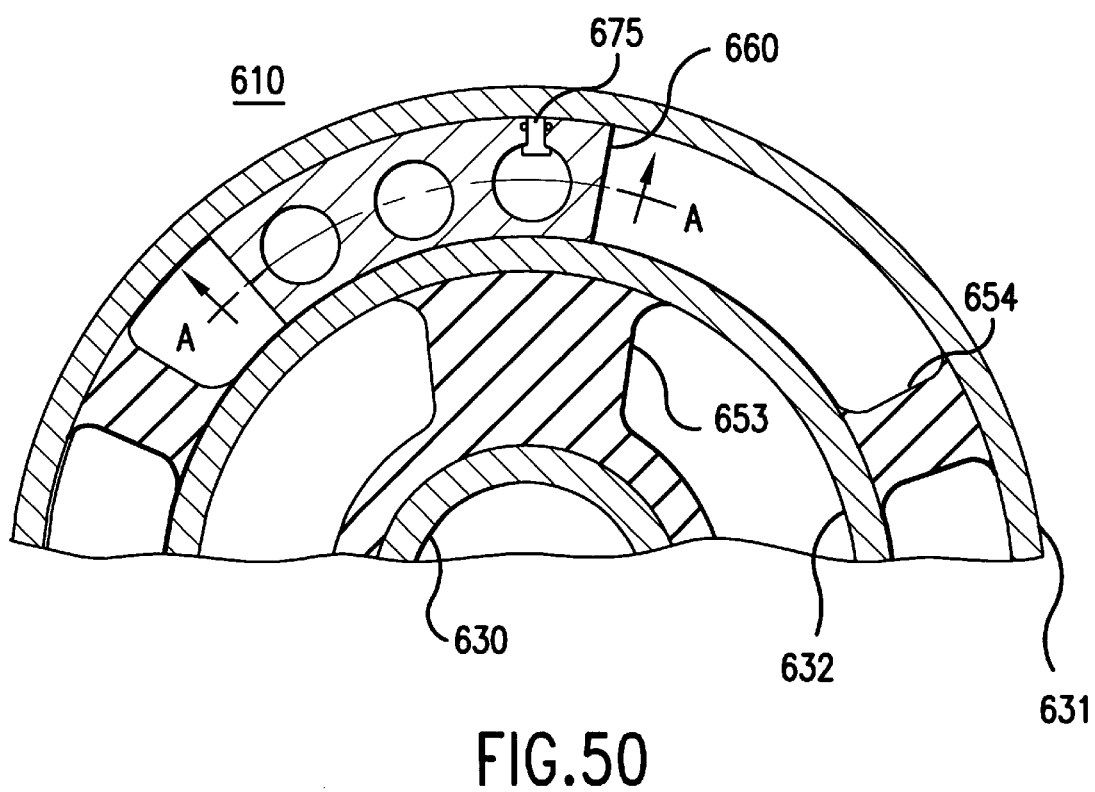
Figure 51:
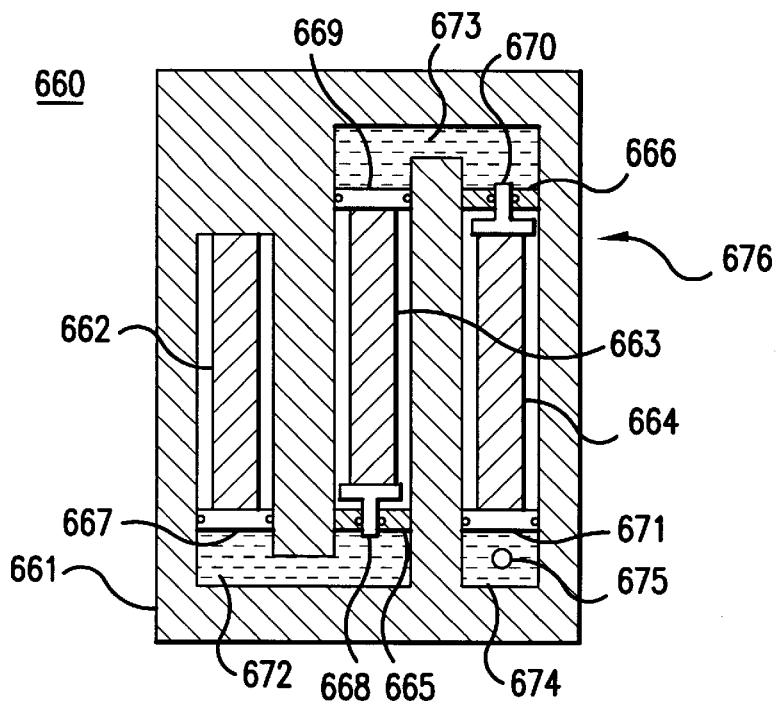
FIG. 51 is a sectional view taken along the line A—A of FIG. 50.

FIG. 50 is a sectional view showing a cylindrical engine mount equipped with an oscillating device comprising an actuator and an amplifying mechanism and FIG. 51 is a sectional view taken along the line A—A of FIG. 50, which indicates the internal structure of the oscillating device.

The cylindrical engine mount 610 shown in FIG. 50 includes an inner cylinder 630, an outer cylinder 631 and an intermediate cylinder 632, all arranged in concentric relation. The inner cylinder 630 and the intermediate cylinder 632 are bridged by an elastic member 653, while elastic members 654 and an oscillating unit 660 are interposed between the outer cylinder 631 and the intermediate cylinder 632.

The oscillating unit 660 is shown in detail in FIG. 51. Thus, a cavity having a generally sigmoid configuration is provided within a casing 661 and three actuators 662, 663, 664, each of which is a piezoelectric ceramic stack, are disposed in said cavity. As interposed between the adjacent actuators 662, 663, 664 and secured in position are plugs 665 and 666, each of which has a central through-hole as illustrated. One end of the first actuator 662 is abutted against the terminus of the sigmoid cavity in the casing 661, while the other end of the actuator 662 is abutted against a first flat piston 667 which is guided by the internal wall of the cavity. On the other hand, a first T-shaped piston 668 having a small-diameter portion and a large-diameter portion is disposed in such a manner that said small-diameter portion is guided by the through-hole of said first plug 665 and said large-diameter portion is abutted against one end of the second actuator 663. The other end of the second actuator 663 is abutted against a second flat piston 669 guided by the internal wall of the cavity. There also is provided a second T-shaped piston 670 whose small-diameter portion is guided by the through-hole of the second plug 666, with its large-diameter portion being abutted against one end of the third actuator 664. The other end of this third actuator 664 is abutted against a third flat piston 671 which is guided by the internal wall of the cavity. Thus formed are a first fluid chamber 672 between the first flat piston 667 and the first plug 665, a second fluid chamber 673 between the second flat piston 669 and the second plug 666, and a third fluid chamber 674 behind the third flat piston 671. In the third fluid chamber 674, an output piston 675 is disposed in an orientation perpendicular to the longitudinal direction of the respective actuators 662, 663, 664 and, as shown in FIG. 50, the free end of this output piston 675 is abutted against the internal surface of the outer cylinder 631.

The actuators 662, 663, 664 receive electric signals of the same phase and expand or contract in the same phase. As the first actuator 662 expands in response to an electric signal input, the first flat piston 667 is displaced downwards in the view of FIG. 51. As the first flat portion 667 is displaced downwards, the fluid in the first fluid chamber 672 transmits the pressure according to Pascal's law and the first T-shaped piston 668 is displaced on an exaggerated scale to raise the second actuator 663. Moreover, this second actuator 663 itself expands in response to the electric signal input. As this action repeats, the output piston 675 is driven in an amplified fashion. Here is formed an amplifying mechanism 676 for amplifying the mechanical oscillation of the three actuators 662, 663, 664 connected in series. In this manner, major vibrations of the engine are cancelled by the oscillations of the oscillating unit 660. Therefore, this apparatus is capable of coping with low-frequency, large-amplitude vibrations such as shake vibrations. Furthermore, since the actuators 662, 663, 664 are axially oriented along the clearance between the outer cylinder 631 and the intermediate cylinder 632, the thickness of the oscillating unit 660 is small so that the actuators 662, 663, 664 and the amplifying mechanism 676 can be compactly built into this cylindrical engine mount 610 without increasing the size of the mount 610.

Several modifications of this oscillating unit 660, illustrated in FIGS. 52 through 57, are now described.

Figure 52:
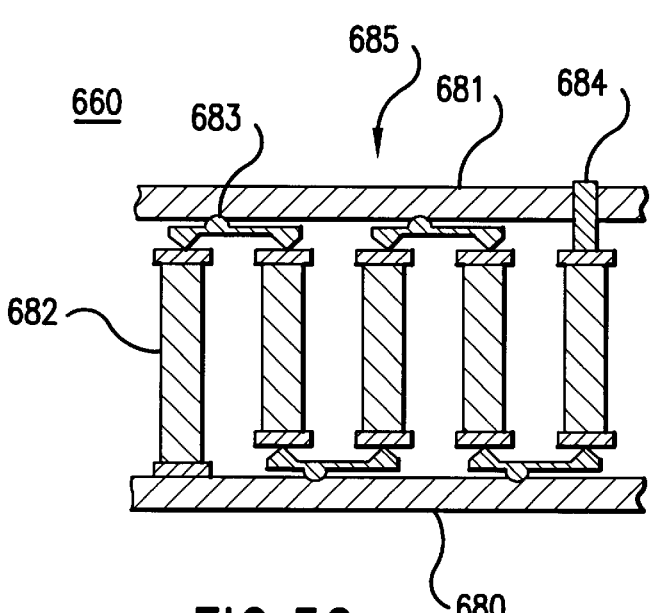
FIGS. 52 through 57 each is a sectional view showing a modification of the oscillating unit.

The oscillating unit 660 illustrated in FIG. 52 represents an application of leverage to the amplifying mechanism. Between a lower plate 680 and an upper plate 681 of a casing, a plurality of actuators 682 are connected in parallel. A lever 683 having arms of different lengths is interposed between adjacent actuators 682 and an output piston 684 is disposed in the final output stage. Here, too, is formed an amplifying mechanism 685 for amplifying the mechanical oscillation of the series of plural actuators 682.

Figure 53:
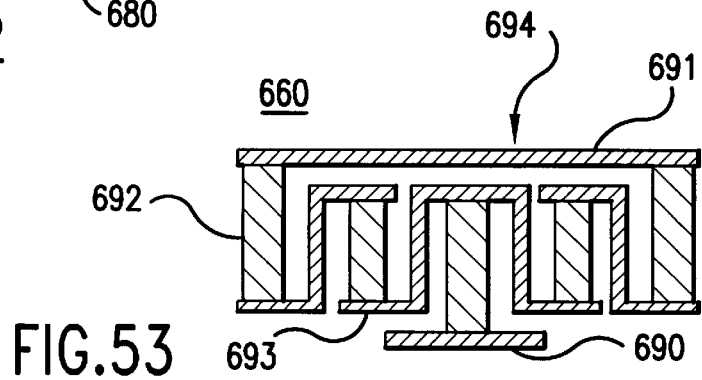

In the oscillating unit 660 illustrated in FIG. 53, a plurality of actuators 692 are interposed between a lower plate 690 and an upper plate 691, and these actuators are connected in series through metal bends 693. Here is formed an amplifying mechanism 694 for the respective actuators 692.

Figure 54:
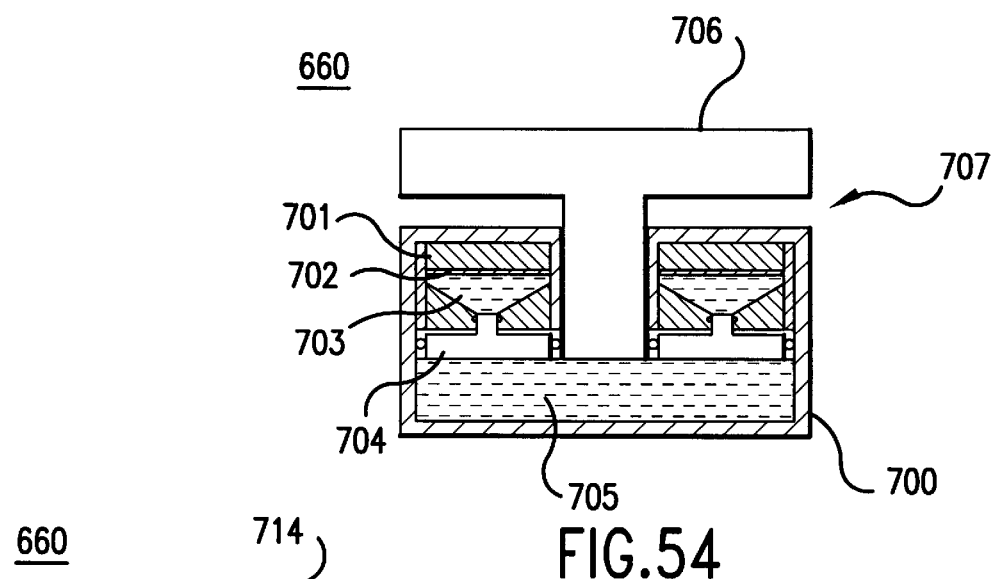

In the oscillating unit 660 of FIG. 54, an actuator 701 is disposed in a bottomed casing 700 having a central aperture and a seal rubber 702 is affixed to the underside of said actuator 701 so that the fluid contained in a small fluid chamber 703 disposed below does not contact the actuator 701. The small fluid chamber 703 has the same sectional area as the actuator 701 at the top and diminishes in sectional area progressively in a downward direction. The bottom of the small fluid chamber 702 is in contact with a small-diameter portion of a T-shaped piston 704 which has the small-diameter portion and a large-diameter portion which adjoins to a large fluid chamber 705 defined by the bottom of a large T-shaped piston. The small-diameter portion of the large T-shaped piston 706 is inserted into the central aperture of the casing 700. However, the sectional area of the small-diameter portion of the large T-shaped piston 706 is smaller than the sectional area of the large-diameter portion of the small T-shaped piston 704. In this oscillating unit 660, two stages of pistons 704, 706 constitute an amplifying mechanism 707 for the actuator 701. It should be understood that with the part identified by reference numerals 701 through 704 being regarded as one unit, a plurality of such units can be installed (two units at right and left in FIG. 54) and that such a unit can be constituted as an annular actuator around the small-diameter portion of the large T-shaped piston 706.

Figure 55:
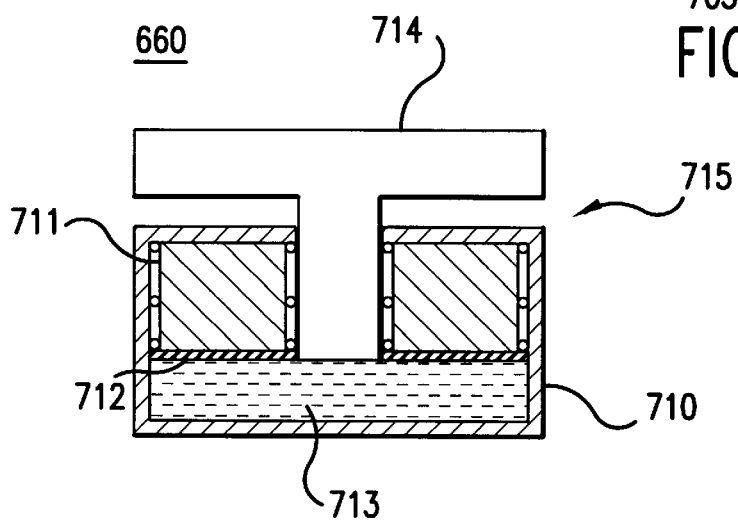

In the oscillating unit of FIG. 55, too, an actuator 711 is disposed within a bottomed casing having a central aperture. Affixed to the underside of this actuator 711 is a seal rubber 712 so that the fluid contained in a fluid chamber 713 defined in the bottom portion of the casing 710 will not contact the actuator 711. Furthermore, the small-diameter portion of a T-shaped piston 714 is guided in the central aperture of the casing 710. However, the sectional area of the small-diameter portion of the T-shaped piston 714 is smaller than the sectional area of the underside of the actuator 711. In this oscillating unit 660, the mechanical oscillation of the actuator 711 is amplified in proportion to the sectional area ratio between the underside of the actuator 711 and the small-diameter portion of the T-shaped piston 714. Here is formed an amplifying mechanism 715 for the actuator 711. As mentioned with reference to FIG. 54, the actuator 711 may also be constituted as a plurality of actuator units or as an annular actuator.

Figure 56:
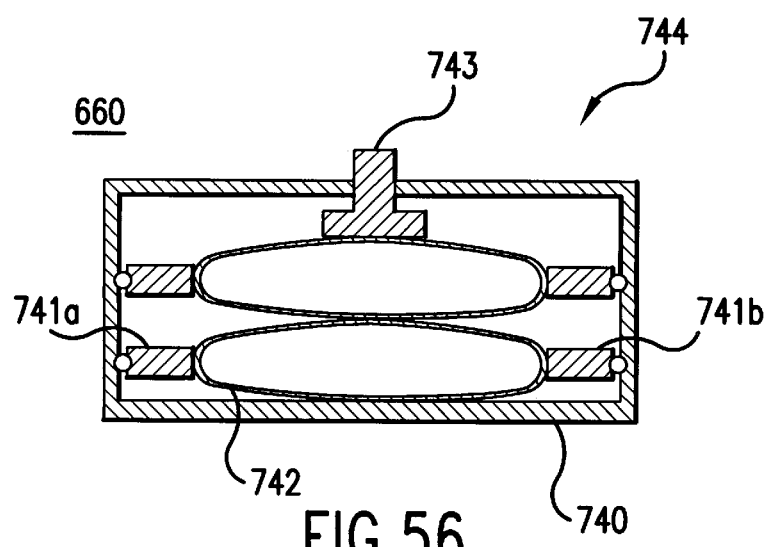

In the oscillating unit 660 illustrated in FIG. 56, a couple of actuators 741*a,* 741*b* are juxtaposed on both sides of an elliptical ring 742 within a casing 740. Moreover, two units of such set of actuators 741*a,* 741*b* and elliptical ring 742 are disposed in two stages, with an output piston 743 resting on the upper elliptical ring 743 in its approximate center. As the actuators 174*a,* 174*b* on both sides expand, the center height of the corresponding elliptical ring 742 is increased and, as a consequence, the output piston 743 is pushed up appreciably. Thus is formed an amplifying mechanism 744 for the actuators 741*a*, 741*b*. In the case of the two-stage arrangement, the amplification factor is doubled as compared with the single-stage arrangement.

Figure 57:
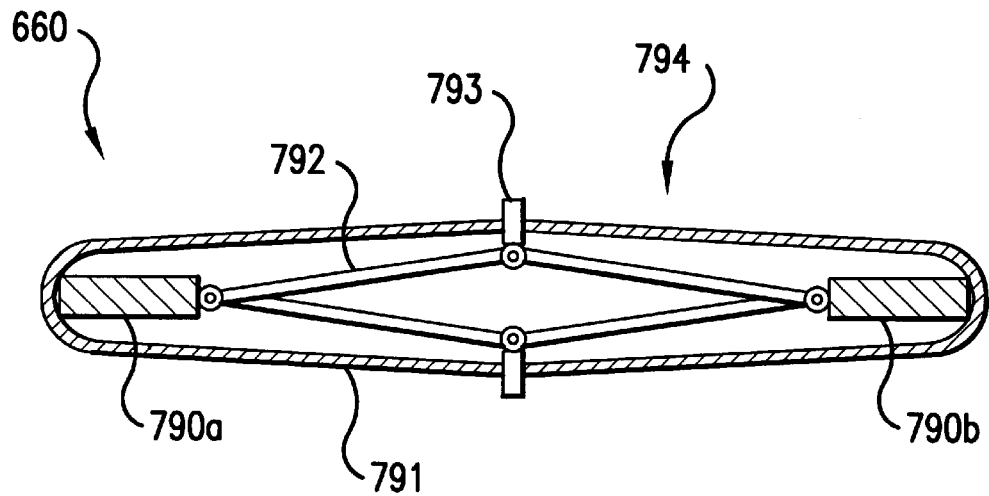

In the oscillating unit 660 shown in FIG. 57, a couple of actuators 790*a*, 790*b* are supported, at the respective ends, by the inner surfaces of the respective bends of an elliptical ring 791 and the other ends of the respective actuators 790*a*, 790*b* are abutted against links of a pantagraph structure, with an actuating rod 793 projecting upwards from a link 79, thus forming an amplifying mechanism 794.

Aside from the above, the amplifying mechanisms described with reference to FIGS. 2 through 20 can likewise be selectively employed.

Figure 58:
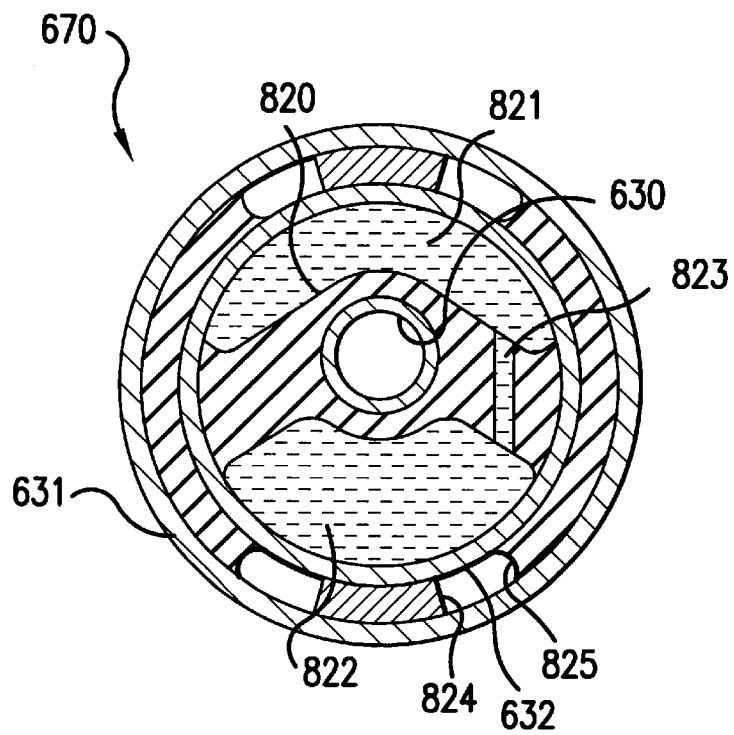
FIG. 58 is a damping apparatus as still another embodiment of the invention.

FIG. 58 is a sectional view showing still another cylindrical engine mount embodying the principles of the invention.

The cylindrical engine mount 610 includes an inner cylinder 630 and an outer cylinder 631 which are disposed in eccentric relation as well as an intermediate cylinder 632 which is concentric with respect to the other cylinder 631. The arrangement between the inner cylinder 630 and the intermediate cylinder 632 is similar to that in the fluid seal type engine mount described with reference to FIG. 30. Thus, the inner cylinder 630 and the intermediate cylinder 632 are bridged by an elastic member 820 to form a pair of radially juxtaposed fluid chambers 821, 822, which are intercommunicated by way of an orifice 823. Interposed between the outer cylinder 831 and the intermediate cylinder 832 are two actuators 824 and two elastic members 825. However, the respective actuators 824 and elastic members 825 are uniformly staggered by 90 degrees. In this cylindrical mount 610, the damping function of the actuators 824 and the damping function of the liquid seal elastic structure between the inner cylinder 630 and the intermediate cylinder 632 can be utilized in combination.

While the cylindrical mounts 610 described above as embodiments of the invention are invariably comprised of 2 or 3 cylinders, damping apparatuses can be constituted of 4 or more concentrically disposed cylinders. Moreover, the present invention can be embodied in other devices than cylindrical engine mounts. Thus, the principles of the invention are applicable to all cylindrical damping devices for arresting or suppressing the propagation of mechanical vibrations between two structures, at least one of which structures is a vibration source.

Figure 62:
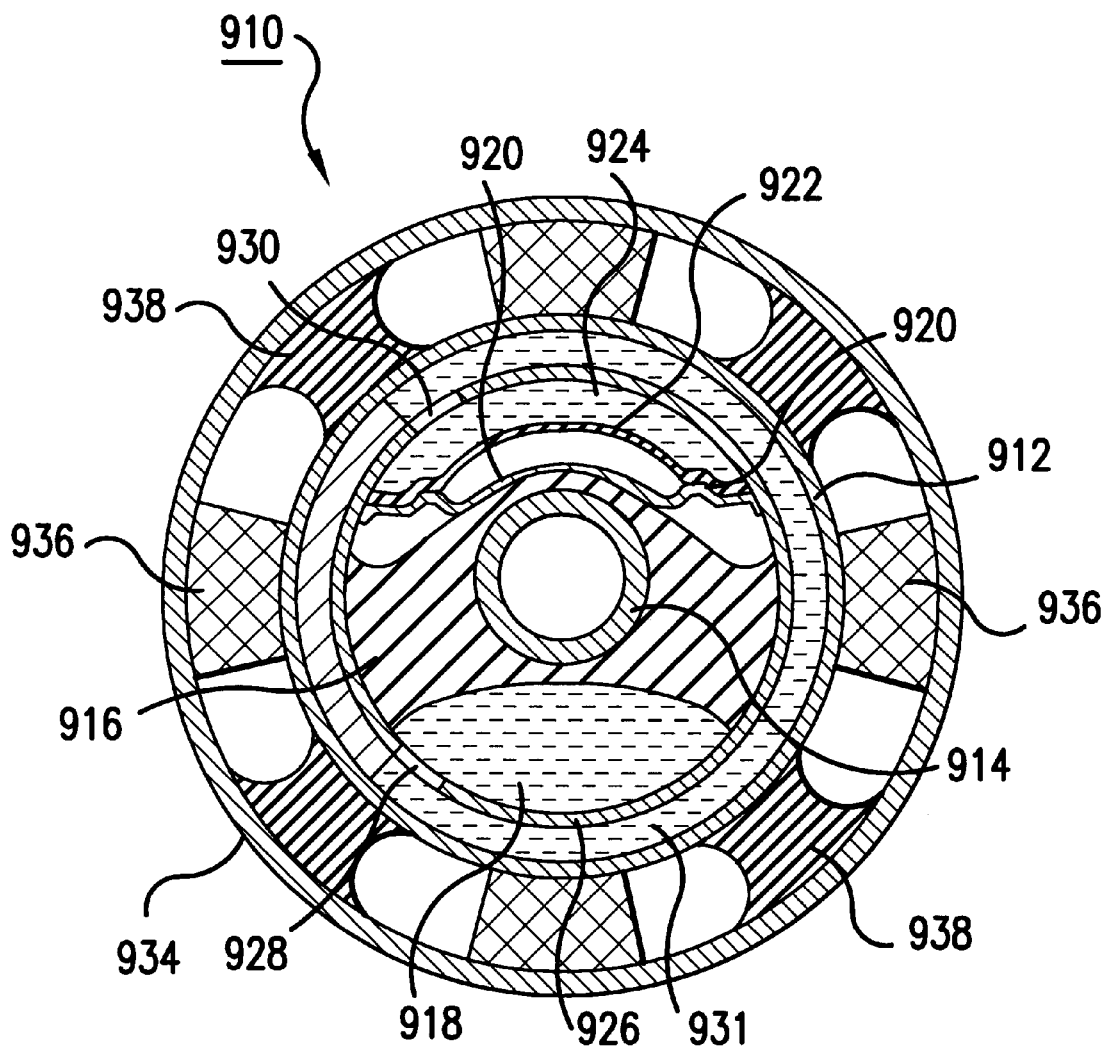
FIG. 62 is a sectional view showing an embodiment of the fourth invention.

FIG. 62 shows an embodiment of the fourth invention.

Figure 72:
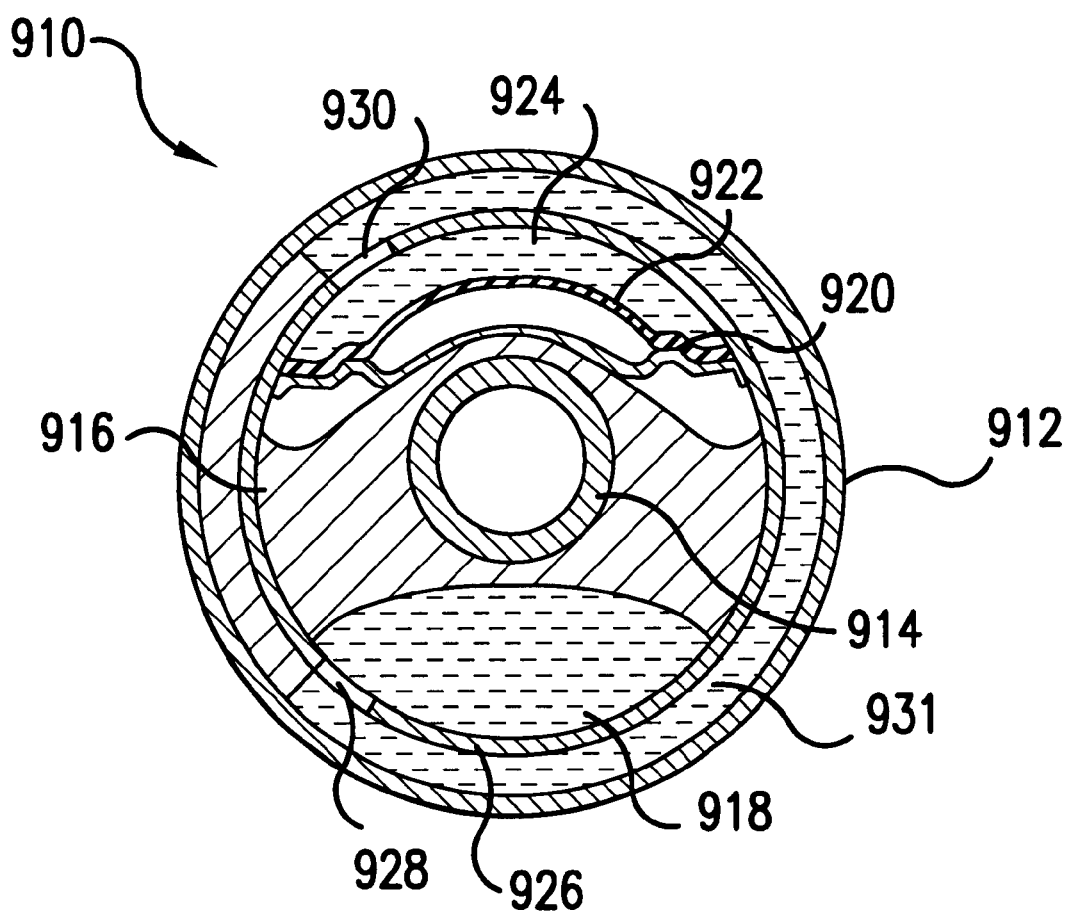
FIG. 72 is a sectional view showing still another example of the conventional cylindrical liquid seal engine mount for an FF motor vehicle.

In this embodiment, the arrangement of an outer cylinder 912, an inner cylinder 914, a supporting rubber 916, two fluid chambers 918, 924, a circumferential orifice 926, etc. is similar to that illustrated in FIG. 72. However, this embodiment further comprises a jacket cylinder 934 for retaining actuator units 936 as disposed externally of, and in concentric relation with, the outer cylinder 912. Between this jacket cylinder 934 and the outer cylinder 912, the actuator units 936 and elastic members 938 are alternately and circumferentially disposed. The actuator units 936 are intended to generate a positive mechanical oscillation between the outer cylinder 912 and the actuator-supporting jacket cylinder 934 and may be one utilizing any of electric strain, magnetic strain, liquid pressure, air pressure, electromagnetic force, motor-cam combination, electric fluid, magnetic fluid and so on.

As in the case of FIG. 72, the inner cylinder 914 of this engine mount 910 is connected to the engine of a motor vehicle, while its outer cylinder 912 is connected to the vehicle body. As the actuator units 936 are excited in response to vibrations of the engine, the oscillations of the actuator units 936 are superimposed on the engine vibrations to produce an engine damping effect. This type of actuator unit is particularly useful for the damping of high-frequency, small-amplitude vibrations. As in the case of FIG. 72, vibrations with comparatively low frequencies are attenuated by the liquid column resonance of the circumferential orifice 930.

Figure 63:
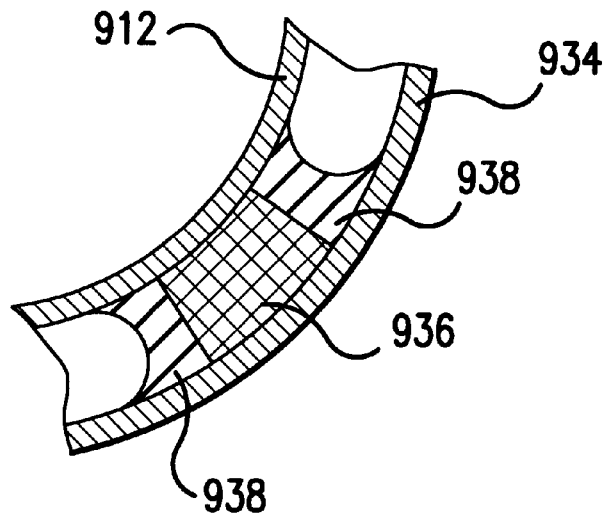
FIG. 63 is a sectional view showing the cardinal part of a modification of the embodiment illustrated in FIG. 62.
Figure 64:
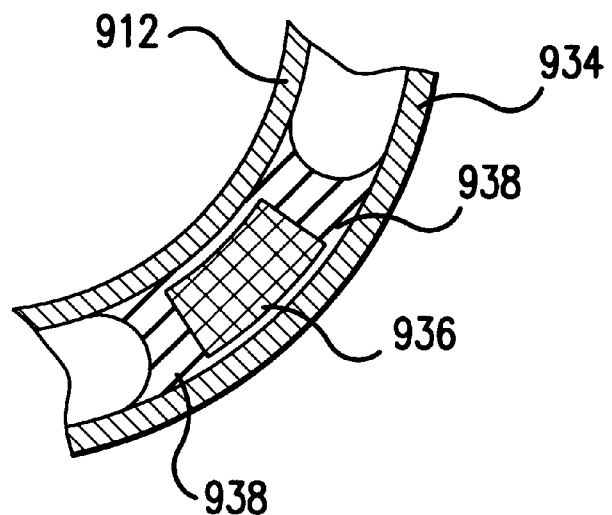
FIG. 64 is a sectional view showing the cardinal part of still another modification of the embodiment illustrated in FIG. 62.

In the above embodiment, the actuator units 936 and the elastic members 938 for retaining the jacket cylinder 934 are alternately disposed in the circumferential direction. However, it may be so arranged that each actuator unit 936 is supported by elastic members 938 from both sides as shown in FIG. 63 or that each actuator unit 936 is embedded in an elastic element 938.

Figure 65:
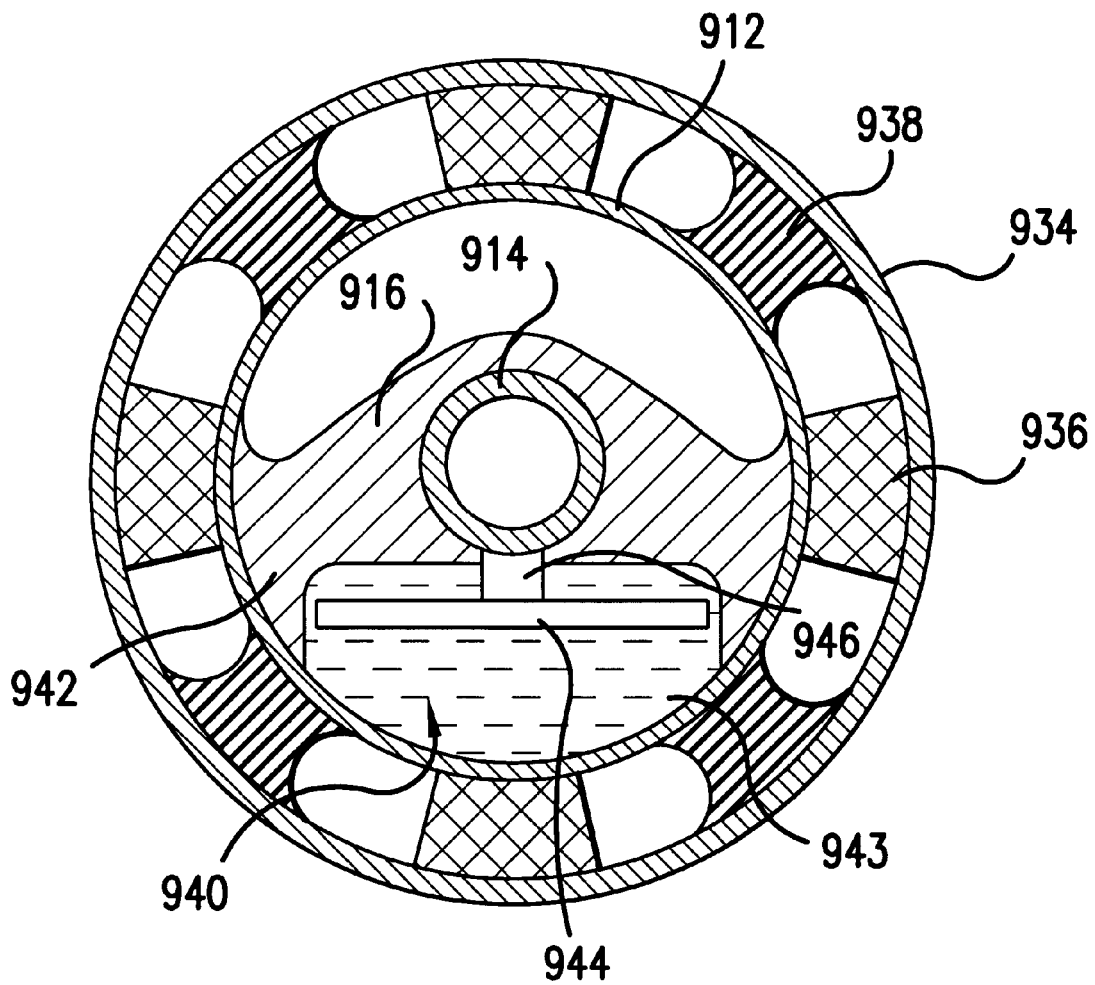
FIG. 65 is a sectional view showing another embodiment of the invention.

FIG. 65 shows another embodiment of the invention.

In this embodiment, the arrangement between an outer cylinder 912 and an actuator-supporting jacket cylinder 934 is similar to that illustrated in FIG. 62. Internally of the outer cylinder 912, however, there is no circumferential orifice 930 unlike in the embodiment of FIG. 62, and instead a dash pot 940 is provided. To be specific, the supporting rubber 916 bridging the inner and outer cylinders 921, 914 extends downwards in the view to form a dash pot cylinder 942. The cylinder 942 internally defines a fluid chamber 943 in which a dash pot piston 944 is disposed. This piston 944 is attached to the inner cylinder 914 through a supporting shaft 946.

In this embodiment, low-frequency, large-amplitude vibrations are attenuated by the viscosity resistance of a dash pot 940.

Figure 66:
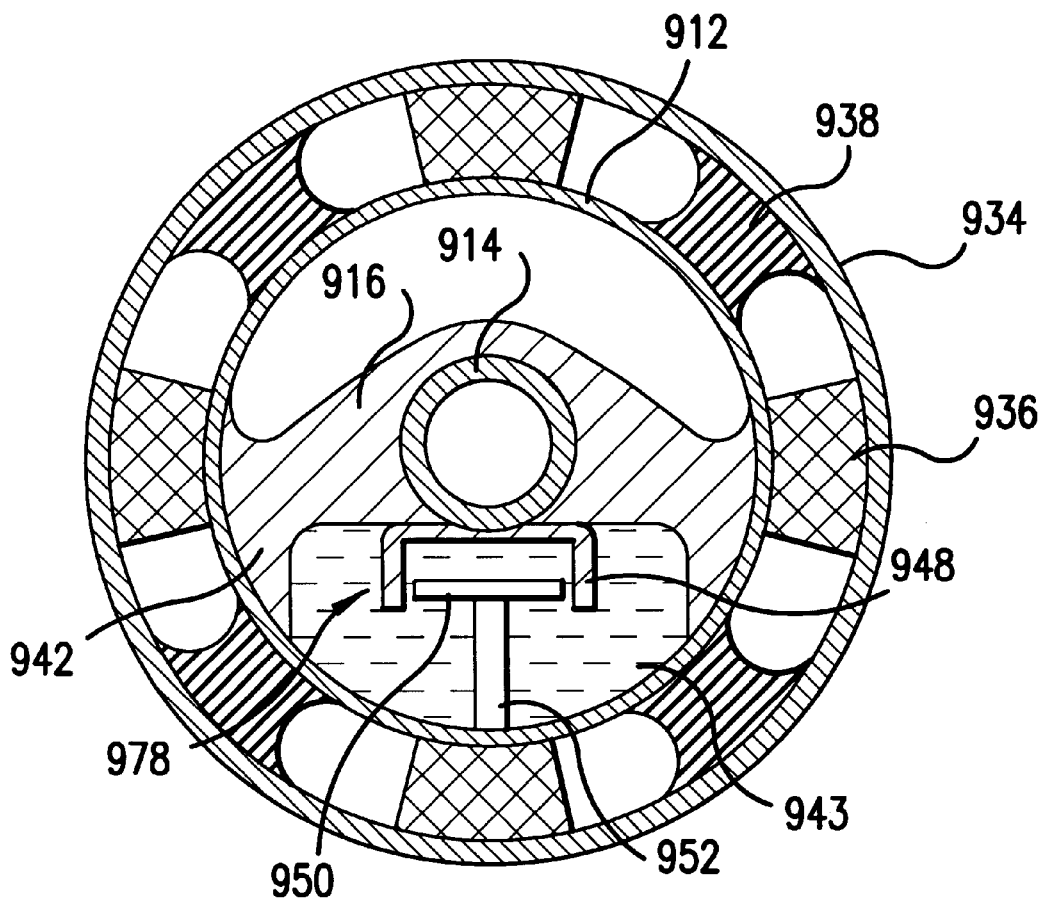
FIG. 66 is a sectional view showing a modification of the embodiment illustrated in FIG. 65.

Illustrated in FIG. 66 is a modification of the embodiment shown in FIG. 65.

In this embodiment, a dash pot cylinder 948 independent of a supporting rubber member 916 is abutted against the lower end, in the view, of an inner cylinder 914. Moreover, a dash pot piston 950 is rigidly secured to an outer cylinder 912 through a supporting rod 952 in the position facing said cylinder 948.

Figure 67:
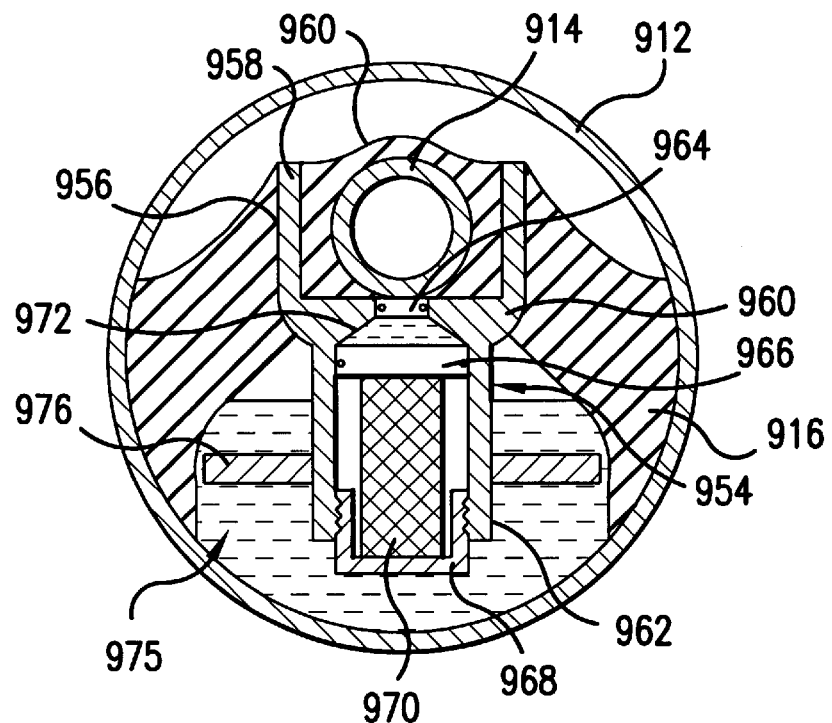
FIG. 67 is a sectional view showing still another embodiment.

FIG. 67 shows another embodiment of the invention.

In this embodiment, an actuator unit 954 is interposed between an inner cylinder 912 and an outer cylinder 914. To be specific, this actuator unit 954 includes a piezohermetic case 956 having an upper supporting portion 958 which is secured to the outer cylinder 914 through a supporting rubber member 916 and to the inner cylinder 914 through a supporting rubber member 960. The case 956 further has a flange portion 960 which downwardly forms a cylindrical housing 962. The flange portion 960 is open at top and bottom and a small-diameter piston 964 is disposed in the top aperture and a large-diameter piston 966 in the bottom aperture, each in vertically slidable relation. The housing 962 has a bottomed cap 968 threaded into its bottom aperture. Disposed in the housing 962 is a piezoactuator 970, the lower end of which is supported by said bottomed cap 968, with the top end thereof being abutted against the underside of said large-diameter piston 966.

In this embodiment, the output of an acceleration sensor not shown is applied to an actuator unit controller not shown and this actuator unit controller applies an electric oscillation signal corresponding to the magnitude of acceleration sensor output to the piezoactuator 970. Thereupon the piezoactuator 970 expands or contacts vertically to a minor extent. Since a fluid chamber 972 defined by the large-diameter and small-diameter pistons 964, 966 has a large sectional area at bottom and a small sectional area at top, the minute mechanical oscillation of said piezoactuator 970 is amplified in proportion to the ratio of said sectional area in accordance with Pascal's law and applied to the small-diameter piston 964. In this manner, as the engine sags, the small-diameter piston 964 is downwardly displaced by the amount equivalent to the amount of sag of the engine in response to the output from said acceleration sensor, while the small-diameter piston 964 ascends by the amount equivalent to the amount of rise of the engine.

In the fluid chamber 972, a bellowsphragm and a diaphragm may be disposed at top and bottom, respectively, as taught by Japanese Patent Application No. 2-314984. In this arrangement, the leakage of the fluid from the fluid chamber 972 can be prevented. Instead, a fluid contained in a rubbery film material may be loaded into the fluid chamber 972. Moreover, as an alternative vibration transmission medium, a non-compressible elastomer or gel-like substance may be filled into the fluid chamber 972. In this case the use of said rubbery film material can be omitted, for there is no risk of leakage. In lieu of the liquid medium, finely divided particles, preferably surface-coated with lubricating oil, may be filled into the fluid chamber 972. Provided that the size of individual particles is set larger than the fitting clearance between the large-diameter and small-diameter pistons 964, 960, chances for emigration of the particles can be precluded.

Thus, in this embodiment, high-frequency, small-amplitude vibrations can be attenuated by the piezoactuator unit 970. Furthermore, as the apparatus includes a dash pot piston 976 externally of the housing 962 forming a part of the piezohermetic case 956, low-frequency vibrations are attenuated by the viscosity resistance of this dash pot.

Figure 68:
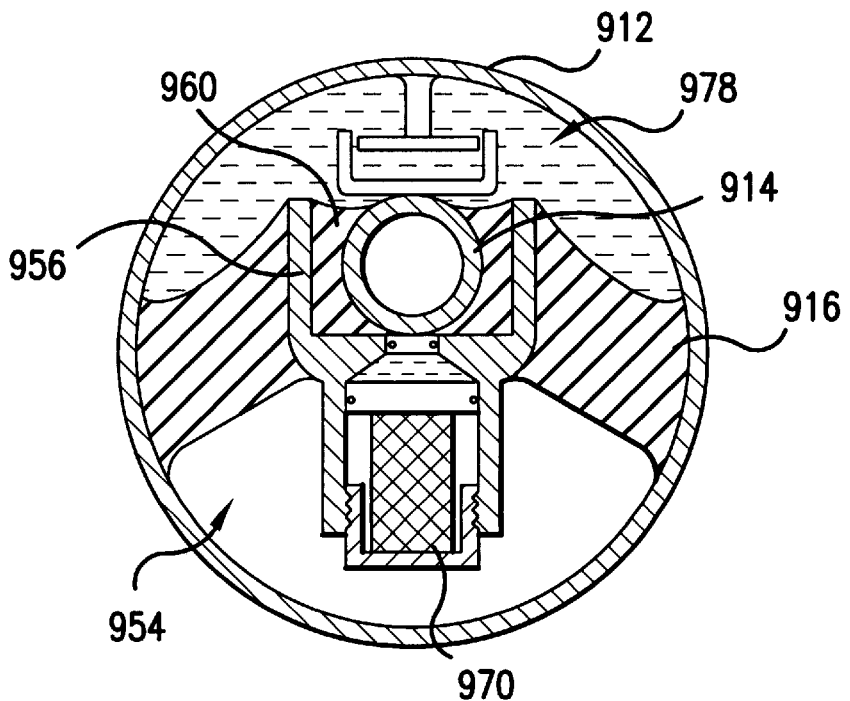
FIG. 68 is a sectional view showing a modification of the embodiment illustrated in FIG. 67.

FIG. 68 shows a modification of the embodiment illustrated in FIG. 67 and includes a dash pot mechanism 978 similar to that shown in FIG. 66 in lieu of the dash pot mechanism 975 of FIG. 67.

Figure 69:
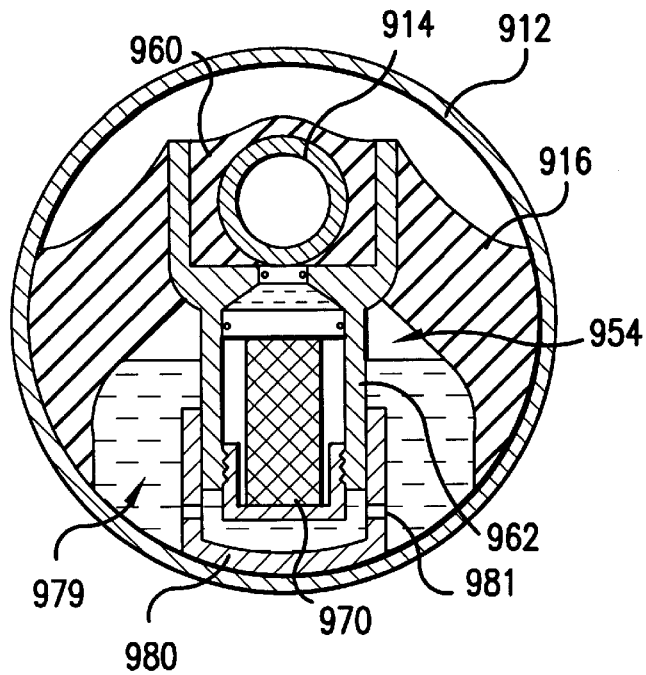
FIG. 69 is a sectional view showing a further modification of the embodiment shown in FIG. 68.

FIG. 69 shows a still another modification of the embodiment illustrated in FIG. 67. In this embodiment, the dash pot mechanism 979 includes a U-shaped cup 980 fitted around the outer periphery of a piezoactuator housing 962 and this cup 980 has an orifice 981. The viscosity resistance of the fluid flowing through the orifice 981 produces a dash pot effect.

Figure 70:
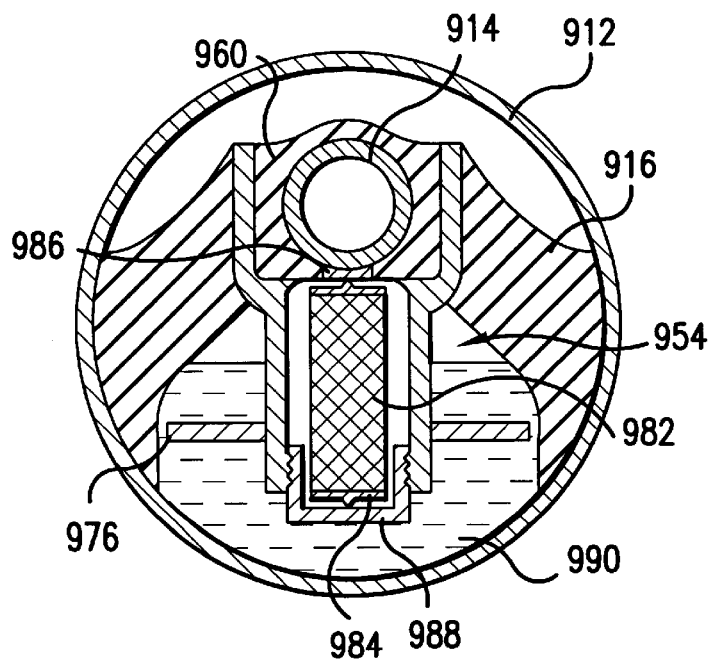
FIG. 70 is a sectional view showing still another modification of the apparatus illustrated in FIG. 68.

FIG. 70 is still another modification of the embodiment illustrated in FIG. 67. The piezoactuator 970 in this embodiment has no amplifying mechanism. Thus, platens 982, 984 each having a central projection are disposed at the top and bottom, respectively, of a piezoactuator 970 and touch plates 986, 988 are disposed inwardly of an inner cylinder 914 and a bottomed cap 968, respectively, with said projections of platens 982, 984 being abutted against said touch plates 986, 988.

Figure 71:
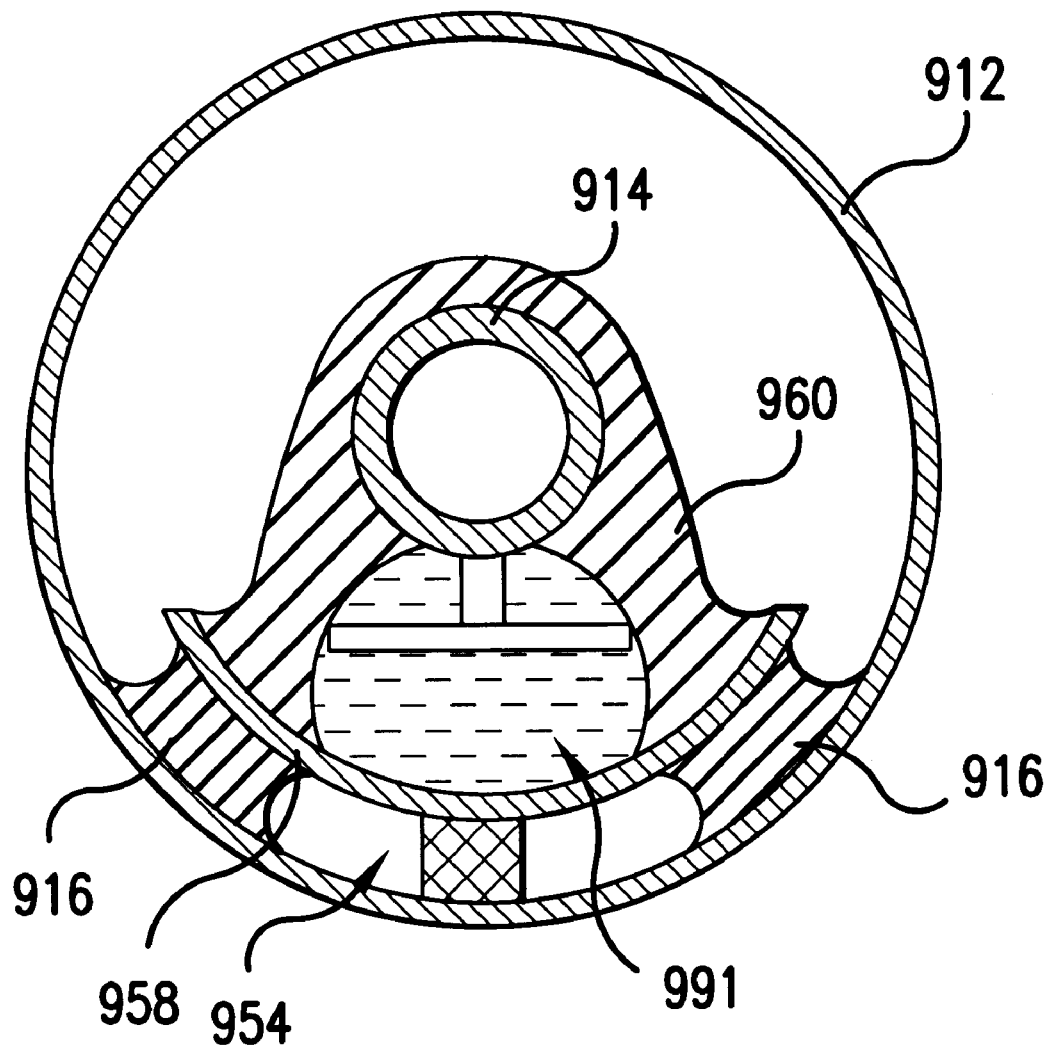
FIG. 71 is a sectional view showing still another embodiment.

While the output end of the actuator unit 954 is abutted against the inner cylinder 914 in FIGS. 67 through 70, the output end may be abutted against the outer cylinder 912. Thus, as illustrated in FIG. 71, an arcuate supporting member 958 is disposed within an outer cylinder 912 and secured to the outer cylinder 912 through supporting rubber 916 and to an inner cylinder 914 through supporting rubber 960. Then, the actuator unit 954 is installed between the supporting member 958 and the outer cylinder 912, with its output end abutted against the outer cylinder 912. A dash pot mechanism 991 is disposed between the supporting member 958 and retaining rubber 960.

What is claimed is:

1. A damping apparatus for damping a vibration of an engine supported within a structure, comprising:

a hydraulic engine mount;

an actuator having a transducer for transforming an electrical oscillation into a mechanical oscillation;

said actuator including an amplifying mechanism arranged to amplify a displacement of said mechanical oscillation and produce an amplified displacement in a first direction;

said hydraulic engine mount and said actuator being serially connected and interposed between said structure and said engine;

said actuator being mounted with said first direction oriented to superimpose said amplified displacement, of said amplifying mechanism, on said vibration and being positioned between said hydraulic engine mount and one of said engine and said structure;

a sensor mount to transform said vibration of said engine into an electric output signal; and a control means, responsive to said electric output signal of said sensor, for applying said electrical oscillation to said actuator to damp said vibration.

2. The damping apparatus of claim 1 wherein:

said actuator includes a housing and said transducer being annular and housed in said housing; and said amplifying mechanism includes said housing defining a fluid chamber which is annular and filled with a fluid medium, said fluid chamber having a first opening facing said transducer wherein said transducer occupies an area of said first opening, said fluid chamber having a second opening sealed by a displaceable member, said area of said first opening being larger than an area of said second opening such that displacement of said fluid medium by said mechanical oscillation of said transducer effects a displacement of said displaceable member at said second opening corresponding to said amplified displacement.

3. The damping apparatus according to claim 2 wherein said fluid medium is one of a gel, an elastomeric material and particulate matter.

4. The damping apparatus according to claim 2 wherein said displaceable member is an elastic sheet.

5. The damping apparatus according to claim 2 wherein said fluid medium is contained in an elastic membrane.

6. The damping apparatus of claim 1 wherein:

said actuator includes a housing and said transducer being housed in said housing and oriented such that said displacement of said mechanical oscillation is directed in a second direction substantially perpendicular to said first direction;

said amplifying mechanism includes said housing defining fluid chambers having first and second openings, said fluid chambers having fluid medium therein and said second openings each being sealed by a displaceable member, said transducer having two opposing ends with a piston coupled to each so as to be displaced relative to each other by said mechanical oscillation, said pistons communicating with said fluid chambers via said first openings to effect displacement of said fluid medium in said fluid chambers;

said second openings have areas less than a piston face area of said pistons such that displacement of said displaceable members at said second openings effected by displacement of a volume of said fluid by said pistons corresponds to said amplified displacement; and said second openings face in said first direction such that said displaceable members are displaced in said first direction.

7. The damping apparatus according to claim 6 wherein said fluid medium is one of a gel, an elastomeric material and particulate matter.

8. The damping apparatus according to claim 6 wherein said displaceable members are elastic sheets.

9. The damping apparatus according to claim 6 wherein said displaceable members are pistons.

10. The damping apparatus according to claim 6 wherein said fluid medium is contained in an elastic membrane.

11. The damping apparatus of claim 1 wherein:

said transducer has first and second ends and is expandable and contractible in response to said electrical oscillation such that said first and second ends are displaced relative each other by said mechanical oscillation, and said transducer is oriented such that said displacement of said mechanical oscillation is directed in a second direction substantially perpendicular to said first direction;

said amplifying mechanism includes first and second connecting members each having one of a V-shape and a U-shape configuration with an apex at a mid-portion thereof abutting a respective one of said first end and said second end of said transducer and said first and second connecting members each having first and second connecting member ends; and said amplifying mechanism further includes first and second plates extending on opposite sides of and in parallel with said transducer and means for connecting said first connecting member ends to said first plate and for connecting said second connect member ends to said second plate such that said mechanical oscillation of said transducer displaces said first and second plates in said first direction.

12. The damping apparatus of claim 1 wherein:

said amplifying mechanism includes:

an elongated oval member having first and second sides joined at ends thereof by U-bends to form an oval configuration, said first side being divided into two side members by a gap, and said elongated oval member being disposed with an elongate direction thereof substantially perpendicular to said first direction;

first and second U-shaped spring members each having first and second ends connected respectively to said first and second sides, said first ends of said first and second U-shaped spring members being connected respectively to one and another one of said two side members, said first and second U-shaped spring members being disposed with U-bends thereof facing said U-bends of said elongated oval member; and said transducer includes first and second oscillating elements that are expandable and contractible in said elongate direction and are mounted respectively between said U-bends of said first and second U-shaped spring members and facing ones of said U-bends of said elongated oval member such that expansion and contraction of said first and second oscillating elements effects displacement of said two side members corresponding to said amplified displacement.

13. The damping apparatus of claim 1 wherein said amplifying mechanism comprises:

a resilient elongated oval member with first and second sides joined at ends thereof by U-bends to form an oval configuration, and said resilient elongated oval member being disposed with an elongate direction thereof substantially perpendicular to said first direction;

said amplifying mechanism having said transducer disposed within said resilient elongated oval member, said transducer being expandable and contractible in said elongate direction; and said amplifying mechanism having screws threaded through said U-bends with leading ends of said screws abutting ends of said transducer such that expansion and contraction of said transducer effects displacement of said first and second sides corresponding to said amplified displacement.

14. The damping apparatus of claim 1 wherein said amplifying mechanism comprises a mounting jig member connectable to said structure and having a center and a periphery, said transducer being disposed at said periphery of said mounting jig member in a position wherein said transducer and expands and contracts in said first direction, a lever having a first end pivotally connected to said periphery of said mounting jig member and outside of said transducer, said lever contacting said transducer at a first distance from said first end, said lever having a second end contacting said hydraulic engine mount, and a second distance from said second end to said transducer being greater than said first distance such that expansion and contraction of said transducer effects displacement of said lever corresponding to said amplified displacement.

15. The damping apparatus of claim 1 wherein said actuator further comprises a mounting jig member connectable to one of said engine and said structure, said transducer being mounted between said mounting jig member and said hydraulic engine mount and being expandable and contractible in said first direction, and a lever contacting said transducer and having a forward end contacting said mounting jig such that expansion and contraction of said transducer effects displacement of said lever corresponding to said amplified displacement.

16. The damping apparatus of claim 1 wherein:

said transducer is disposed expandable and contractible in a direction substantially perpendicular to said first direction; and said amplifying mechanism includes connecting members which are one of V-shaped or U-shaped, said connecting members having apices abutting opposing ends of said transducer, two plates extending along opposing sides of and in parallel with said transducer, said connecting members connecting ends of said two plates such that expansion and contraction of said transducer effects displacement of said two plates corresponding to said amplified displacement.

17. The damping apparatus of claim 1 wherein said amplifying mechanism includes a cylinder, a first piston dividing said cylinder into a transducer chamber and a fluid chamber filled with a fluid medium, said transducer being disposed in said transducer chamber to drive said piston, and said fluid chamber having an orifice with a second piston disposed therein, said first piston having a piston face with a greater area than said second piston such that expansion and contraction of said transducer effects displacement of said second piston corresponding to said amplified displacement.

18. The damping apparatus according to claim 17 wherein said fluid medium is one of a gel, an elastomeric material and particulate matter.

19. The damping apparatus according to claim 17 wherein said fluid medium is contained in an elastic membrane.

20. The damping apparatus of claim 1 wherein said transducer includes a plurality of oscillating elements which are axially expandable and contractible and arranged in series and said amplifying mechanism is provided at a connection of adjacent oscillating elements.

21. The damping apparatus of claim 1 wherein said transducer and said amplifying mechanism are serially arranged and include a plurality of serially arranged amplifying devices.

22. The damping apparatus of claim 1 wherein said amplifying mechanism comprises a plurality of amplifying means arranged in a direction of expansion and contraction of said transducer which is in said first direction.

23. The damping apparatus of claim 1 wherein said amplifying mechanism includes an elliptical ring elongated in an elongate direction substantially perpendicular to said first direction and having end bends and opposing sides, said transducer including two oscillating elements which are expandable and contractible in said elongate direction and disposed inside said elliptical ring and have first ends contacting said end bends of said elliptical ring and second ends facing each other, and a pantograph linkage disposed inside said elliptical ring and connecting said second ends of said two oscillating elements with said opposing sides of said elliptical ring such that expansion and contraction of said two oscillating elements effects displacement of said opposing sides corresponding to said amplified displacement.

24. The damping apparatus of claim 1 wherein said transducer is a piezoelectric element.

25. The damping apparatus of claim 1 wherein said transducer includes one of a piezoelectric transducer and a magnetic transducer.

26. An actuator for damping vibration of an engine mounted in a structure in conjunction with a hydraulic engine mount, the actuator comprising:
   a transducer for transforming an electrical oscillation into a mechanical oscillation;
   means for amplifying a displacement of said mechanical oscillation producing an amplified mechanical oscillation; and
   means for mounting said actuator in serial connection with said hydraulic engine mount and one of said structure and said engine such that said amplified mechanical oscillation is in substantial alignment with a direction of said vibration on said engine and is serially superimposed on said vibration of said engine.

27. The actuator according to claim 26 further comprising:
   a sensor for sensing the vibration of said engine, functionally coupled to said engine and producing an electrical signal responsive to said vibration thereof; and
   a control means for receiving said electrical signal of said sensor and applying said electrical oscillation in responsive thereto to said transducer such that said amplified mechanical oscillations of said means for amplifying dampens the vibration of said engine.

28. The actuator according to claim 26 wherein said means for amplifying includes a hydraulic means for amplifying said displacement in accordance with Pascal's Principle.

29. The actuator according to claim 28 wherein said transducer is one of a piezoelectric transducer and a magnetic transducer.

30. The actuator according to claim 26 wherein said means for amplifying includes a mechanical lever mechanism.

31. A damping apparatus for damping vibration of an engine supported within a structure, the damping apparatus comprising:
   a hydraulic engine mount;
   an actuator having a transducer an electrical oscillation into a mechanical oscillation;
   said actuator including an amplifying mechanism for amplifying a displacement of said mechanical oscillation provided by said transducer to produce an amplified displacement in a first direction; and
   said actuator being coupled to said hydraulic engine mount such that said amplified displacement, of said amplifying mechanism, acts to dampen said vibration by effecting expansion and contraction of said actuator and said hydraulic engine mount when said actuator and said hydraulic engine mount are positioned between said engine and said structure.

32. The damping apparatus of claim 31 further comprising a sensor mounted to transform said vibration of said engine into an electric signal and a control means, responsive to an output signal of said sensor, for applying said electrical oscillation to said actuator to damp said vibration.

33. The damping apparatus of claim 31 wherein said transducer is one of a piezoelectric transducer and a magnetic transducer.

34. The damping apparatus according to claim 31 wherein said amplifying mechanism includes a hydraulic means for amplifying displacement according to Pascal's Principle.

35. The damping apparatus of claim 31 wherein said amplifying mechanism includes a mechanical lever mechanism.

36. The damping apparatus for damping vibration of an engine in conjunction with a hydraulic engine mount mounted in a structure, comprising:
   a transducer for transforming an electrical oscillation into a mechanical oscillation;
   means for amplifying a displacement of said mechanical oscillation provided by said transducer to produce an amplified mechanical oscillation; and
   means for mounting said actuator to said hydraulic engine mount and one of said structure and said engine such that said amplified mechanical oscillation is in substantial alignment with said vibration of said engine.

37. The damping apparatus according to claim 36 further comprising:
   a sensor for sensing the vibration of said engine, functionally coupled to said engine and producing an electrical signal responsive to said vibration thereof; and
   a control means for receiving said electrical signal of said sensor and applying said electrical oscillation in response thereto to said transducer such that said amplified mechanical oscillations of said means for amplifying dampens the vibration of said engine.

38. The damping apparatus of claim 36 wherein said means for amplifying includes a hydraulic means for amplifying displacement according to Pascal's Principle.

39. The damping apparatus of claim 36 wherein said transducer is one of a piezoelectric transducer and a magnetic strain transducer.

40. The damping apparatus of claim 36 wherein said means for amplifying includes a mechanical lever mechanism.

* * * * *